US011864036B2

(12) United States Patent
Cirik et al.

(10) Patent No.: US 11,864,036 B2
(45) Date of Patent: Jan. 2, 2024

(54) RESOURCE MANAGEMENT AND CONTROL FOR WIRELESS COMMUNICATIONS

(71) Applicant: Comcast Cable Communications, LLC, Philadelphia, PA (US)

(72) Inventors: Ali Cirik, Herndon, VA (US); Esmael Dinan, McLean, VA (US); Yunjung Yi, Vienna, VA (US); Hua Zhou, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 79 days.

(21) Appl. No.: 17/167,821

(22) Filed: Feb. 4, 2021

(65) Prior Publication Data

US 2021/0243659 A1 Aug. 5, 2021

Related U.S. Application Data

(60) Provisional application No. 62/969,930, filed on Feb. 4, 2020.

(51) Int. Cl.
*H04W 36/00* (2009.01)
*H04L 5/00* (2006.01)

(52) U.S. Cl.
CPC ....... *H04W 36/0061* (2013.01); *H04L 5/0048* (2013.01)

(58) Field of Classification Search
CPC ... H04L 5/0048; H04L 5/0023; H04L 5/0053; H04W 36/0061; H04W 16/00; H04W 72/0406
See application file for complete search history.

(56) References Cited

U.S. PATENT DOCUMENTS

| 2016/0344519 | A1* | 11/2016 | Lin | H04L 5/0051 |
|---|---|---|---|---|
| 2019/0297637 | A1* | 9/2019 | Liou | H04W 72/1273 |
| 2019/0297640 | A1* | 9/2019 | Liou | H04W 72/1215 |
| 2020/0100154 | A1 | 3/2020 | Cirik et al. | |
| 2020/0314829 | A1 | 10/2020 | Venugopal et al. | |
| 2020/0314860 | A1* | 10/2020 | Zhou | H04W 72/1289 |
| 2021/0022128 | A1* | 1/2021 | Chen | H04W 72/046 |
| 2021/0153209 | A1* | 5/2021 | Guan | H04W 72/0453 |
| 2021/0168779 | A1* | 6/2021 | Mondal | H04L 5/0035 |
| 2021/0297886 | A1* | 9/2021 | Chen | H04L 5/0048 |
| 2021/0329546 | A1* | 10/2021 | Wang | H04W 76/15 |
| 2022/0085862 | A1* | 3/2022 | Kung | H04L 1/1819 |
| 2022/0377770 | A1* | 11/2022 | Li | H04W 72/1273 |

FOREIGN PATENT DOCUMENTS

WO 2019164302 A1 8/2019

OTHER PUBLICATIONS

Jun. 9, 2021—European Search Report—EP 21155263.3.
(Continued)

*Primary Examiner* — Stephen J Clawson
(74) *Attorney, Agent, or Firm* — Banner & Witcoff, Ltd.

(57) ABSTRACT

One or more resources may be determined for wireless communications. A wireless device may apply an indication associated with a resource to one or more other resources. One or more conditions and/or parameters may be used to determine whether to use the indication for the one or more other resources.

22 Claims, 24 Drawing Sheets

(56) References Cited

OTHER PUBLICATIONS

Qualcomm Incorporated: "Enhancements on Multi-beam Operation", 3GPP Draft; Mobile Competence Centre; vol. RAN WG1 No. Chongqing, China; Oct. 5, 2019.
3GPP TS 38.213 V16.0.0 (Dec. 2019) 3rd Generation Partnership Project; Technical Specification Group Radio Access Network; NR; Physical layer procedures for control (Release 16).
3GPP TS 38.214 V16.0.0 (Dec. 2019) 3rd Generation Partnership Project; Technical Specification Group Radio Access Network; NR; Physical layer procedures for data (Release 16).
3GPP TS 38.300 V16.0.0 (Dec. 2019) 3rd Generation Partnership Project; Technical Specification Group Radio Access Network; NR; NR and NG-RAN Overall Description; Stage 2 (Release 16).
3GPP TS 38.321 V15.8.0 (Dec. 2019) 3rd Generation Partnership Project; Technical Specification Group Radio Access Network; NR; Medium Access Control (MAC) protocol specification (Release 15).
3GPP TS 38.331 V15.8.0 (Dec. 2019) 3rd Generation Partnership Project; Technical Specification Group Radio Access Network; NR; Radio Resource Control (RRC) protocol specification (Release 15).
3GPP TSG RAN WG1 Meeting #99, Reno, USA, Nov. 18-22, 2019, Title: RAN1 Chairman's Notes.
R2-xxxxxxx 3GPP TSG-RAN2 Meeting #109, Athens, Greece, Feb. 24-28, 2020, Source: Samsung, Title: MAC Running CR for NR eMIMO.
R1-1911844 3GPP TSG RAN WG1 Meeting #99, Reno, USA, Nov. 18-22, 2019, Source: OPPO, Title: Discussion on multi-beam operation enhancements.
R1-1911903 3GPP TSG RAN WG1 Meeting #99, Reno, USA, Nov. 18-22, 2019, Source: Huawei, HiSilicon, Title: Enhancements on multi-beam operation.
R1-1911931 3GPP TSG RAN WG1 Meeting #99, Reno, USA, Nov. 18-22, 2019, Source: ZTE, Title: Enhancements on multi-beam operation.
R1-1912040 3GPP TSG RAN WG1 Meeting #99, Reno, USA, Nov. 18-22, 2019, Source: vivo, Title: Remaining issues on multi-beam transmission.
R1-1912058 3GPP TSG RAN WG1 Meeting #99, Reno, USA, Nov. 18-22, 2019, Source: Ericsson, Title: Remaining issues on multi-beam enhancements.
R1-1912084 3GPP TSG RAN WG1 Meeting #99, Reno, USA, Nov. 18-22, 2019, Source: Panasonic, Title: Enhancements on multi-beam operations.
R1-1912130 3GPP TSG RAN WG1 Meeting #99, Reno, USA, Nov. 18-22, 2019, Source: Fujitsu, Title: Enhancements on multi-beam operation.
R1-1912135 3GPP TSG RAN WG1 Meeting #99, Reno, USA, Nov. 18-22, 2019, Source: MediaTek Inc., Title: Enhancements on multi-beam operations.
R1-1912177 3GPP TSG RAN WG1 Meeting #99, Reno, USA, Nov. 18-22, 2019, Source: CATT, Title: Remaining issues on multi-beam enhancements.
R1-1912223 3GPP TSG RAN WG1 Meeting #99, Reno, USA, Nov. 18-22, 2019, Source: Intel Corporation, Title: Discussion on multi-beam enhancements.
R1-1912248 3GPP TSG RAN WG1 Meeting #99, Reno, USA, Nov. 18-22, 2019, Source: Asia Pacific Telecom, Title: Discussion on multi-beam operations.
R1-1912270 3GPP TSG RAN WG1 Meeting #99, Reno, USA, Nov. 18-22, 2019, Source: LG Electronics, Title: Discussion on multi-beam based operations and enhancements.
R1-1912277 3GPP TSG RAN WG1 Meeting #99, Reno, USA, Nov. 18-22, 2019, Source: LG Electronics, Title: Feature lead summary of Enhancements on Multi-beam Operations.
R1-1912317 3GPP TSG RAN WG1 Meeting #99, Reno, USA, Nov. 18-22, 2019, Source: Lenovo, Motorola Mobility, Title: Discussion of multi-beam operation.
R1-1912356 3GPP TSG RAN WG1 Meeting #99, Reno, USA, Nov. 18-22, 2019, Source: Sony, Title: Enhancements on multi-beam operation.
R1-1912483 3GPP TSG RAN WG1 Meeting #99, Reno, USA, Nov. 18-22, 2019, Source: Samsung, Title: Enhancements on multi-beam operations.
R1-1912530 3GPP TSG RAN WG1 Meeting #99, Reno, USA, Nov. 18-22, 2019, Source: China Telecom, Title: Enhancements on multi-beam operation.
R1-1912543 3GPP TSG RAN WG1 Meeting #99, Reno, USA, Nov. 18-22, 2019, Source: CMCC, Title: Enhancements on multi-beam operation.
R1-1912563 3GPP TSG RAN WG1 Meeting #99, Reno, USA, Nov. 18-22, 2019, Source: Spreadtrum Communications, Title: Discussion on multi-beam operation.
R1-1912664 3GPP TSG RAN WG1 Meeting #99, Reno, USA, Nov. 18-22, 2019, Source: Fraunhofer IIS, Fraunhofer HHI, Title: Enhancements on UE multi-beam operation.
R1-1912720 3GPP TSG RAN WG1 Meeting #99, Reno, USA, Nov. 18-22, 2019, Source: Nokia, Nokia Shanghai Bell, Title: Enhancements on multi-beam operation.
R1-1912731 3GPP TSG RAN WG1 Meeting #99, Reno, USA, Nov. 18-22, 2019, Source: Futurewei, Title: On multi-beam operation enhancements.
R1-1912824 3GPP TSG RAN WG1 Meeting #99, Reno, USA, Nov. 18-22, 2019, Source: Apple Inc., Title: Remaining issues on multi-beam operation.
R1-1912845 3GPP TSG RAN WG1 Meeting #99, Reno, USA, Nov. 18-22, 2019, Source: AT&T, Title: Remaining issues on multi-beam enhancements.
R1-1912894 3GPP TSG RAN WG1 Meeting #99, Reno, USA, Nov. 18-22, 2019, Source: NTT DOCOMO, Inc., Title: Discussion on multi-beam enhancement.
R1-1912968 3GPP TSG RAN WG1 Meeting #99, Reno, USA, Nov. 18-22, 2019, Source: Qualcomm Incorporated, Title: Enhancements on multi-beam operation.
R1-1912995 3GPP TSG RAN WG1 Meeting #99, Reno, USA, Nov. 18-22, 2019, Source: Xiaomi, Title: Enhancements on beam management.
R1-1913021 3GPP TSG RAN WG1 Meeting #99, Reno, USA, Nov. 18-22, 2019, Source: ASUSTek, Title: Enhancements on multiple beam operation.
R1-1913140 3GPP TSG RAN WG1 Meeting #99, Reno, USA, Nov. 18-22, 2019, Source: Convida Wireless, Title: On beam failure recovery for Scell.
R1-1913292 3GPP TSG RAN WG1 Meeting #99, Reno, USA, Nov. 18-22, 2019, Source: Apple Inc., Title: Feature lead summary on Scell BFR and L1-SINR.
R1-1913322 3GPP TSG RAN WG1 Meeting #99, Reno, USA, Nov. 18-22, 2019, Source: LG Electronics, Title: Feature lead summary#2 of enhancements on multi-beam operations.
R1-1913453 3GPP TSG RAN WG1 Meeting #99, Reno, USA, Nov. 18-22, 2019, Source: LG Electronics, Title: Feature lead summary#4 of Enhancements on Multi-beam Operations.
R1-1913654 3GPP TSG RAN WG1 Meeting #99, Reno, USA, Nov. 18-22, 2019, Source: Samsung, Title: Introduction of MIMO enhancements in NR.
R1-1913655 3GPP TSG RAN WG1 Meeting #99, Reno, USA, Nov. 18-22, 2019, Source: Nokia, Title: Introduction of NR enhanced MIMO.

\* cited by examiner

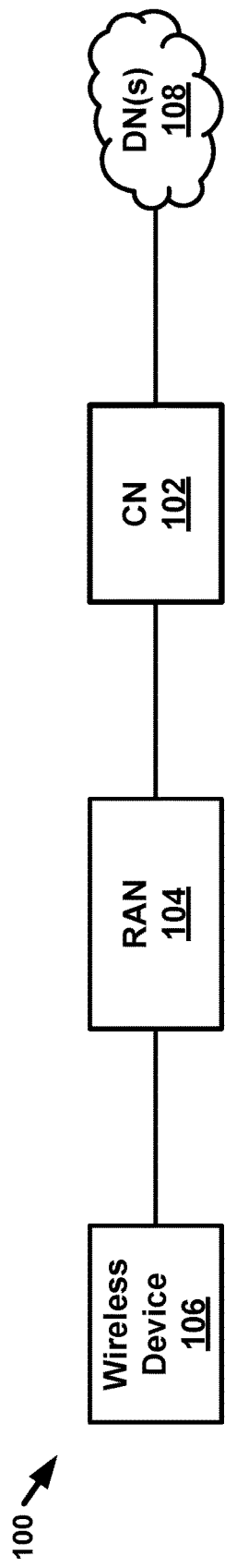
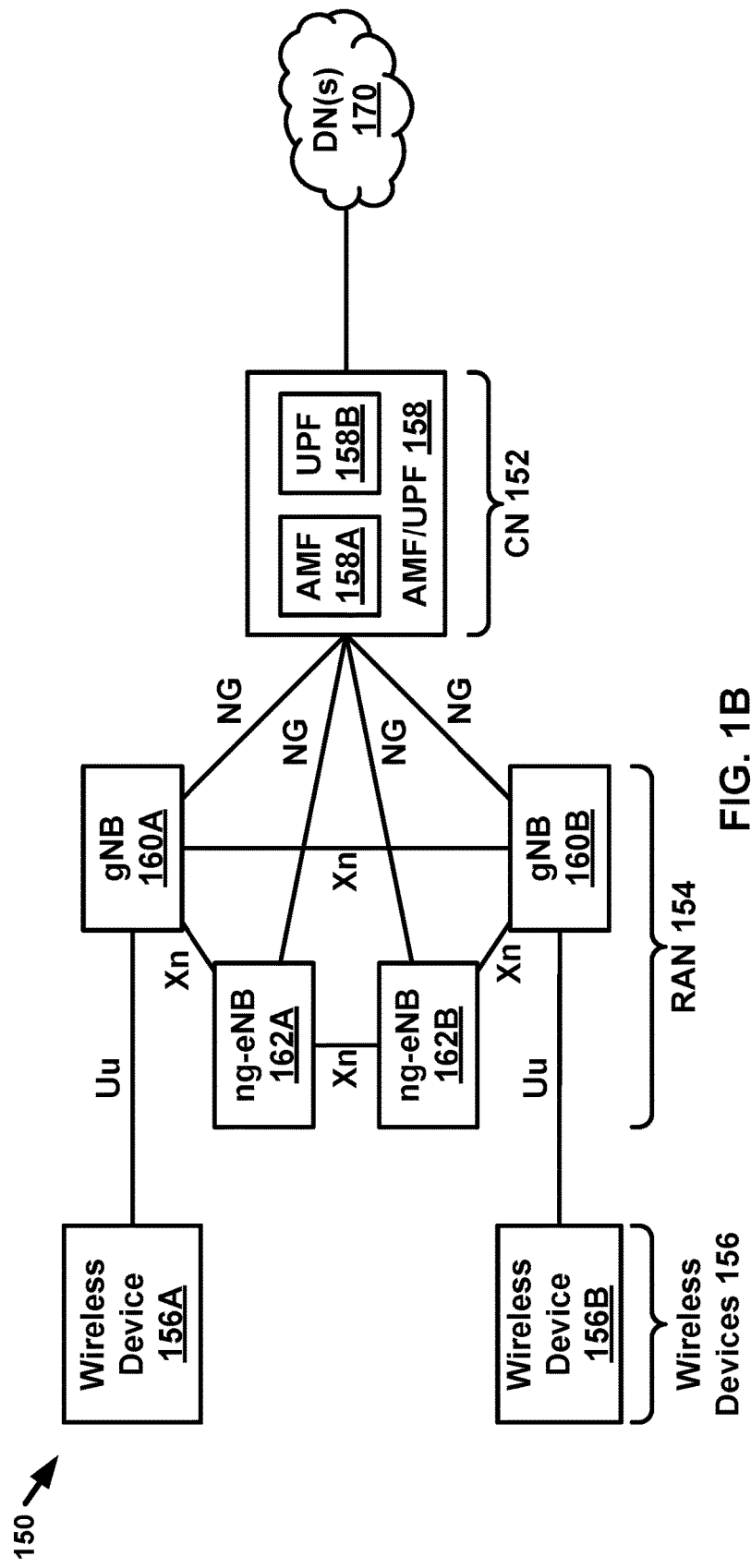

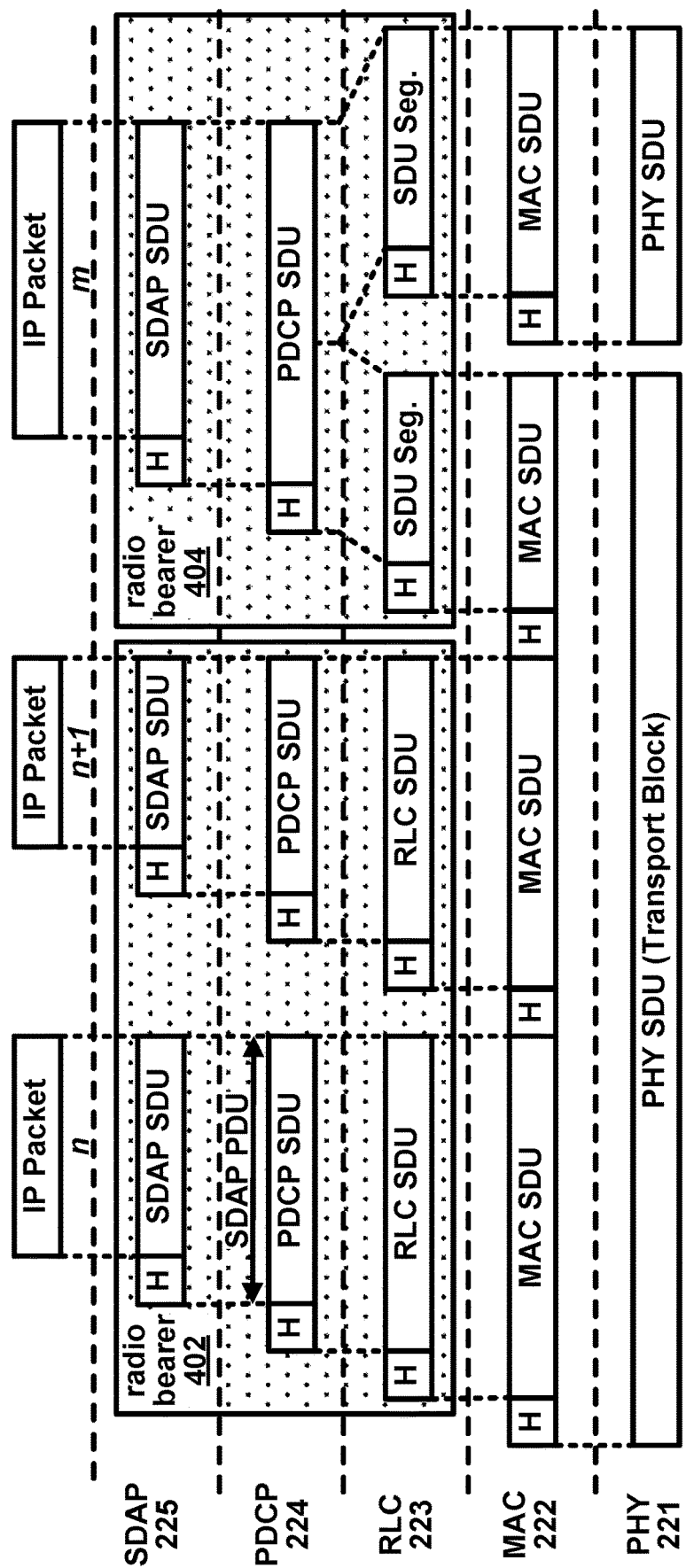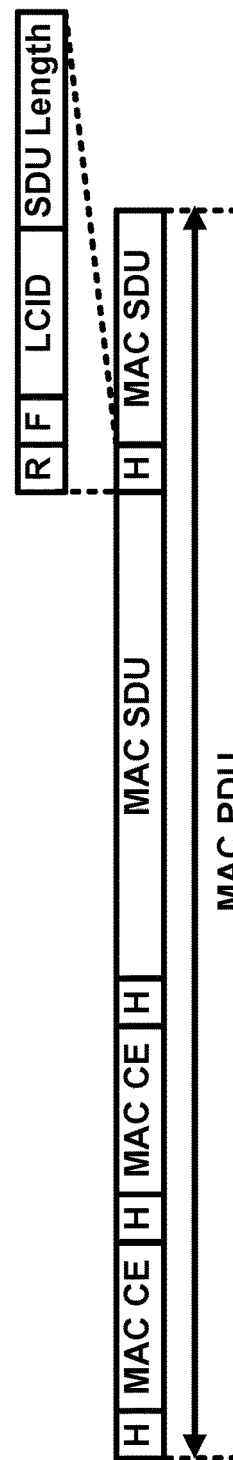
FIG. 4A
FIG. 4B

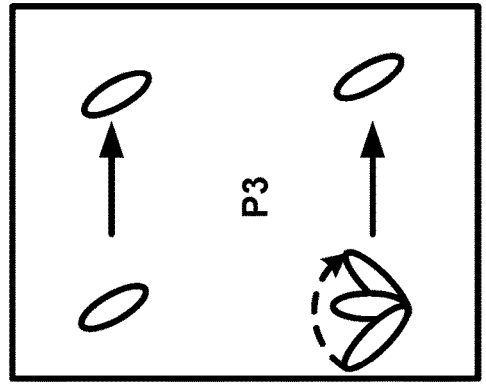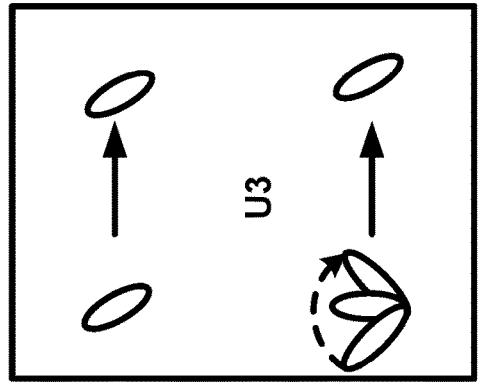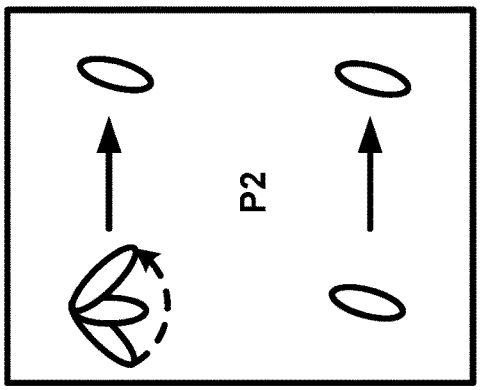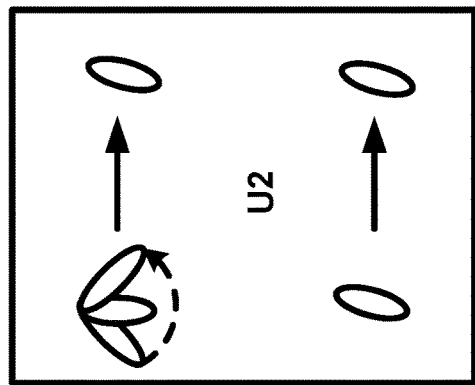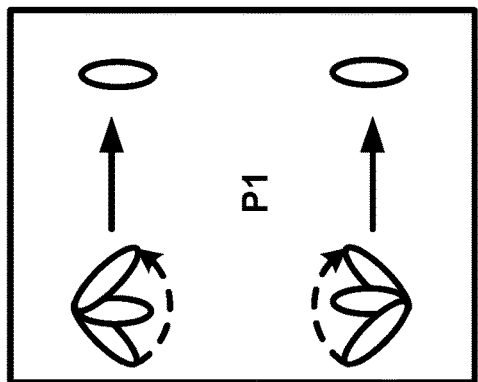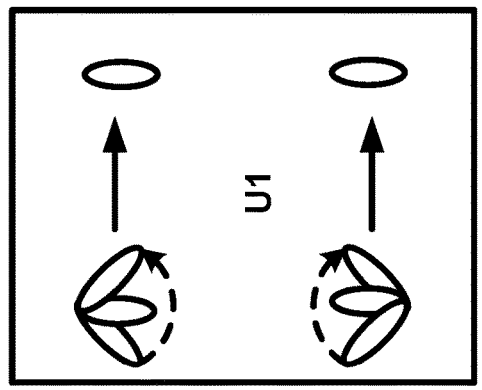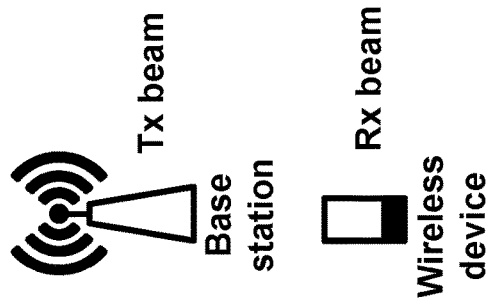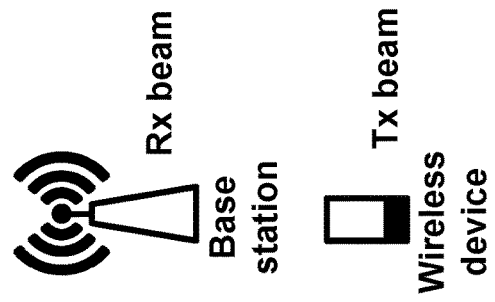
FIG. 12A
FIG. 12B

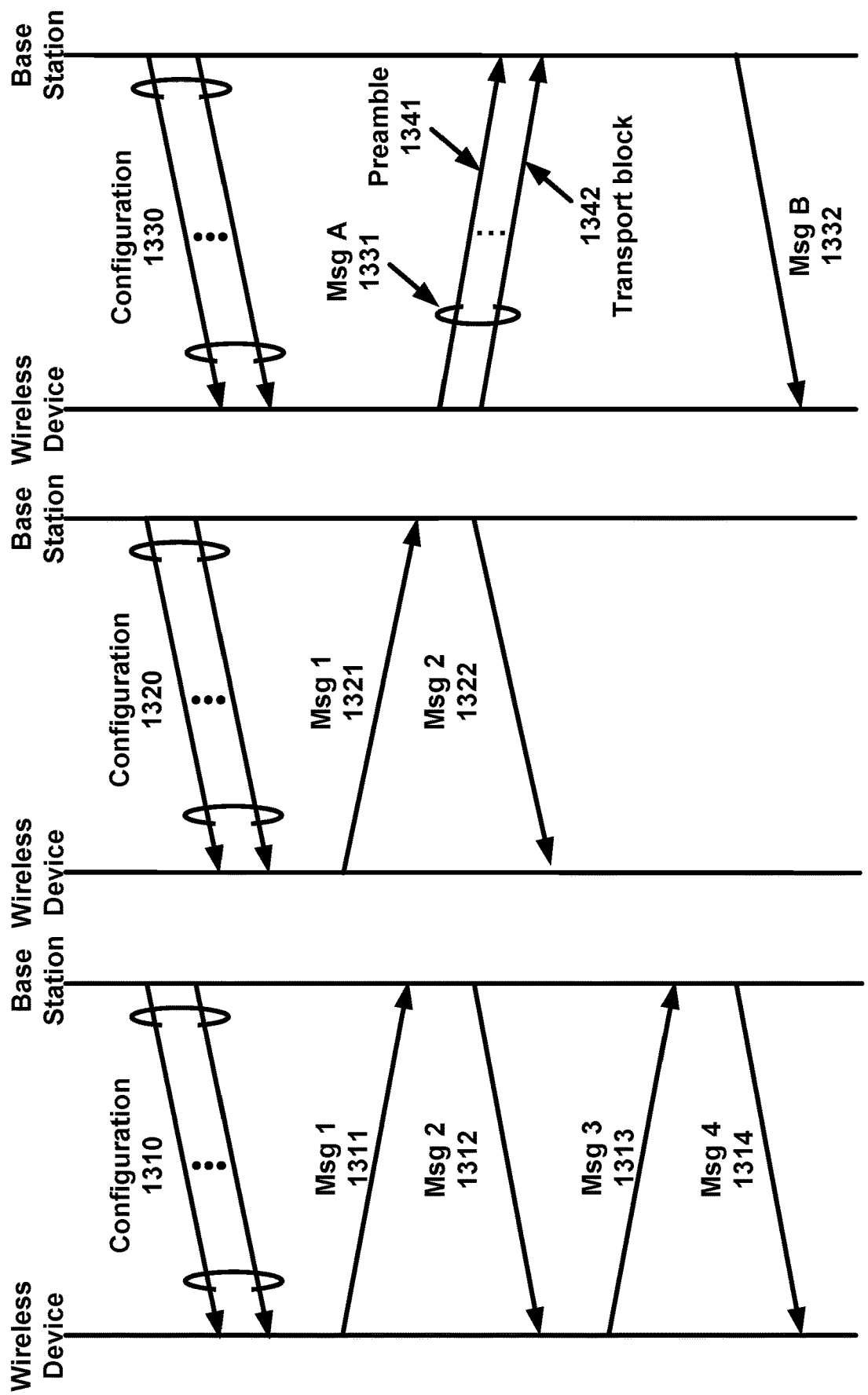

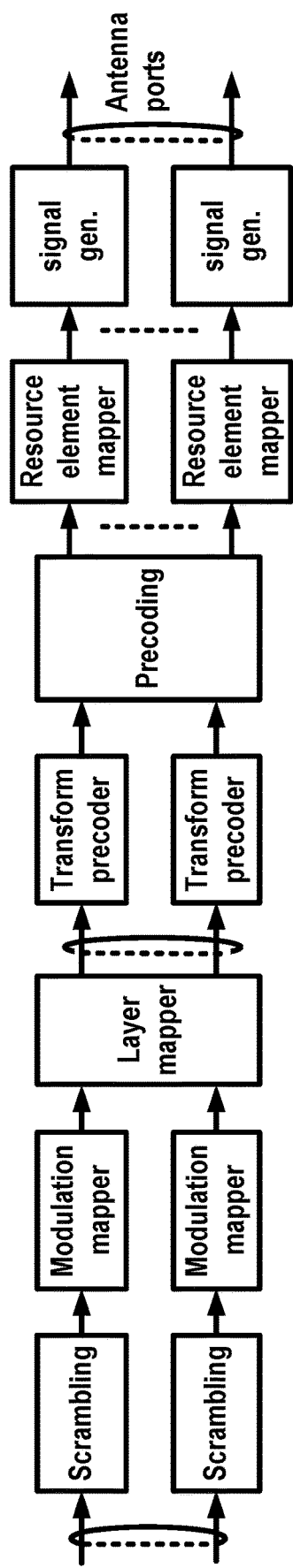
FIG. 16A
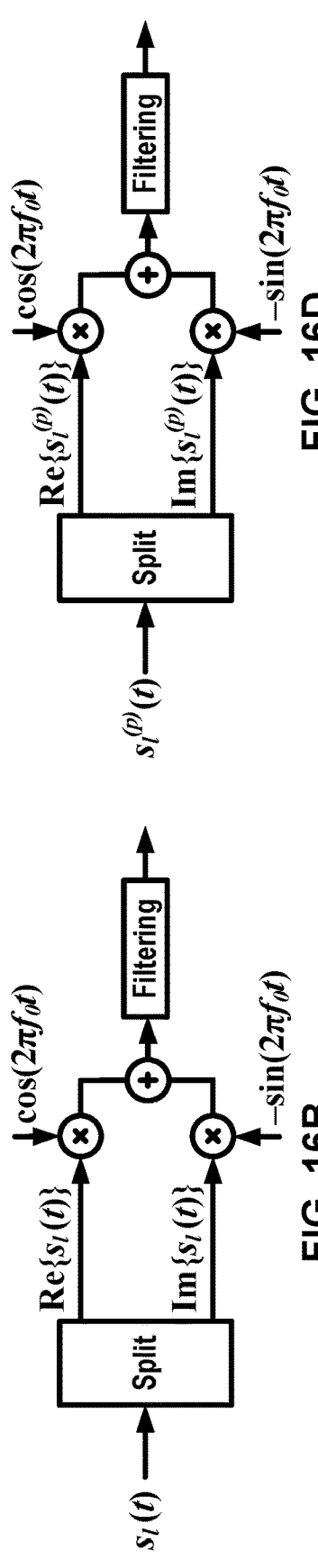
FIG. 16B
FIG. 16D
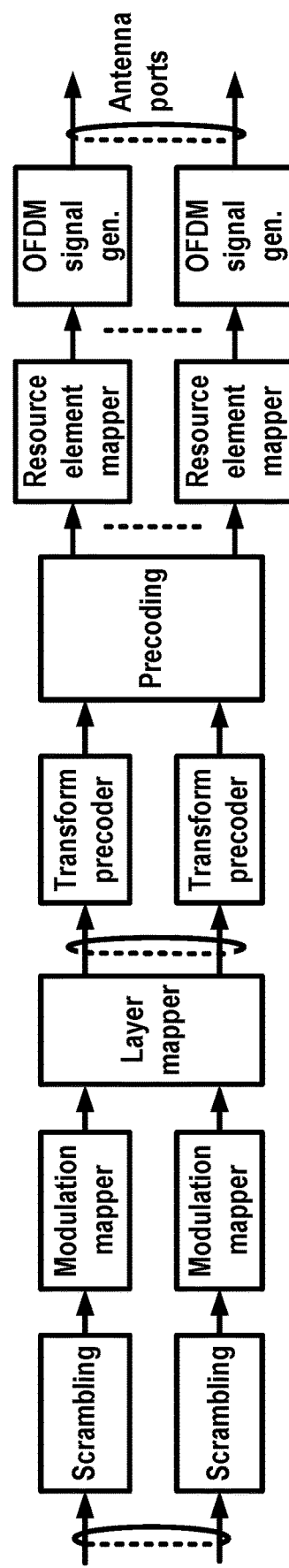
FIG. 16C

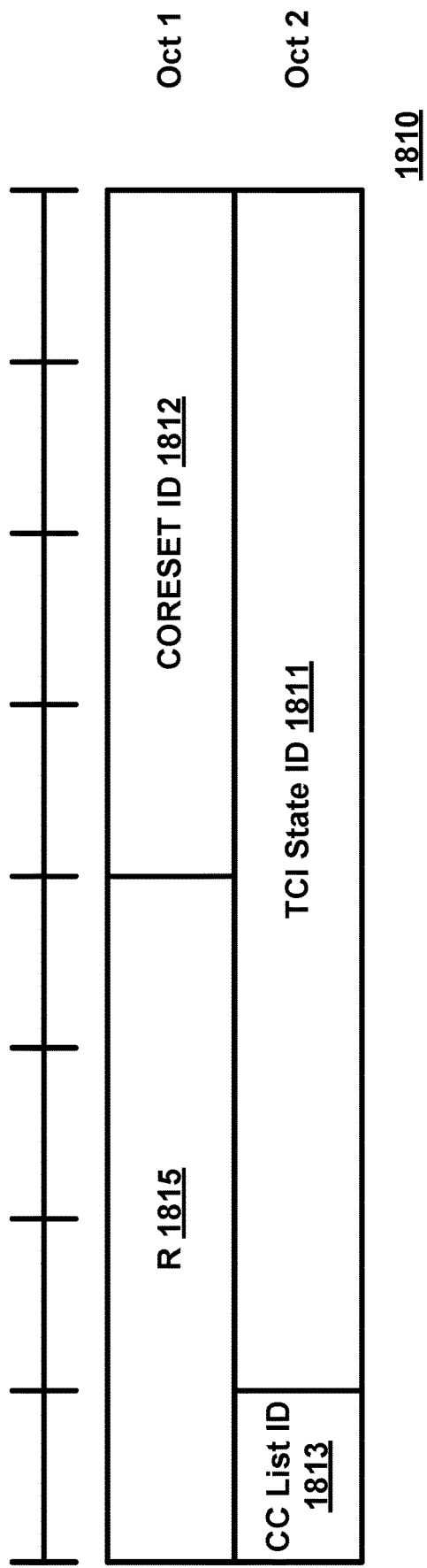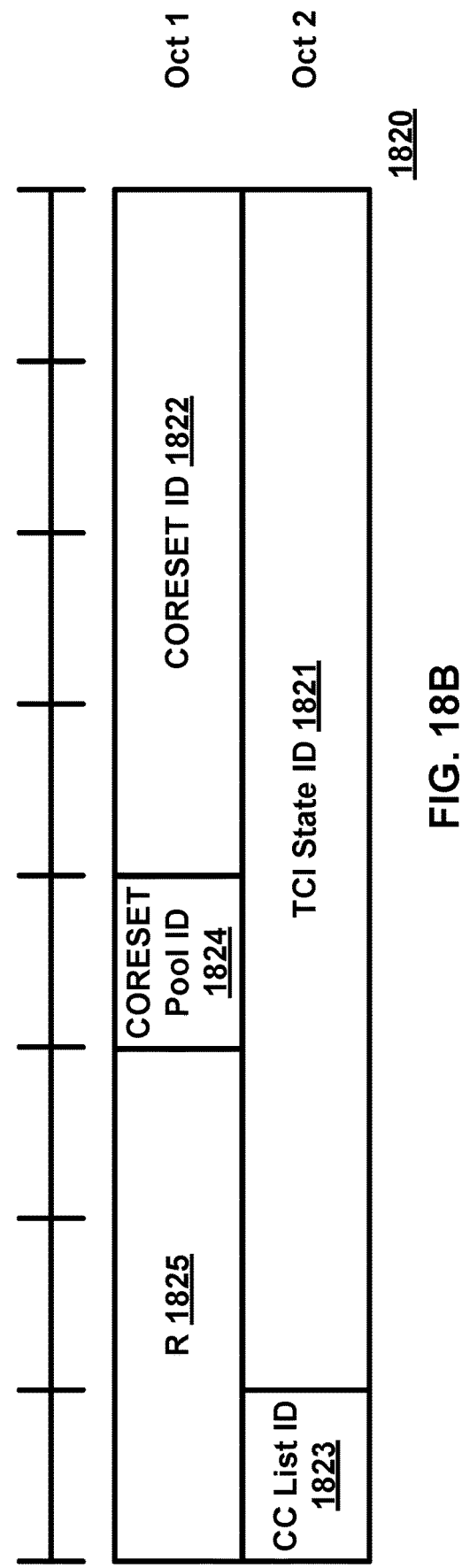
FIG. 18A
FIG. 18B

RESOURCE MANAGEMENT AND CONTROL FOR WIRELESS COMMUNICATIONS

CROSS-REFERENCE TO RELATED APPLICATIONS

This application claims the benefit of U.S. Provisional Application No. 62/969,930, filed on Feb. 4, 2020. The above-referenced application is hereby incorporated by reference in its entirety.

BACKGROUND

One or more devices send downlink transmissions to a wireless device and/or receive uplink transmissions from the wireless device. Transmissions are received and processed at a communication device (e.g., base station, wireless device) using receiving beams. One or more transmission and reception points (TRPs) may be used for wireless communications.

SUMMARY

The following summary presents a simplified summary of certain features. The summary is not an extensive overview and is not intended to identify key or critical elements.

Wireless communications may comprise communications between a wireless device and a base station, and/or communications between wireless devices. One or more wireless resources (e.g., uplink resource(s), downlink resource(s), and/or sidelink resource(s)) may be associated with one or more beams. A plurality of cells may share a beam and/or other resources in certain conditions (e.g., quasi co-location of one or more antenna ports). A resource change/update may be performed across a plurality of cells within a cell group that may share one or more wireless resources. However, at least some resource changes/updates may not be efficient for all cells in a cell group, for example, based on one or more characteristics (e.g., different channel characteristics, different control resource sets (coresets), different transmission and reception points (TRPs), different antenna panels, different uplink carrier types, different sounding reference signal resources, etc.). One or more conditions and/or parameters (such as a control resource pool index, a coreset pool index, an uplink carrier type, a sounding reference signal index, an antenna panel index, etc.) may be used to determine whether to apply an indication to change/update a resource to one or more other resources of a different cell. By selectively applying a resource change/update, wireless communications between devices may be improved.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.
FIG. 4A shows an example downlink data flow for a user plane configuration.
FIG. 4B shows an example format of a Medium Access Control (MAC) subheader in a MAC Protocol Data Unit (PDU).
FIG. 12A shows examples of downlink beam management procedures.
FIG. 12B shows examples of uplink beam management procedures.
FIG. 13A shows an example four-step random access procedure.
FIG. 13B shows an example two-step random access procedure.
FIG. 13C shows an example two-step random access procedure.
FIG. 16A, FIG. 16B, FIG. 16C, and FIG. 16D show examples of uplink and downlink signal transmission.
FIG. 18A and FIG. 18B show examples of a control command for beam management.

DETAILED DESCRIPTION

Figure 2A:
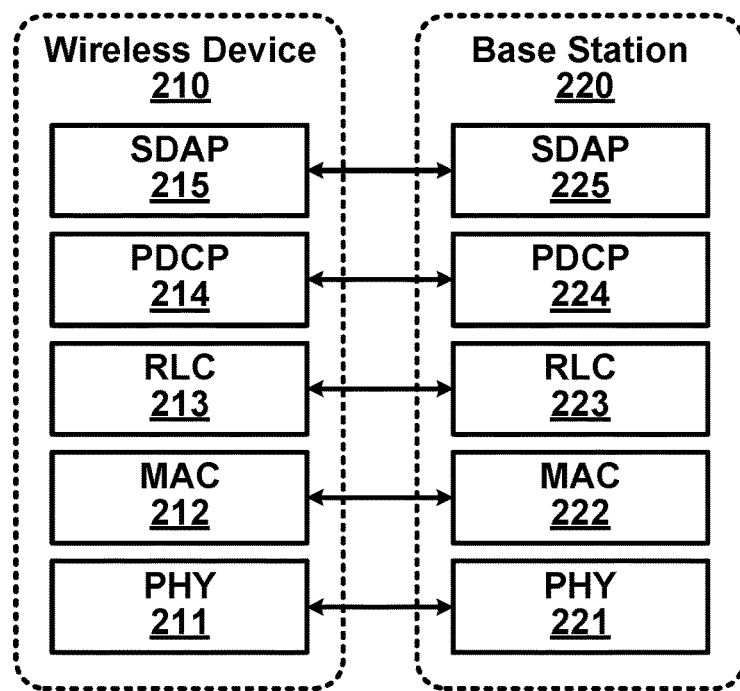
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to wireless communications for changing beams (e.g., beams associated with transmission and reception points (TRPs) of a plurality of cells).

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/ configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s)

156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
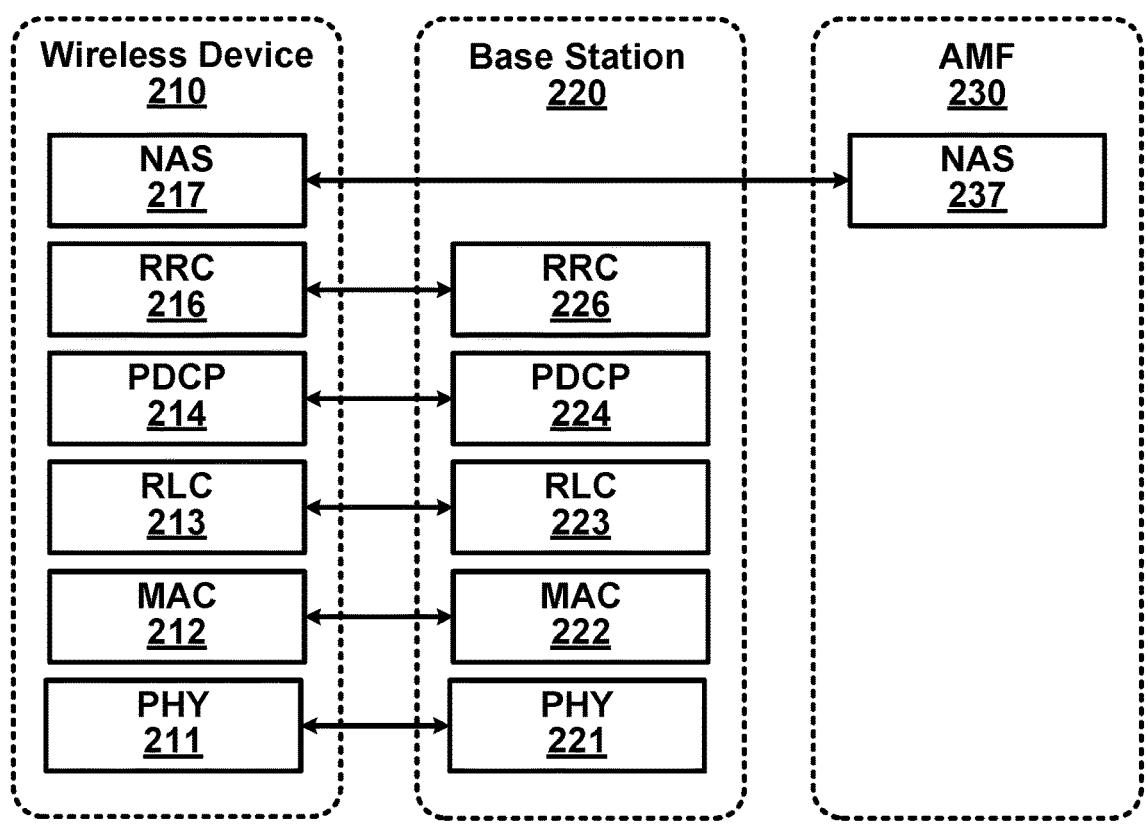
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
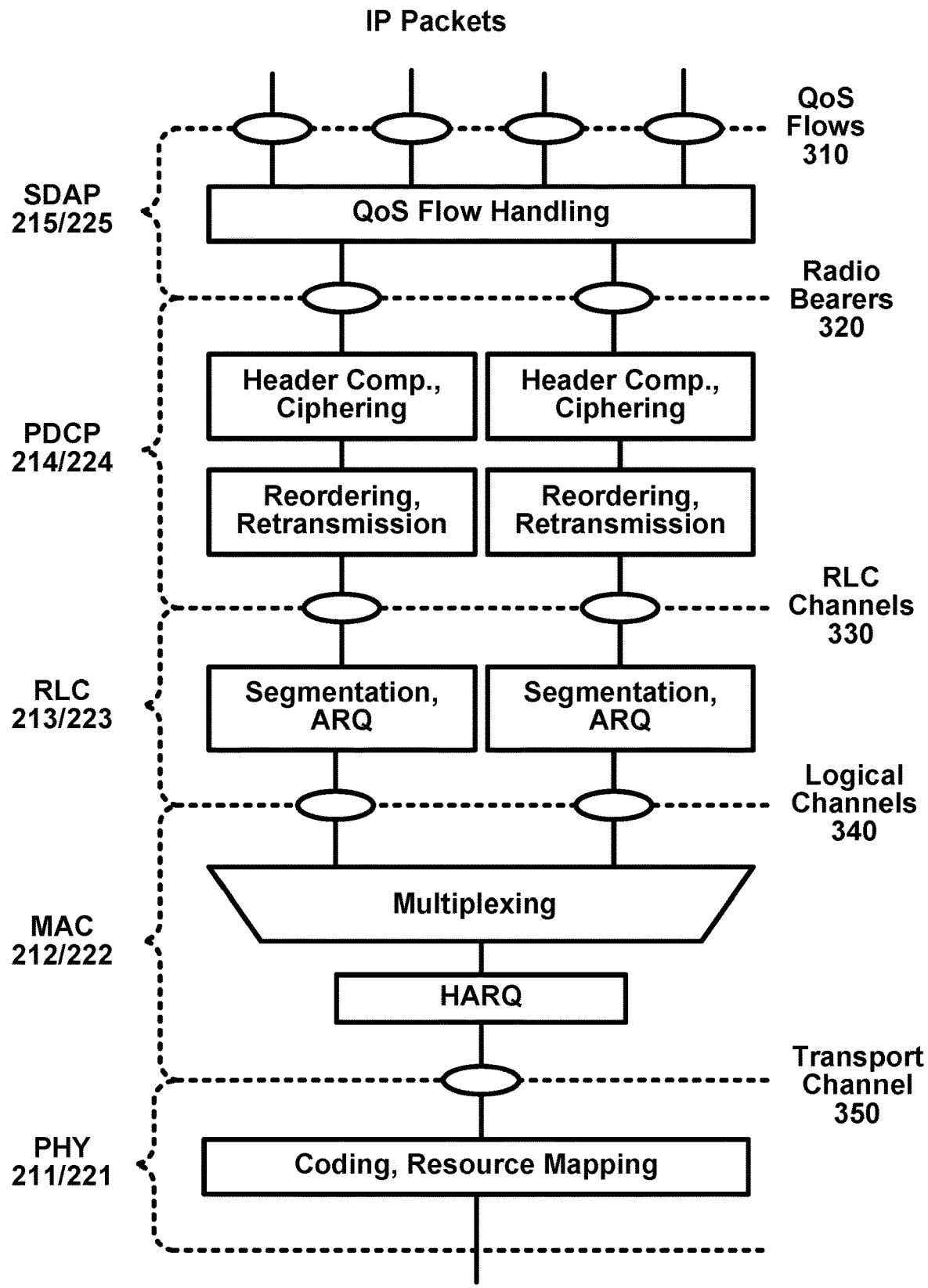
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
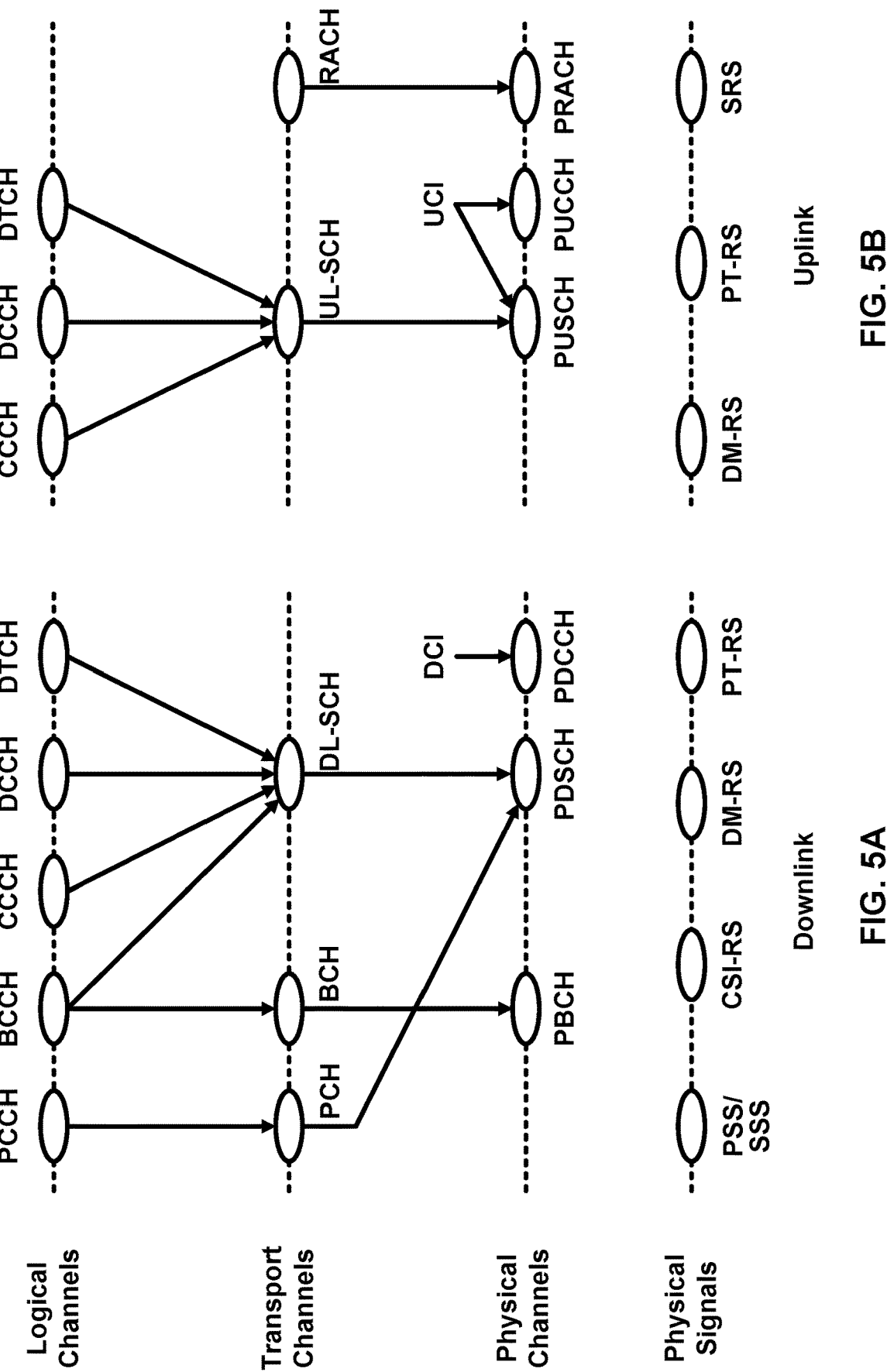
FIG. 5A shows an example mapping for downlink channels.
FIG. 5B shows an example mapping for uplink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIB s). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
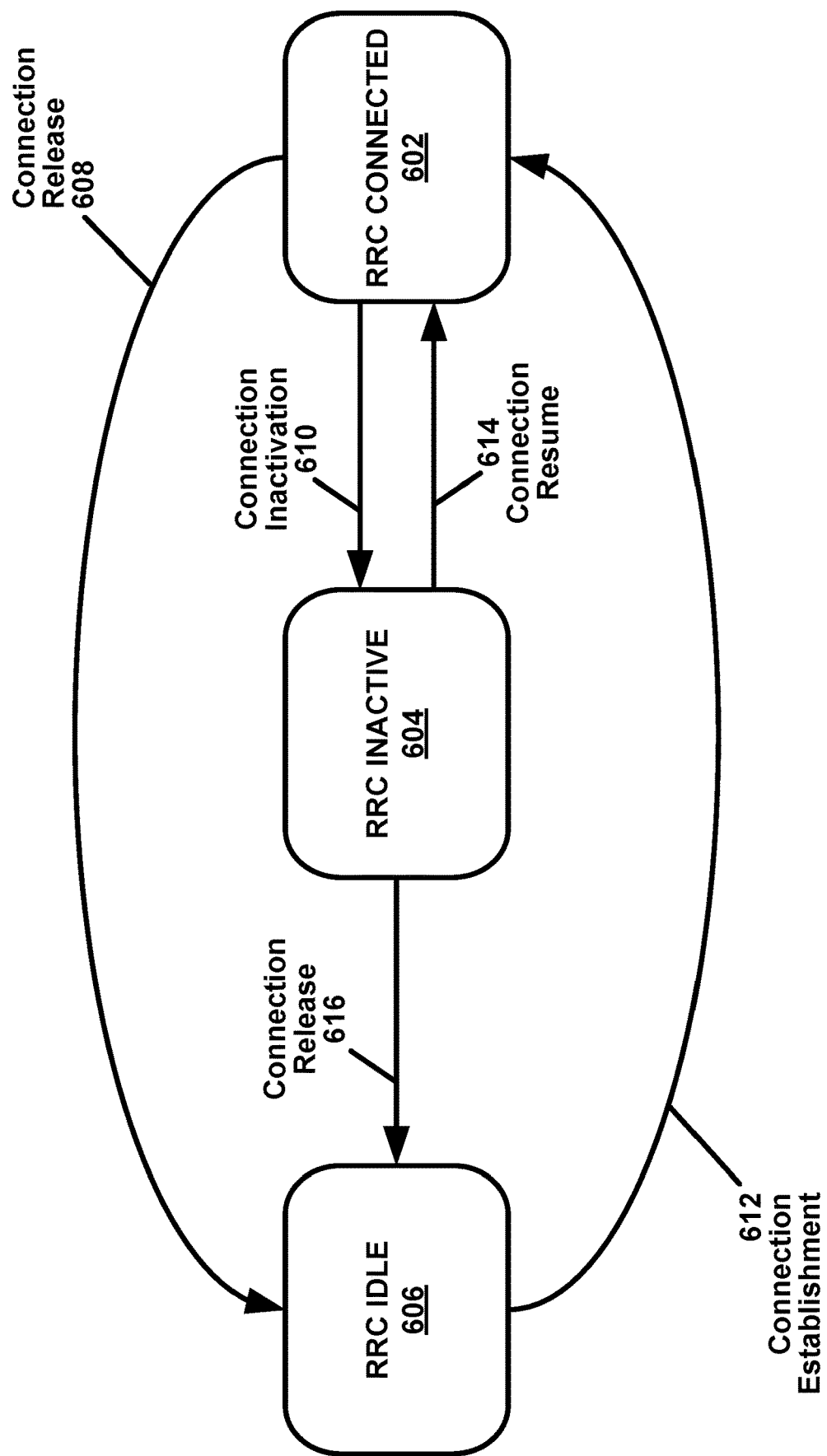
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFNT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFNT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
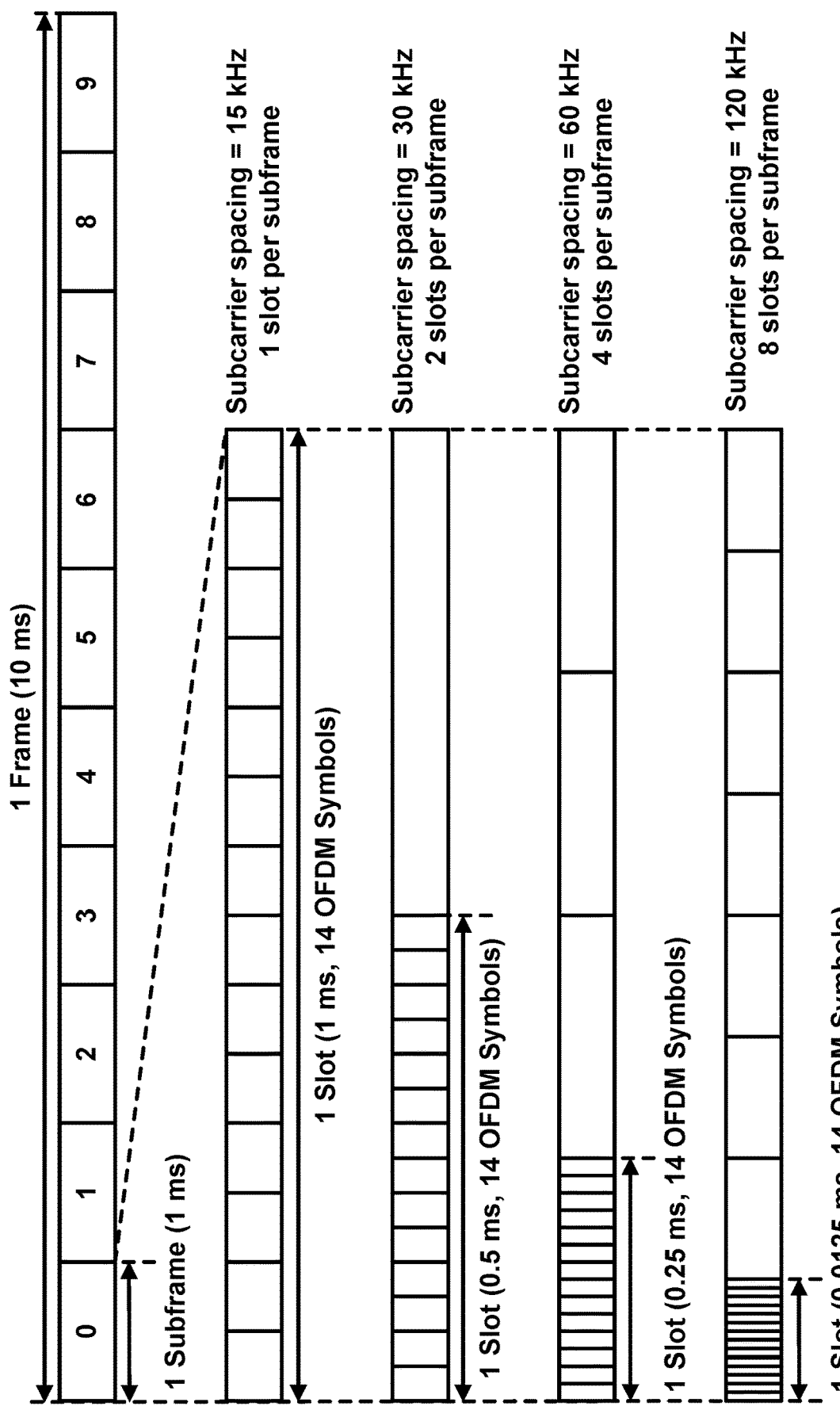
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 us; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
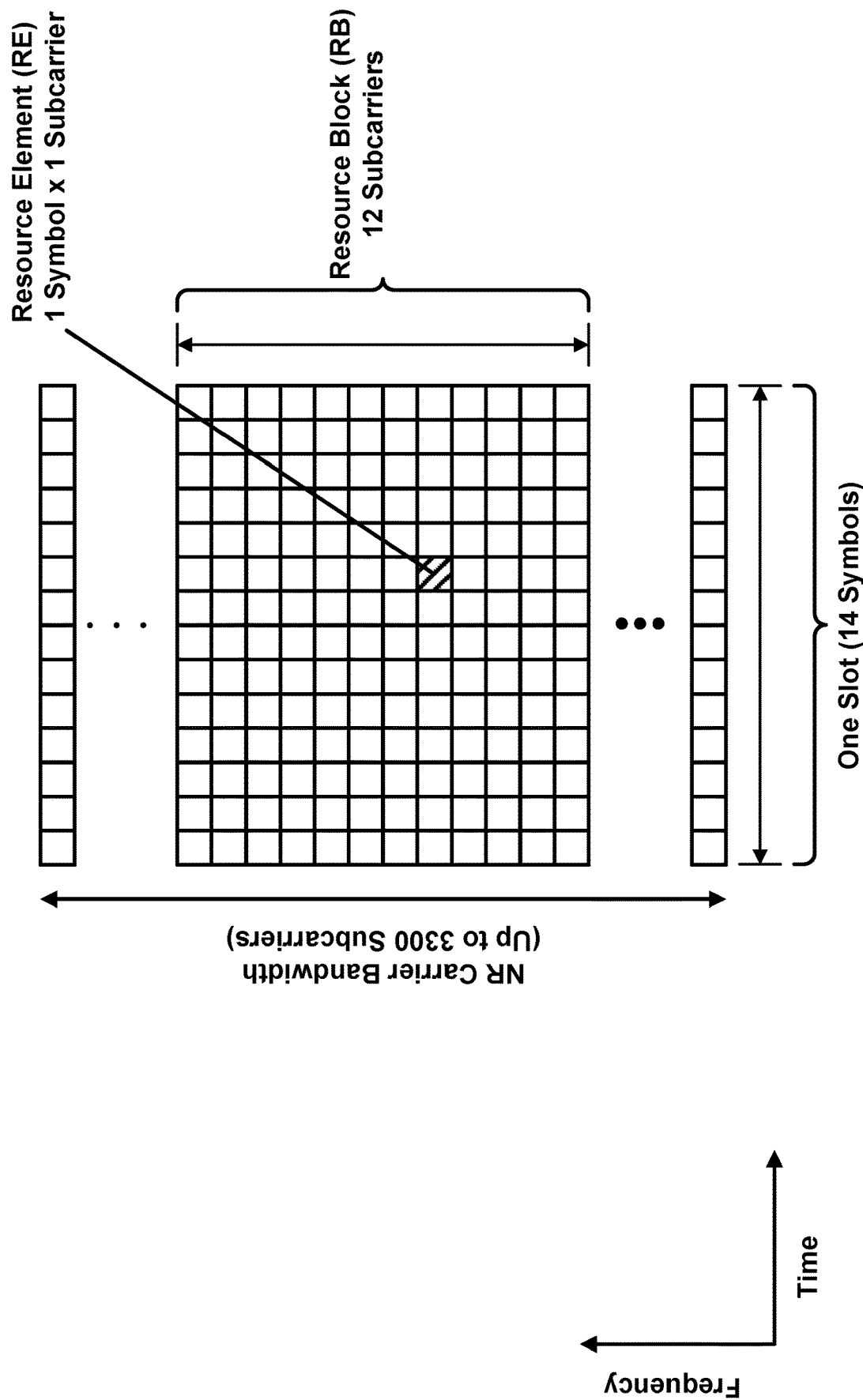
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
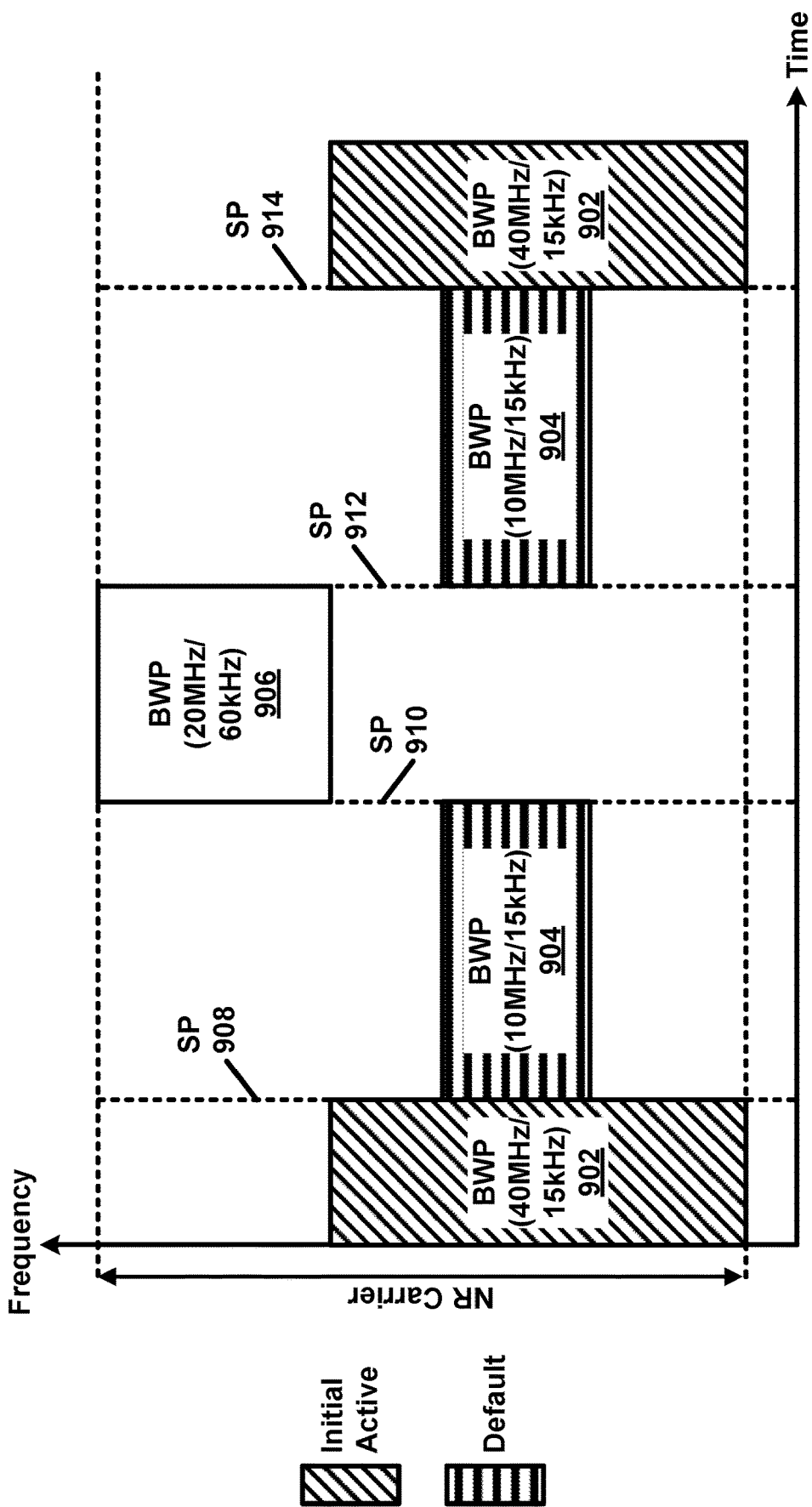
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
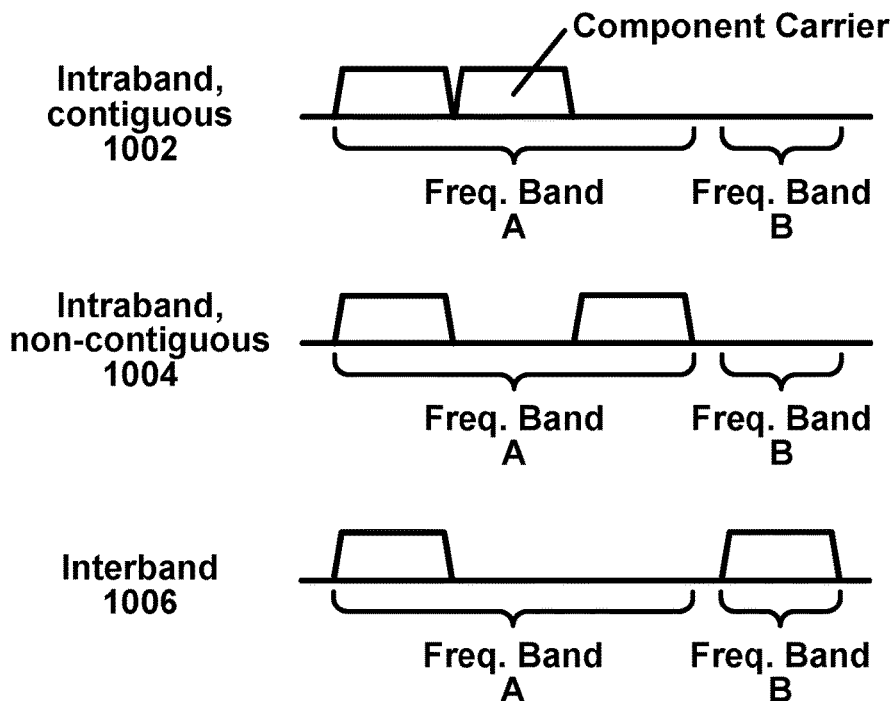
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
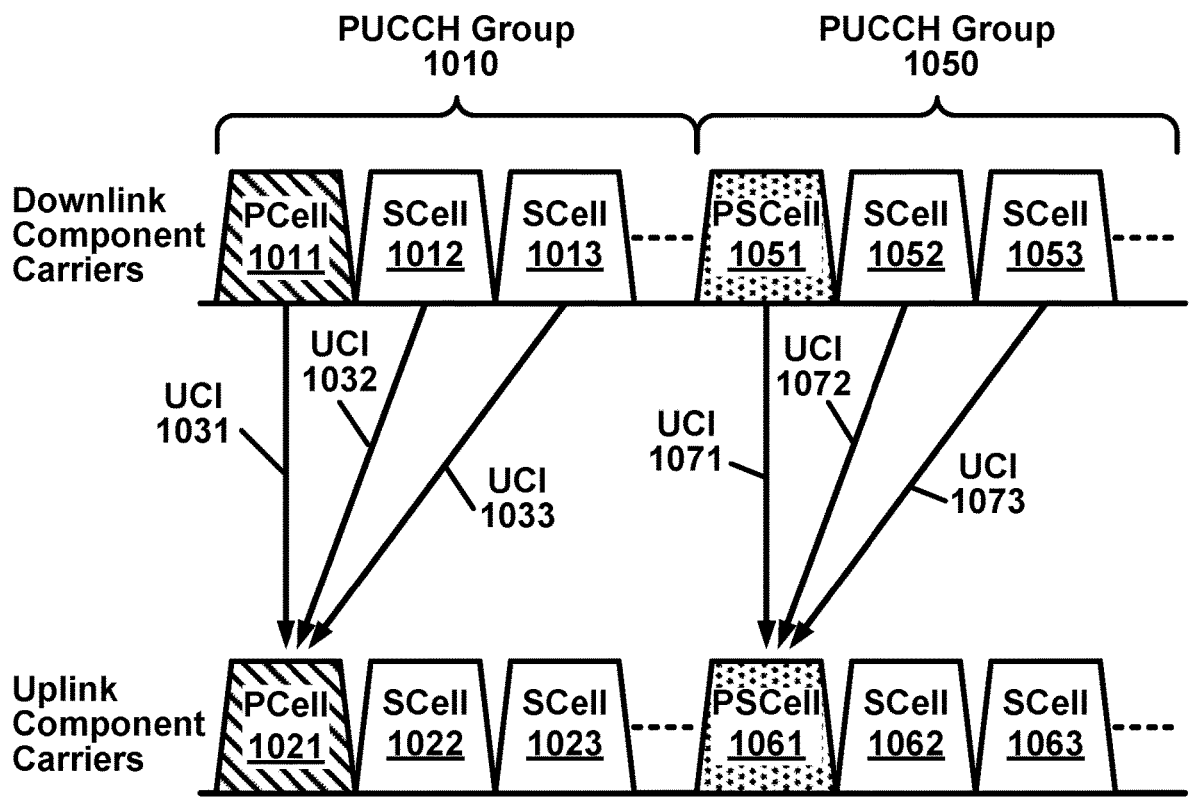
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
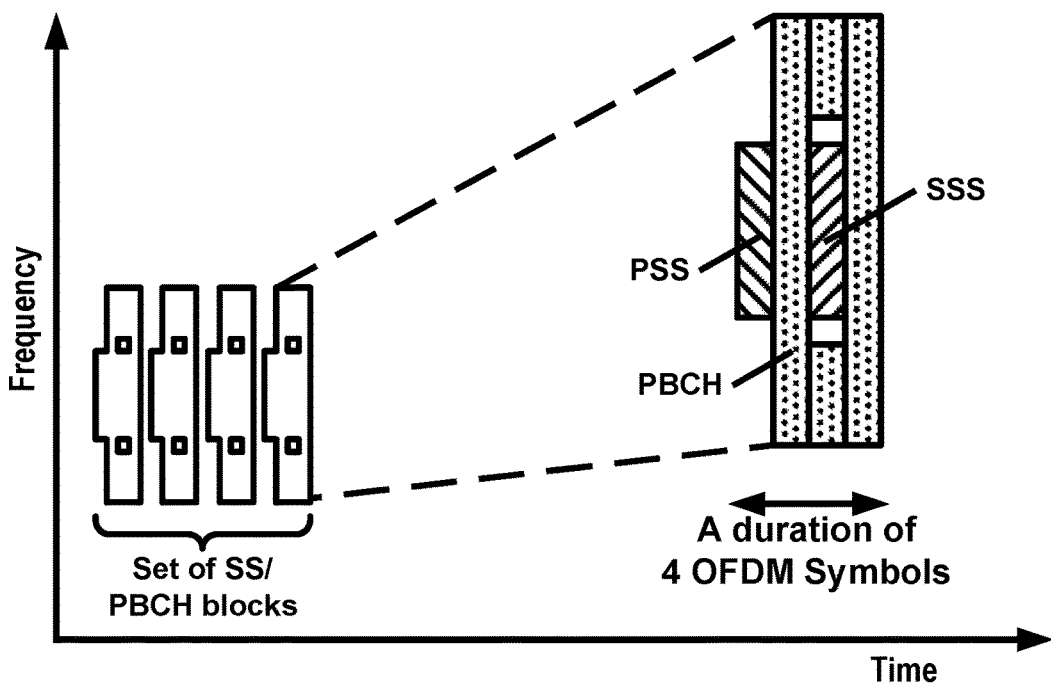
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indexes. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/ employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/ confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
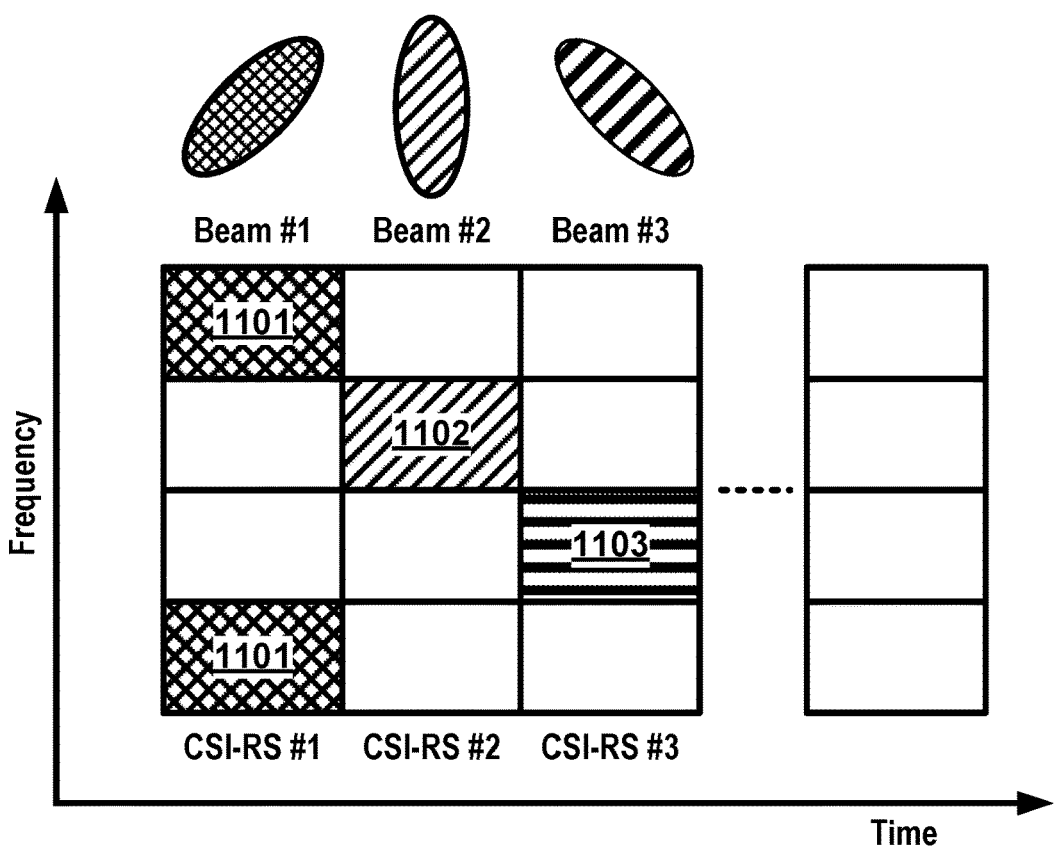
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counterclockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counterclockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313).

The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0<s_id<14), t_id may be an index of a first slot of the PRACH occasion in a system frame (e.g., 0<t_id<80), f_id may be an index of the PRACH occasion in the frequency domain (e.g., 0<f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
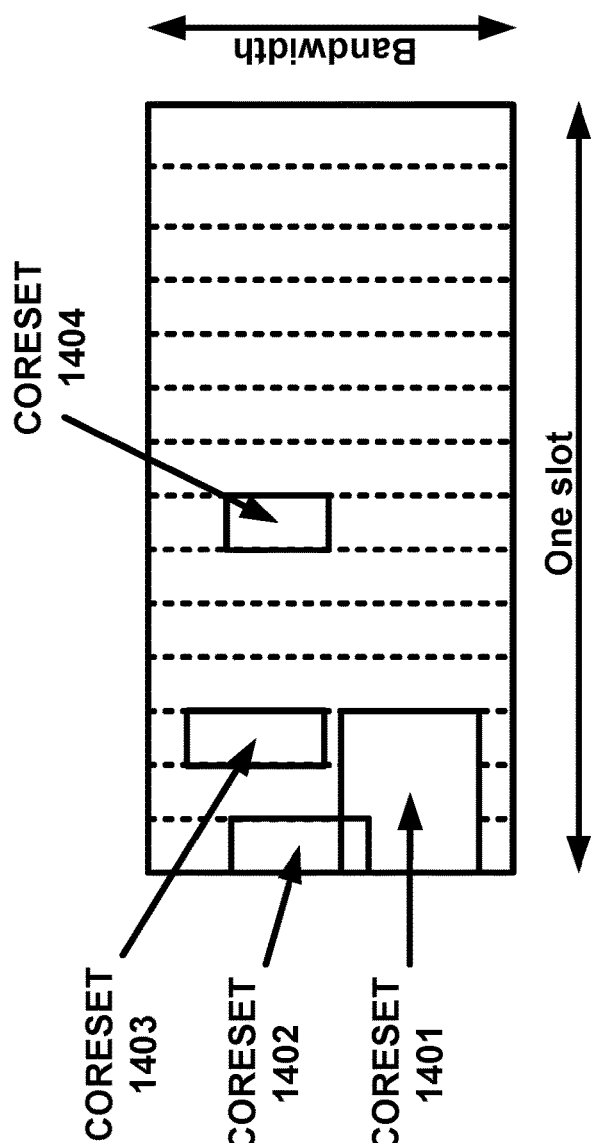
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
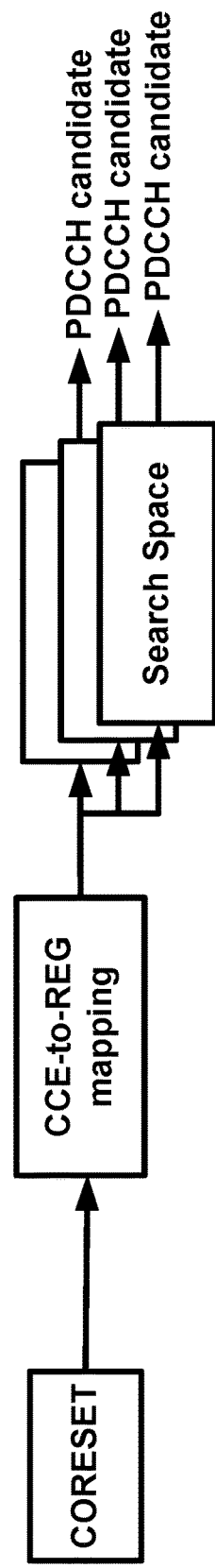
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set.

The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
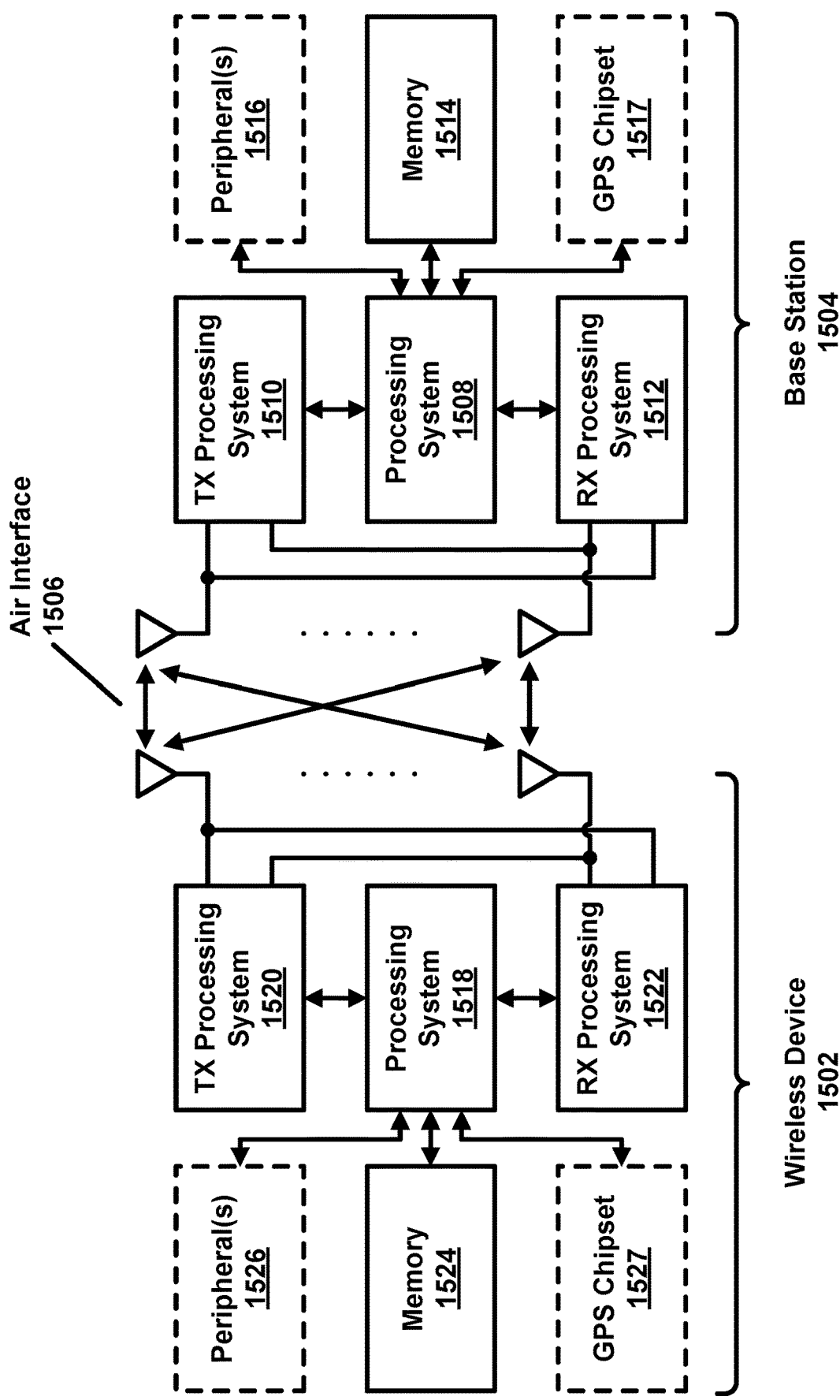
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
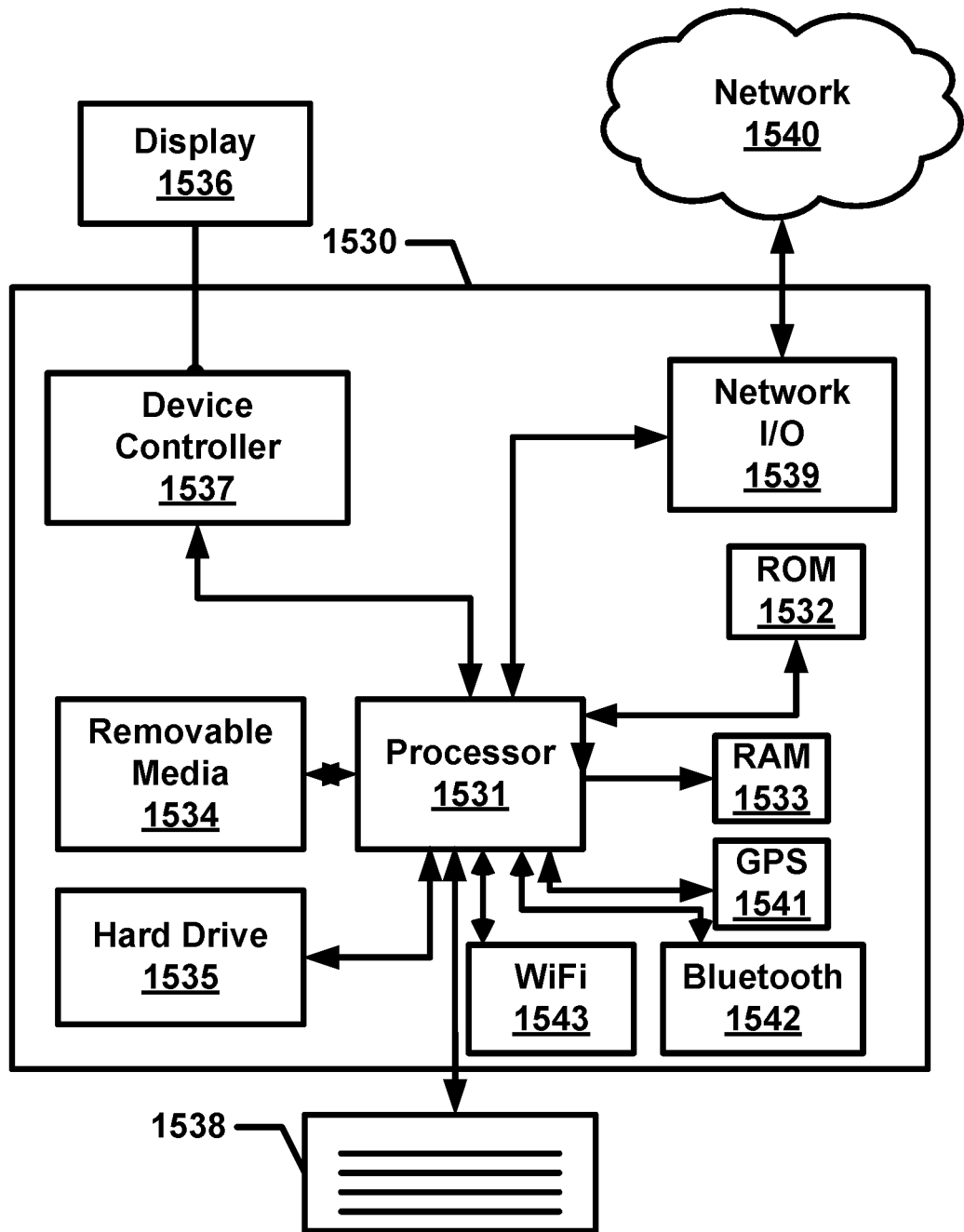
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running. A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A wireless device may receive (e.g., from a base station) one or more configuration parameters associated with one or more cells (e.g., configuration parameters for a first serving cell and a second serving cell). The first serving cell and the second serving cell may operate in the same operating frequency band or intra-band (e.g., the first serving cell and the second serving cell operating in different operating frequencies of a frequency band). The cells may be allocated contiguously within the operating frequency band without any frequency gap between the two cells in frequency (other than a guard band or the like), for example, if the first serving cell and the second serving cell are configured as an intra-band configuration. Such a configuration may be referred to as intra-band contiguous. It may be still intra-band contiguous, for example, if there is a small frequency gap (e.g., the guard band) between the first serving cell and the second serving cell. The cells may be allocated non-contiguously with a frequency gap (e.g., larger than the guard band) between the two cells, for example, if the first serving cell and the second serving cell are configured as an intra-band configuration. Such a configuration may be referred to as intra-band non-contiguous. The first serving cell and the second serving cell may also operate in different operating frequency bands or inter-band (e.g., the first serving cell and the second serving cell operating in different operating frequency bands). Such a configuration may be referred to as inter-band configuration. The wireless device may receive first control information (e.g., first downlink control information (DCI)) via a first resource (e.g., a first control resource set (coreset)) of the first serving cell, for example, using a first receiving beam. The wireless device may receive second control information (e.g., second DCI) via a second resource (e.g., a second coreset) of the second serving cell using, for example, a second receiving beam. The first receiving beam and the second receiving beam may be the same receiving beam, for example, based on the first serving cell and the second serving cell operating in intra-band. The wireless device may use the same receiving beam to monitor (or receive) signals and information via the first coreset of the first serving cell and the second coreset of the second serving cell.

The wireless device may update (e.g., autonomously) the second receiving beam (e.g., associated with the second coreset) to a third receiving beam. The wireless device may update the second receiving beam to the third receiving beam, for example, if the wireless device receives an activation command (e.g., a MAC CE) updating the first receiving beam (e.g., associated with the first coreset) to the third receiving beam. This updating may reduce signaling overhead/exchange as the base station may not need to send/transmit a second activation command to update the second receiving beam to the third receiving beam. Reduced signaling overhead/exchange may reduce power consumption at the wireless device and/or at the base station. Reduced signaling overhead/exchange may reduce interference to other cells and/or to other wireless devices. In at least some types of communications (e.g., communications by wireless devices compatible with 3GPP Release 16, earlier/later 3GPP releases, and/or any other wireless communication technologies), a wireless device may update the second receiving beam (e.g., associated with the second coreset) to the third receiving beam, for example, if the wireless device receives the activation command updating the first receiving beam (e.g., associated with the first coreset) to the third receiving beam. The wireless device may update the second receiving beam (e.g., associated with the second coreset) to the third receiving beam, for example, based on (or if) a first coreset index of the first coreset and a second coreset index of the second coreset are the same. The configuration parameters may indicate the first coreset index for the first coreset and the second coreset index for the second coreset.

Wireless devices may communicate with one or more base stations via one or more beams. A wireless device may receive a control message (e.g., a control command, an activation command, MAC CE, DCI, etc.) that may cause a change/update of a beam (e.g., a downlink beam, an uplink beam). A base station may configure a cell list (e.g., a simultaneous resource control group, a simultaneous beam update group, a simultaneous TCI-state update list, a simultaneous spatial relation list, etc.) comprising a plurality of cells, and/or a base station may send the cell list to one or more wireless devices, for example, if the plurality of cells share the same beam(s) and operate in a similar channel (e.g., an intra-band). The cells may be added in the same cell list (e.g., a simultaneous resource control group, a simultaneous beam update group, etc.), for example, to reduce signaling overhead (e.g., beam update signaling overhead). A wireless device may receive a control message that updates resource(s) (e.g., a TCI-state of a coreset, an uplink beam for an SRS resource) of a first cell in the cell list. The wireless device may apply the resource change/update (e.g., the TCI-state update, the uplink beam update) to the first cell, for example, based on the control message. The wireless device may apply the resource change/update to a second cell in the cell list, for example, based on the configured cell list. A simultaneous resource control (e.g., a simultaneous beam update, such as the simultaneous TCI-state update across the plurality of cells and the simultaneous uplink beam update across the plurality of cells) may be beneficial (e.g., reducing signaling overhead, increasing resource use efficiencies, etc.). However, the simultaneous resource control across the plurality of cells may not be efficient, for example, if the channel characteristics associated with one or more resources of a second cell are different (e.g., not quasi co-located) from the resource of a first cell indicated by the control message (e.g., different TRPs and different uplink carrier types may have different channel characteristics). For example, one or more cells of the plurality of cells may have a plurality of TRPs and/or other transmission devices/locations. The resource of the first cell indicated by the control message may be associated with a first TRP of the first cell. A simultaneous resource control to one or more resources of a first TRP of the second cell may be efficient, for example, if the first TRP of the first cell and the first TRP of the second cell have similar channel characteristics (e.g., quasi co-located). However, a simultaneous resource control to one or more resources of a second TRP of the second cell may not be efficient (e.g., applying the same TCI state for a coreset of the first TRP of the first cell and a coreset of the second TRP of the second cell may degrade the performance of reception of the downlink signals and increase the likelihood of beam failures), for example, if the first TRP of the first cell and the second TRP of the second cell have different channel characteristics (e.g., not quasi co-located).

A wireless device may be served by multiple transmission and reception points (TRPs) comprising a first TRP and a second TRP. A first location of the first TRP and a second location of the second TRP may be different (e.g., which may be determined based on different channel properties of a first channel between the first TRP and the wireless device and a second channel between the second TRP and the wireless device, and/or the first TRP and the second TRP may not be co-located, and/or the first TRP and the second TRP may not be quasi co-located). The wireless device may use different transmission (and/or receiving) beams to send/transmit to (or receive from) the first TRP and the second TRP, for example, if the first location and the second location are different. The first TRP may send/transmit first DCI via a first coreset of the first cell. The wireless device may receive the first DCI (e.g., from the first TRP), for example, via the first coreset using a first receiving beam. The second TRP may send/transmit second DCI via a second coreset of the second cell. The wireless device may receive the second DCI (e.g., from the second TRP), for example, via the second coreset using a second receiving beam. The first receiving beam used to receive the first DCI via the first coreset and the second receiving beam used to receive the second DCI via the second coreset may be different, for example, based on the first TRP transmitting via the first coreset and the second TRP transmitting via the second coreset. The first coreset index of the first coreset and the second coreset index of the second coreset may be the same. The wireless device may receive an activation command (e.g., MAC CE) changing/updating the first receiving beam (e.g., associated with the first coreset) to a third receiving beam. In at least some types of communications (e.g., communications by wireless devices compatible with 3GPP Release 16, earlier/later 3GPP releases, and/or any other wireless communication technologies), a wireless device may (e.g., autonomously and/or simultaneously) change/update the second receiving beam (e.g., associated with the second coreset) to/for the third receiving beam, for example, after or based on (e.g., in response to) receiving the activation command changing/updating the first receiving beam (e.g., associated with the first coreset) to the third receiving beam. The change/update of the second receiving beam to the third receiving beam may not be efficient, for example, if the wireless device is served by multiple TRPs (e.g., different TRPs) and/or if the first TRP and the second TRP send/transmit via different coresets. The wireless device may not receive DCI (e.g., the second DCI or another DCI) via the second coreset using the third receiving beam. The third receiving beam may correspond (e.g., point and/or be directed) to the first TRP and/or to the direction in which signals from the first TRP are received. The third receiving beam may not correspond (e.g., point and/or be directed) to the second TRP and/or to the direction in which signals from the second TRP are received. The wireless device may not receive (e.g., may miss reception of) the DCI (e.g., the second DCI sent/transmitted from the second TRP), for example, based on using a misaligned beam (e.g., the third receiving beam) not corresponding (e.g., pointing and/or directed) to the second TRP and/or to the direction in which signals from the second TRP are received. Latency/delay may be increased and/or it may take more time to perform a successful data communication. The quantity of retransmissions (e.g., of the second DCI) may be increased, and/or battery/power consumption may be increased (e.g., at the wireless device and/or the base station).

Resource control described herein may provide improved communications (e.g., for a downlink, an uplink, a sidelink, a D2D link, a V2X link and/or any other communication link). A wireless device may improve a likelihood of successful communications with a base station and/or another wireless device by selectively applying a resource control/change/update (e.g., a simultaneous resource control/change/update). For example, the wireless device may determine to apply the resource control/change/update based on one or more conditions and/or parameters (e.g., a coreset pool index, a coreset index, an uplink carrier type, a sounding reference signal index, an antenna panel index, etc.) By selectively applying the resource control/change/update, improved communications may be achieved. Various examples herein describe a procedure for determining whether to change/update a receiving beam of one or more coresets, for example, based on an indication to change/update to a receiving beam of another coreset. A wireless device may determine whether to change/update the receiving beam of one or more coresets, for example, the wireless device being served by multiple TRPs. The wireless device may receive one or more configuration parameters that indicate a first coreset pool index, a first TRP index, and/or a first antenna panel index for a first coreset. The one or more configuration parameters may indicate a second coreset pool index, a second TRP index, and/or a second antenna panel index for a second coreset. The wireless device may (e.g., autonomously and/or simultaneously) change/update a second receiving beam (e.g., associated with the second coreset) to a third receiving beam, for example, if the wireless device receives an activation command (e.g., a MAC CE) indicating a change/update of a first receiving beam (e.g., associated with the first coreset) to the third receiving beam. The wireless device may (e.g., autonomously and/or simultaneously) change/update the second receiving beam (e.g., associated with the second coreset) to the third receiving beam, for example, based on the first coreset pool index and the second coreset pool index being the same. A first coreset index of the first coreset and a second coreset index of the second coreset may be the same. The first coreset pool index and the second coreset pool index being the same may indicate that the same TRP (e.g., either the first TRP or the second TRP) is transmitting control information (e.g., the first DCI and the second DCI) via the first coreset and the second coreset. The first coreset pool index and the second coreset pool index being the same may indicate that the first coreset pool index and the second coreset pool index are associated with the same TRP. The first coreset pool index and the second coreset pool index being different may indicate that different TRPs of different cells in a cell group (e.g., a simultaneous TCI-state update cell group) are sending/transmitting via the first coreset and the second coreset (e.g., the first TRP of a first cell is sending/transmitting first DCI via the first coreset and the second TRP of a second cell is sending/transmitting second DCI via the second coreset). The wireless device may not (e.g., autonomously and/or simultaneously) change/update a second receiving beam (e.g., associated with the second coreset) to a third receiving beam, for example, if the wireless device receives an activation command (e.g., a MAC CE) indicating a change/update of a first receiving beam (e.g., associated with the first coreset) to the third receiving beam. The wireless device may not (e.g., autonomously and/or simultaneously) change/update the second receiving beam (e.g., associated with the second coreset) to the third receiving beam, for example, based on the first coreset pool index and the second coreset pool index being different (e.g., the first coreset pool index being associated with a first TRP and the second coreset pool index being associated with a second TRP). A first coreset index of the first coreset and a second coreset index of the second coreset may be the same. The first coreset pool index and the second coreset pool index being different may indicate that different TRPs are sending/transmitting via the first coreset and the second coreset (e.g., the first TRP is sending/transmitting first DCI via the first coreset and the second TRP is sending/transmitting second DCI via the second coreset).

The coreset pool index for the first coreset and the coreset pool index for the second coreset may be the same. For example, a base station may configure the coreset pool indexes (e.g., a value of the coreset pool indexes) to be the same (e.g., by configuring the same value for the coreset pool indexes) for the first coreset and the second coreset, for example, if the first coreset index of the first coreset and the second coreset index of the second coreset are the same and/or the first coreset and the second coreset are associated with the same TRP (e.g., the first coreset is associated with TRP1 of Cell-1 and the second coreset is associated with TRP1 of Cell-2). The same TRP may send/transmit via the first coreset and the second coreset (e.g., TRP1 of a first cell sends/transmits first DCI via the first coreset, and TRP1 of a second cell sends/transmits second DCI via the second coreset), for example, if the one or more configuration parameters indicate the same value for the coreset pool indexes for the first coreset and the second coreset (e.g., the first coreset pool index and the second coreset pool index are the same). Various examples described herein may provide reduced signalling overhead, reduced retransmissions, and reduced interference. Various examples described herein may provide reduced battery power consumption (e.g., at the wireless device and/or the base station). Various examples described herein may provide reduced delay/latency of data communication. Although wireless device is used as the example device in various examples described herein, one skilled recognizes it can be any device.

Figure 17:
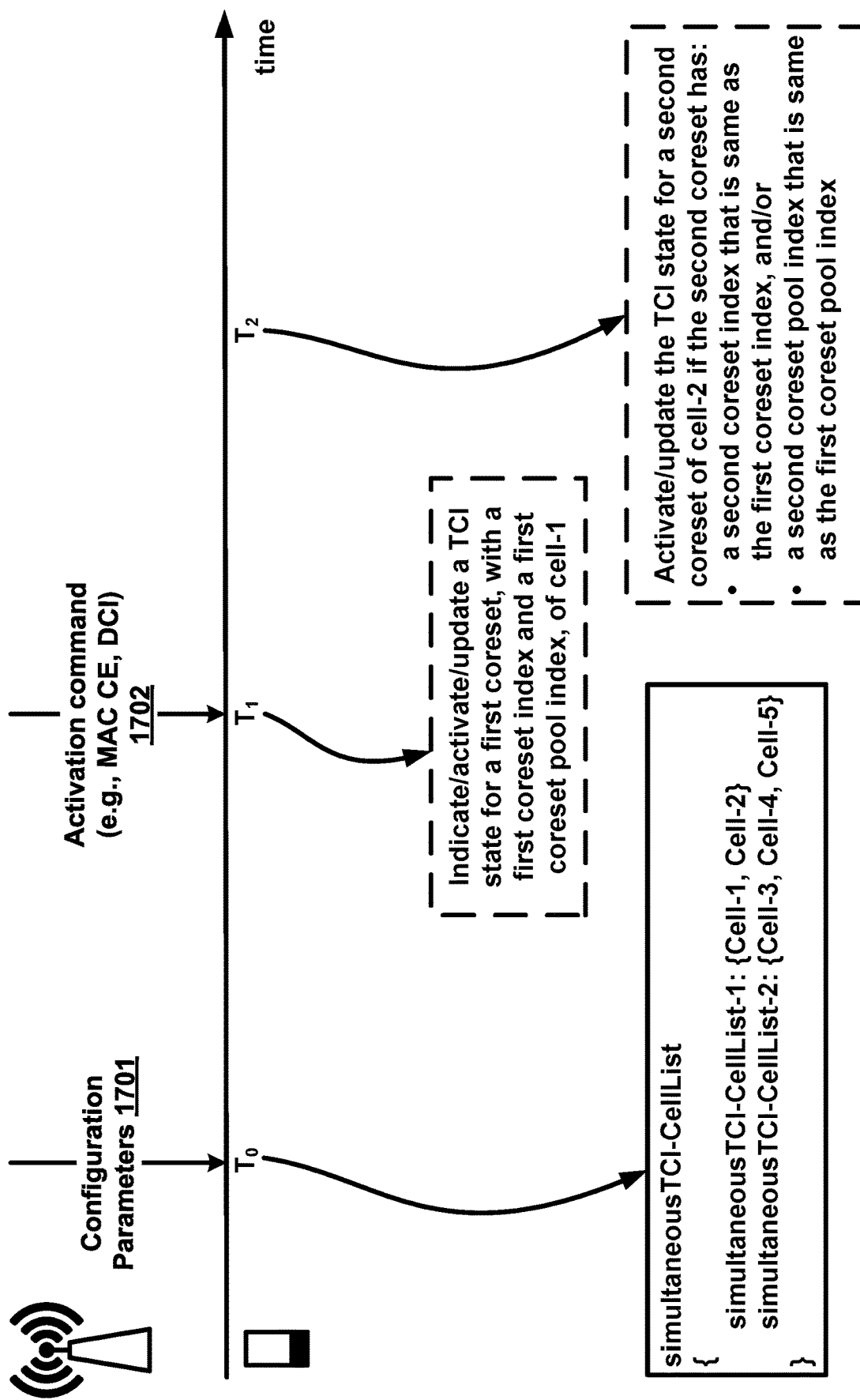
FIG. 17 shows an example of beam management.

FIG. 17 shows an example beam management. A wireless device may receive (e.g., from the base station) one or more messages (e.g., at time T0). The one or more messages may comprise one or more RRC messages, DCI, and/or other types of messages. The one or more messages may comprise one or more configuration parameters 1701. The one or more configuration parameters 1701 may be for a cell. At least one configuration parameter of the one or more configuration parameters 1701 may be for a cell. The cell may be a PCell, SCell, or an SCell configured with PUCCH (e.g., a PUCCH SCell). The cell may be an unlicensed cell (e.g., operating in an unlicensed frequency band). The cell may be a licensed cell (e.g., operating in a licensed frequency band).

The cell may comprise/accommodate a plurality of BWPs. The plurality of BWPs may comprise one or more uplink BWPs comprising an uplink BWP of the cell. The plurality of BWPs may comprise one or more downlink BWPs comprising a downlink BWP of the cell.

A BWP of the plurality of BWPs may be in an active state or an inactive state. The wireless device may monitor a downlink channel/signal (e.g., PDCCH, DCI, CSI-RS, PDSCH) on/for/via a downlink BWP of the one or more downlink BWPs, for example, if the downlink BWP is in an active state. The wireless device may receive a PDSCH transmission via the downlink BWP, for example, if the downlink BWP is in the active state. The wireless device may not monitor a downlink channel/signal (e.g., PDCCH, DCI, CSI-RS, PDSCH) on/for a downlink BWP of the one or more downlink BWPs, for example, if the downlink BWP is in an inactive state. The wireless device may stop monitoring a downlink channel/signal (e.g., PDCCH, DCI, CSI-RS, PDSCH) on/for/via a downlink BWP of the one or more downlink BWPs, for example, if the downlink BWP of the one or more downlink BWPs is in an inactive state. The wireless device may not receive a PDSCH transmission on/via the downlink BWP, for example, if the downlink BWP is in the inactive state. The wireless device may stop receiving a PDSCH on/via a downlink BWP of the one or more downlink BWPs, for example, if the downlink BWP of the one or more downlink BWPs is in an inactive state.

The wireless device may send/transmit an uplink signal (e.g., PUCCH transmission, preamble transmission, PUSCH transmission, PRACH transmission, SRS transmission, etc.) via an uplink BWP of the one or more uplink BWPs, for example, if the uplink BWP is in an active state. The wireless device may not send/transmit an uplink signal (e.g., PUCCH transmission, preamble transmission, PUSCH transmission, PRACH transmission, SRS transmission, etc.) via the uplink BWP, for example, if the uplink BWP is in an inactive state.

The wireless device may activate a downlink BWP of the one or more downlink BWPs of the cell. The activating the downlink BWP may comprise that the wireless device sets the downlink BWP as an active downlink BWP of the cell. The activating the downlink BWP may comprise that the wireless device sets the downlink BWP in the active state. The activating the downlink BWP may comprise switching the downlink BWP from the inactive state to the active state.

The wireless device may activate an uplink BWP of the one or more uplink BWPs of the cell. The activating the uplink BWP may comprise that the wireless device sets the uplink BWP as an active uplink BWP of the cell. The activating the uplink BWP may comprise that the wireless device sets the uplink BWP in the active state. The activating the uplink BWP may comprise switching the uplink BWP from the inactive state to the active state.

The one or more configuration parameters 1701 may be for the downlink BWP of the cell (e.g., the active downlink BWP of the cell). At least one configuration parameter of the one or more configuration parameters 1701 may be for the downlink BWP of the cell (e.g., the active downlink BWP of the cell). The one or more configuration parameters 1701 may be for the uplink BWP of the cell (e.g., the active uplink BWP of the cell). At least one configuration parameter of the one or more configuration parameters 1701 may be for the uplink BWP of the cell (e.g., the active uplink BWP of the cell).

The one or more configuration parameters 1701 (e.g., RRC configuration, RRC reconfiguration, etc.) may indicate one or more cell groups/lists (e.g., one or more simultaneous TCI cell lists) associated with a TCI state change/update. A single indication (e.g., a MAC CE) associated with a TCI state change/update of a cell of a cell group/list may be used/applied for TCI state update of other cells of the cell group/list. The one or more simultaneous TCI cell lists may be indicated by one or more parameters for indicating a simultaneous TCI-state update for a plurality of cells in a cell group (e.g., one or more higher layer parameters, simultaneousTCI-CellList, simultaneousTCI-UpdateList1, SimultaneousTCI-UpdateList2, simultaneousTCI-UpdateList1-r16, simultaneousTCI-UpdateList2-r16, etc.). The one or more simultaneous TCI cell lists may comprise simultaneousTCI-CellList-1 and simultaneousTCI-CellList-2 (e.g., as shown in FIG. 17). Each of the one or more simultaneous TCI cell lists may indicate a list of cells (e.g., serving cells) which can be changed/updated (e.g., simultaneously) for TCI relation with a message (e.g., a MAC CE). The simultaneousTCI-CellList-1 and the simultaneousTCI-CellList-2 may not comprise same serving cells (e.g., as shown in FIG. 17). One or more cells in the list of serving cells may be associated with one or more TRPs and/or associated with one or more coreset pool indexes.

A number/quantity of the one or more simultaneous TCI cell lists may be equal to a value (e.g., 1, 2, 4, or any other value). The one or more configuration parameters 1701 may indicate the value. The value may be fixed, preconfigured, or predefined. The value may be based on a capability of the wireless device (e.g., a wireless device capability, a UE capability). The wireless device may send/transmit (e.g., to the base station) a message (e.g., a wireless device capability message comprising wireless device capability information, a UE capability message comprising UE capability information) indicating the value.

The one or more configuration parameters 1701 may indicate one or more simultaneous TCI cell list indexes (e.g., provided by a higher layer parameter, simultaneousTCI-CellListId) for the one or more simultaneous TCI cell lists. Each simultaneous TCI cell list of the one or more simultaneous TCI cell lists may be identified/determined/indicated by (or may comprise) a respective/corresponding simultaneous TCI cell list index of the one or more simultaneous TCI cell list indexes. A first simultaneous TCI cell list (e.g., simultaneousTCI-CellList-1) of the one or more simultaneous TCI cell lists may be identified/determined/indicated by a first simultaneous TCI cell list index (e.g., 0 or any other value) of the one or more simultaneous TCI cell list indexes. A second simultaneous TCI cell list (e.g., simultaneousTCI-CellList-2) of the one or more simultaneous TCI cell lists may be identified/determined/indicated by a second simultaneous TCI cell list index (e.g., 1 or any other value) of the one or more simultaneous TCI cell list indexes.

The one or more configuration parameters 1701 may indicate a plurality of cells grouped into a simultaneous TCI cell list of the one or more simultaneous TCI cell lists. The simultaneous TCI cell list may indicate/comprise the plurality of cells. The simultaneous TCI cell list indicating/comprising the plurality of cells may comprise/indicate cell indexes (e.g., serving cell indexes provided by a higher layer parameter, ServCellIndex) of the plurality of cells. The one or more configuration parameters 1701 may indicate, for the simultaneous TCI cell list, the cell indexes (e.g., serving cell indexes provided by a higher layer parameter ServCellIndex) of the plurality of cells. Each cell of the plurality of cells may be identified/determined/indicated by a respective/corresponding cell index of the cell indexes. The one or more configuration parameters 1701 may indicate the cell indexes. The simultaneous TCI cell list may comprise simultaneousTCI-CellList-1 (e.g., shown in FIG. 17) comprising/indicating cell indexes of the plurality of cells (e.g., Cell-1 and Cell-2). The simultaneous TCI cell list may comprise simultaneousTCI-CellList-2 (e.g., shown in FIG. 17) comprising/indicating cell indexes of the plurality of cells (e.g., Cell-3, Cell-4 and Cell-5).

The one or more configuration parameters 1701 may be for the plurality of cells in the simultaneous TCI cell list. The simultaneous TCI cell list may be identified/determined/indicated by a simultaneous TCI cell list index (e.g., 0, 1) of the one or more simultaneous TCI cell list indexes.

Cell indexes of the one or more simultaneous TCI cell lists may not overlap (e.g., the simultaneousTCI-CellList-1 and the simultaneousTCI-CellList-2 may not comprise same serving cell(s) as shown in FIG. 17). The same serving cell index may not be comprised in a plurality of simultaneous TCI cell lists. A first simultaneous TCI cell list (e.g., simultaneousTCI-CellList-1 shown in FIG. 17) of the one or more simultaneous TCI cell lists may comprise one or more first cells (e.g., Cell-1, Cell-2 shown in FIG. 17). The one or more simultaneous TCI cell lists, which are not overlapping with each other, may comprise a second simultaneous TCI cell list (e.g., simultaneousTCI-CellList-2 shown in FIG. 17) of the one or more simultaneous TCI cell lists, different from the first simultaneous TCI cell list, that does not comprise the one or more first cells. The second simultaneous TCI cell list (e.g., simultaneousTCI-CellList-2 shown in FIG. 17) may comprise one or more second cells (e.g., Cell-3, Cell-4, Cell-5 shown in FIG. 17) different from the one or more first cells. The one or more simultaneous TCI cell lists, which are not overlapping with each other, may comprise the first simultaneous TCI cell list, different from the second simultaneous TCI cell list, that does not comprise the one or more second cells.

The plurality of cells in the simultaneous TCI cell list may operate in an intra-band (e.g., each cell of the plurality of cells operates at the same frequency, or at similar frequencies, or at substantially close frequencies, e.g., with 5 MHz, 10 MHz, 100 MHz frequency gap). The plurality of cells in the simultaneous TCI cell list may operate in an inter-band (e.g., operate at substantially close frequencies/bands, e.g., with 5 MHz, 10 MHz, 100 MHz, 200 MHz, 400 MHz frequency gap).

The plurality of cells in the simultaneous TCI cell list may comprise/indicate a plurality of cells. The simultaneous TCI cell list may comprise simultaneousTCI-CellList-1 comprising/indicating cell indexes of a first cell (e.g., Cell-1) and a second cell (e.g., Cell-2). The simultaneous TCI cell list may comprise simultaneousTCI-CellList-2 comprising/indicating cell indexes of at least two of: a third cell (e.g., Cell-3), a fourth cell (e.g., Cell-4), or a fifth cell (e.g., Cell-5).

The one or more configuration parameters 1701 may indicate one or more coresets for each of a plurality of cells. The one or more configuration parameters 1701 may indicate one or more first coresets for the first cell (e.g., Cell-1 or any other cell). The one or more first coresets may comprise a first coreset. An active downlink BWP of the first cell may comprise the one or more first coresets. The first cell (e.g., one or more downlink BWPs configured for the first cell) may comprise the one or more first coresets.

The one or more configuration parameters 1701 may indicate one or more first coreset indexes (e.g., provided by a higher layer parameter, ControlResourceSetId) for the one or more first coresets. Each coreset of the one or more first coresets may be identified/determined/indicated by a respective/corresponding coreset index of the one or more first coreset indexes. The first coreset of the one or more first coresets may be identified/determined/indicated by a first coreset index of the one or more first coreset indexes.

The one or more configuration parameters 1701 may indicate one or more second coresets for the second cell (e.g., Cell-2 or any other cell). The one or more second coresets may comprise a second coreset. An active downlink BWP of the second cell may comprise the one or more second coresets. The second cell (e.g., one or more downlink BWPs of the second cell) may comprise the one or more second coresets.

The one or more configuration parameters 1701 may indicate one or more second coreset indexes (e.g., provided by a higher layer parameter, ControlResourceSetId) for the one or more second coresets. Each coreset of the one or more second coresets may be identified/determined/indicated by a respective/corresponding coreset index of the one or more second coreset indexes. The second coreset of the one or more second coresets may be identified/determined/indicated by a second coreset index of the one or more second coreset indexes.

The one or more configuration parameters 1701 may indicate one or more first coreset pool indexes (e.g., provided by a higher layer parameter, CoresetPoolIndex) for the one or more first coresets. Each coreset of the one or more first coresets may comprise (or be configured/indicated by the one or more configuration parameters 1701) by a respective/corresponding coreset pool index of the one or more first coreset pool indexes. The one or more configuration parameters 1701 may indicate, for each coreset of the one or more first coresets, a respective/corresponding coreset pool index of the one or more first coreset pool indexes. The first coreset of the one or more first coresets may comprise (or may be configured with) a first coreset pool index of the one or more first coreset pool indexes. The one or more configuration parameters 1701 may indicate the first coreset pool index for the first coreset. A first coreset pool corresponding to the first coreset pool index may comprise the first coreset. The first coreset pool may comprise one or more coresets associated with a coreset pool index that is associated with (e.g., corresponds to, is equal to) the first coreset pool index (e.g., 0, 1 or any other value indicating a coreset pool index). The one or more configuration parameters 1701 may indicate the first coreset pool index for each coreset of the one or more coresets in the first coreset pool.

The one or more configuration parameters 1701 may indicate one or more second coreset pool indexes (e.g., provided by a higher layer parameter, CoresetPoolIndex) for the one or more second coresets. Each coreset of the one or more second coresets may comprise (or be configured/indicated by the one or more configuration parameters 1701) by a respective/corresponding coreset pool index of the one or more second coreset pool indexes. The one or more configuration parameters 1701 may indicate, for each coreset of the one or more second coresets, a respective/corresponding coreset pool index of the one or more second coreset pool indexes. The second coreset of the one or more second coresets may comprise (or may be configured with) a second coreset pool index of the one or more second coreset pool indexes. The one or more configuration parameters 1701 may indicate the second coreset pool index for the second coreset. A second coreset pool corresponding to the second coreset pool index may comprise the second coreset. The second coreset pool may comprise one or more coresets associated with a coreset pool index that is associated with (e.g., corresponds to, is equal to) the second coreset pool index (e.g., 0, 1 or any other value indicating a coreset pool index). The one or more configuration parameters 1701 may indicate the second coreset pool index for each coreset of the one or more coresets in the second coreset pool.

The one or more configuration parameters 1701 may not indicate a coreset pool index for a coreset. The wireless device may determine a default value for the coreset pool index for the coreset, for example, based on the one or more configuration parameters not indicating the coreset pool index for the coreset. The default value may be equal to zero or any other value indicating a default coreset pool index. The one or more first coresets of the first cell may comprise the coreset. The one or more second coresets of the second cell may comprise the coreset. The first coreset pool may comprise the coreset, for example, if the first coreset pool index is associated with (e.g., indicates, corresponds to, is equal to) the default value for the coreset pool index for the coreset. The second coreset pool may comprise the coreset, for example, if the second coreset pool index is associated with (e.g., indicates, corresponds to, is equal to) the default value for the coreset pool index for the coreset.

A first coreset pool index of a first coreset and a second coreset pool index of a second coreset may be the same. The wireless device may group the first coreset and the second coreset in the same coreset pool, for example, if the first coreset pool index of the first coreset and the second coreset pool index of the second coreset being the same. The first coreset pool and the second coreset pool may be the same, for example, if the first coreset pool index of the first coreset and the second coreset pool index of the second coreset being the same.

A first coreset pool index of a first coreset and a second coreset pool index of a second coreset may be different. The wireless device may group the first coreset and the second coreset in different coreset pools, for example, based on the first coreset pool index of the first coreset and the second coreset pool index of the second coreset being different. The wireless device may group the first coreset in a first coreset pool. The wireless device may group the second coreset in a second coreset pool that is different from the first coreset pool, for example, if the first coreset pool index and the second coreset pool index being different. The first coreset pool and the second coreset pool may be different, for example, if the first coreset pool index of the first coreset and the second coreset pool index of the second coreset being different.

A plurality of TRPs may be configured to communicate with (e.g., send/transmit data to or receive data from) the wireless device. The plurality of TRPs may comprise a first TRP and a second TRP. The first TRP may send/transmit a downlink signal/channel (e.g., PDSCH, PDCCH, DCI, SS/PBCH block, CSI-RS) via a first coreset associated with a first coreset pool index that is associated with (e.g., is indicated by, corresponds to, is equal to) a first value (e.g., zero or any other value indicating the first coreset pool index). A first coreset pool corresponding to the first coreset pool index may comprise the first coreset. The first TRP may not send/transmit a downlink signal/channel (e.g., PDSCH, PDCCH, DCI, SS/PBCH block, CSI-RS) via a second coreset associated with a second coreset pool index (e.g., one or any other value indicating the second coreset pool index) that is different from the first value (e.g., zero or any other value indicating the first coreset pool index). A second coreset pool, different from the first coreset pool, may correspond to the second coreset pool index and may comprise the second coreset. The second TRP may send/transmit a downlink signal/channel (e.g., PDSCH, PDCCH, DCI, SS/PBCH block, CSI-RS) via a second coreset associated with a second coreset pool index that is associated with (e.g., is indicated by, corresponds to, is equal to) a second value (e.g., one or any other value indicating the second coreset pool index). A second coreset pool corresponding to the second coreset pool index may comprise the second coreset. The second TRP may not send/transmit a downlink signal/channel (e.g., PDSCH, PDCCH, DCI, SS/PBCH block, CSI-RS) via a first coreset associated with a first coreset pool index (e.g., zero or any other value indicating the first coreset pool index) that is different from the second value (e.g., one or any other value indicating the second coreset pool index). A first coreset pool, different from the second coreset pool, may correspond to the first coreset pool index and may comprise the first coreset.

A plurality of TRPs may be configured to communicate with (e.g., send/transmit data and/or control information to or receive data and/or control information from) the wireless device. The plurality of TRPs may comprise a first TRP and a second TRP. The first TRP may send/transmit a downlink signal/channel (e.g., PDSCH, PDCCH, DCI, SS/PBCH block, CSI-RS) via a first coreset of a first coreset pool. The first TRP may not send/transmit a downlink signal/channel (e.g., PDSCH, PDCCH, DCI, SS/PBCH block, CSI-RS) via a second coreset in a second coreset pool that is different from the first coreset pool. The second TRP may send/transmit a downlink signal/channel (e.g., PDSCH, PDCCH, DCI, SS/PBCH block, CSI-RS) via a second coreset in a second coreset pool. The second TRP may not send/transmit a downlink signal/channel (e.g., PDSCH, PDCCH, DCI, SS/PBCH block, CSI-RS) via a first coreset of a first coreset pool that is different from the second coreset pool.

The wireless device may receive an activation command 1702 (e.g., a MAC-CE, a TCI State Indication for UE-specific PDCCH MAC CE, DCI, or an RRC message). The wireless device may receive the activation command 1702 (e.g., at time T1), for example, after receiving the one or more configuration parameters 1701. The activation command 1702 may indicate/activate/update a TCI state for a first coreset. The first coreset may be associated with a first coreset index and/or a first coreset pool index. The first coreset may be a coreset of a first cell (e.g., Cell-1). The first coreset may be associated with the first coreset pool index (e.g., the first coreset belongs to a coreset pool corresponding to the first coreset pool index). The activation command 1702 may comprise one or more fields (e.g., as shown in FIG. 18A and FIG. 18B). The wireless device may activate/update a TCI state for a second coreset of a second cell (e.g., Cell-2), for example, based on receiving the activation command 1702. The wireless device may activate/update the TCI state for the second coreset of the second cell (e.g., Cell-2), for example, if one or more conditions are satisfied. The one or more conditions may comprise one or more determinations associated with a coreset index and/or a coreset pool index (e.g., a second coreset index of the second coreset corresponds to a first coreset index of the first coreset associated with the activation command 1702, a second coreset pool index associated with the second coreset corresponds to a first coreset pool index associated with the first coreset associated with the activation command 1702). The one or more conditions may comprise one or more determinations associated with a cell group/list (e.g., whether the first cell associated with activation command 1702 and the second cell are comprised in the same simultaneousTCI-CellList or the same simultaneous TCI-UpdateList).

FIG. 18A and FIG. 18B are examples of a control command for beam management. One or more fields of the control command (e.g., an activation command, MAC CE, DCI, an RRC message, etc.) shown in FIG. 18A or FIG. 18B may be omitted or replaced with one or more other fields (e.g., a serving cell index field). One or more additional fields (e.g., a serving cell index field) may be added in the M control command (e.g., an activation command, MAC CE, DCI, an RRC message, etc.) shown in FIG. 18A or FIG. 18B. An activation command (e.g., the activation command 1702, 1810, 1820) may indicate a TCI state and may have a format comprising one or more fields (e.g., one or more octets as shown in FIG. 18A or FIG. 18B). Each octet may comprise eight bits (or other data units). The activation command may indicate the TCI state via a field, among the one or more fields, of the activation command. The field may comprise a TCI state index (e.g., TCI state ID 1811 shown in FIG. 18A and TCI state ID 1821 shown FIG. 18B) indicating a new TCI state associated with a coreset corresponding to a coreset ID field (e.g., coreset ID 1812 shown in FIG. 18A and coreset ID 1822 shown in FIG. 18B). The one or more configuration parameters (e.g., the one or more configuration parameters 1701) may indicate one or more TCI states comprising the TCI state that may be indicated by the activation command (e.g., the activation command 1702, 1810, 1820). The one or more configuration parameters (e.g., the one or more configuration parameters 1701) may indicate the TCI state index for (or identifying or indicating) the TCI state that may be indicated by the activation command (e.g., the activation command 1702, 1810, 1820).

The TCI state may indicate a reference signal (e.g., CSI-RS, SSB/PBCH block, SRS, DM-RS). The TCI state indicating the reference signal may comprise/indicate a reference signal index associated with (e.g., identifying, indicating, or of) the reference signal.

A field, among the one or more fields, of the activation command (e.g., the activation command 1702, 1810, 1820) may comprise/indicate a coreset index (e.g., Coreset ID 1812 shown in FIG. 18A and coreset ID 1822 shown in FIG. 18B). The coreset index may indicate a coreset associated with the activation command. The coreset index may be the first coreset index of the first coreset of the first cell (e.g., Cell-1 or other cells). The activation command may indicate the first coreset, for example, based on the coreset index being associated with (e.g., indicating, corresponding to, being equal to) the first coreset index. The coreset index of the coreset may be the second coreset index of the second coreset of the second cell (e.g., Cell-2 or other cells). The activation command (e.g., the activation command 1702, 1810, 1820) may indicate the second coreset, for example, based on the coreset index being associated with (e.g., indicating, corresponding to, being equal to) the second coreset index.

A field, among the one or more fields, of the activation command (e.g., the activation command 1702, 1810, 1820) may comprise a cell index (e.g., ServCellIndex) of a cell that is associated with the activation command. The cell index may indicate/identify the cell among the plurality of cells. The cell index of the cell may be associated with (e.g., indicate, correspond to, be equal to) a first cell index of the first cell. The cell indexes of the plurality of cells may comprise the first cell index. The wireless device may determine that the activation command is associated with (e.g., for) the first cell, for example, based on the cell index being associated with (e.g., indicating, corresponding to, being equal to) the first cell index. The activation command may indicate the first cell. The activation command may indicate the first cell, for example, based on the cell index being associated with (e.g., indicating, corresponding to, being equal to) the first cell index.

The activation command (e.g., the activation command 1702, 1810, 1820) may indicate the simultaneous TCI cell list. The activation command indicating the simultaneous TCI cell list may comprise a field, among the one or more fields, of the activation command comprising/indicating a simultaneous TCI cell list index (e.g., a CC list ID 1813 shown in FIG. 18A and a CC list ID 1823 shown FIG. 18B) identifying/indicating the simultaneous TCI cell list. A serving cell index field indicating a serving cell index (e.g., ServCellIndex) may be added in the activation command (e.g., the activation command 1702, 1810, 1820). A serving cell index field indicating a serving cell index (e.g., ServCellIndex) may replace the simultaneous TCI cell list index field (e.g., the CC list ID 1813 shown in FIG. 18A and a CC list ID 1823 shown FIG. 18B). The serving cell index (e.g., Cell-1) indicated by the serving cell index field may implicitly indicate the simultaneous TCI cell list index associated with the serving cell index (e.g., Cell-1) and may indicate that the activation command can be applied to all cells (e.g., Cell-1 and Cell-2) associated with the simultaneous TCI cell list index (e.g., simultaneousTCI-CellList-1 indicating Cell-1 and Cell-2).

The activation command (e.g., the activation command 1702, 1820) may indicate a coreset pool. The activation command indicating the coreset pool may comprise a field, among the one or more fields, of the activation command comprising/indicating a coreset pool index (e.g., Coreset Pool ID 1824 shown in FIG. 18B) associated with (e.g., indicating, corresponding to, or of) the coreset pool. The coreset pool index associated with (e.g., indicating, corresponding to, or of) the coreset pool may comprise/indicate one or more coresets associated with the coreset pool index (e.g., one or more coresets comprised in the coreset pool). The one or more configuration parameters (e.g., the one or more configuration parameters 1701) may indicate the coreset pool index for the one or more coresets in the coreset pool. The field of the activation command may comprise/indicate the coreset pool index.

The coreset pool index in the field of the activation command may be associated with (e.g., indicate, correspond to, be equal to) the first coreset pool index of the first coreset of the first cell. The wireless device may determine that the coreset pool corresponds to the first coreset pool comprising the first coreset, for example, based on the coreset pool index being associated with (e.g., corresponding to, being equal to) the first coreset pool index. The activation command may indicate the first coreset pool, for example, if coreset pool index being associated with (e.g., corresponding to, being equal to) the first coreset pool index.

The coreset pool index in the field of the activation command may be associated with (e.g., indicate, be set to, correspond to, be equal to) a default value, for example, based on the number/quantity of TRPs of a cell being equal to one (e.g., each of a plurality of cells comprises no more than a single TRP). The coreset pool index in the field of the activation command may be associated with (e.g., indicate, be set to, correspond to, be equal to) a default value, for example, based on a number/quantity of configured values for coreset pool indexes being equal to one (e.g., a single coreset pool index is configured). The default value may be zero or any other default value.

A field, among the one or more fields, of the activation command may indicate reserved bits (e.g., an R field 1815 shown in FIG. 18A and an R field 1825 shown in FIG. 18B). A number/quantity of bits in the field (e.g., one or more R fields) indicating the reserved bits may be, for example, based on a number/quantity of TRPs associated with (e.g., communicating with, serving) the wireless device. The number/quantity of the bits in the field indicating the reserved bits may be a first value (e.g., 4 bits for the R field 1815 as shown in in FIG. 18A or any other number/quantity of bits), for example, if the number/quantity of TRPs is equal to one. The activation command may not comprise a field indicating a coreset pool (e.g., no Coreset Pool ID in the activation command 1810 shown in FIG. 18A), for example, if the number/quantity of TRPs is equal to one. The activation command may not comprise a field comprising a coreset pool index (e.g., no Coreset Pool ID in the activation command 1810 shown in FIG. 18A), for example, if the number/quantity of TRPs is equal to one. The number/quantity of the bits in the field indicating the reserved bits may be a second value (e.g., 3 bits for the R field 1825 as shown in in FIG. 18B), for example, if the number/quantity of TRPs is equal to two or more. The activation command may comprise a field indicating a coreset pool (e.g., Coreset Pool ID 1824 as shown in FIG. 18B), for example, if the number/quantity of TRPs is equal to two or more. The activation command may comprise a field comprising a coreset pool index (e.g., Coreset Pool ID 1824 as shown in FIG. 18B), for example, if the number/quantity of TRPs is equal to two or more. The activation command may comprise a field comprising a coreset pool index (e.g., Coreset Pool ID 1824 as shown in FIG. 18B), for example, if the number/quantity of TRPs is equal to one. The field comprising a coreset pool index (e.g., Coreset Pool ID 1824 as shown in FIG. 18B) may indicate a default value for a default coreset pool index, for example, if the number/quantity of TRPs is equal to one.

A number/quantity of bits in the field (e.g., one or more R fields) indicating the reserved bits may be, for example, based on a number/quantity of different values for coreset pool indexes. The number/quantity of different values for coreset pool indexes may be one, for example, if the wireless device is associated with (e.g., configured to communicate with, served by) a single TRP. The number/quantity of different values for coreset pool indexes may be one, for example, based on the one or more configuration parameters not indicating a plurality of coreset pool indexes for one or more coresets of the plurality of cells. The one or more coresets may comprise the one or more first coresets of the first cell and the one or more second coresets of the second cell. The first set of coresets may be associated with a first cell and the second set of coresets may be associated with a second cell. The number/quantity of different values for coreset pool indexes may be one, for example, based on the one or more configuration parameters indicating a same coreset pool index (e.g., a single coreset pool index) for the one or more coresets of the plurality of cells. The number/quantity of different values for coreset pool indexes may be one, for example, based on a value of a coreset pool index being the same for the one or more coresets of the plurality of cells. The number/quantity of the bits in the field indicating the reserved bits may be a first value (e.g., 4 bits for the R field 1815 as shown in FIG. 18A), for example, if the number/quantity of different values for coreset pool indexes is equal to one. The activation command may not comprise a field indicating a coreset pool (e.g., no Coreset Pool ID comprised in the activation command 1810 shown in FIG. 18A), for example, if the number/quantity of different values for coreset pool indexes is equal to one. The activation command may not comprise a field comprising a coreset pool index (e.g., no Coreset Pool ID comprised in the activation command 1810 shown in FIG. 18A), for example, if the number/quantity of different values for coreset pool indexes is equal to one.

The number/quantity of different values for coreset pool indexes may be two or more, for example, if the one or more configuration parameters indicating a first value for a coreset pool index of a first set of coresets and a second value for a coreset pool index of a second set of coresets. The first set of coresets may be associated with a first cell and the second set of coresets may be associated with a second cell. The first value may be different from the second value. The one or more coresets of the plurality of cells may comprise the first set of coresets and the second set of coresets. The number/quantity of different values for coreset pool indexes may be two or more, for example, based on a first value for a coreset pool index of a first set of coresets being different from a second value for a coreset pool index of a second set of coresets. The number/quantity of the bits in the field indicating the reserved bits may be a second value (e.g., 3 bits for the R field 1825 shown in FIG. 18B), for example, if the number/quantity of different values for coreset pool indexes is equal to two or more. The activation command may comprise a field indicating a coreset pool (e.g., Coreset Pool ID 1824 shown in FIG. 18B), for example, if the number/quantity of different values for coreset pool indexes is equal to two or more. The activation command may comprise a field comprising a coreset pool index (e.g., Coreset Pool ID 1824 shown in FIG. 18B), for example, if the number/quantity of different values for coreset pool indexes is equal to two or more.

The one or more configuration parameters may indicate at least two coreset pool indexes (e.g., 0, 1 and/or any other values) (e.g., for a higher layer parameter, CORESET-PoolIndex). The one or more configuration parameters may comprise the higher layer parameter, CORESETPoolIndex, configured with (or set to) the at least two coreset pool indexes. The at least two coreset pool indexes may comprise a first coreset pool index (e.g., 0 or any other value for indicating the first coreset pool index) for a first set of coresets of the plurality of cells. The at least two coreset pool indexes may comprise a second coreset pool index (e.g., 1 or any other value for indicating the second coreset pool index), different from the first coreset pool index, for a second set of coresets of the plurality of cells. The first set of coresets may further comprise a third set of coresets without a value for a higher layer parameter, CORESET-PoolIndex, (e.g., the third set of coresets not configured with a coreset pool index). The one or more configuration parameters may not comprise the higher layer parameter, CORESETPoolIndex, for the third set of coresets.

The activation command may comprise a field indicating a coreset pool (e.g., Coreset Pool ID 1824 shown in FIG. 18B), for example, based on the one or more configuration parameters indicating the at least two coreset pool indexes. The activation command may comprise a field comprising a coreset pool index (e.g., Coreset Pool ID 1824 shown in FIG. 18B), based on the one or more configuration parameters indicating the at least two coreset pool indexes.

The wireless device may apply/use/update the TCI state to/for the first coreset, for example, based on the receiving the activation command. The applying/using/updating the TCI state to the first coreset may be, for example, based on the field in the activation command indicating the first coreset and/or the TCI state. The applying/using/updating the TCI state to the first coreset may be, for example, based on the field in the activation command indicating the first cell comprising the first coreset. The applying/using/updating the TCI state to the first coreset may be, for example, based on the field in the activation command indicating the simultaneous TCI cell list comprising the first cell, and/or the first cell comprising the first coreset. The applying/using/updating the TCI state to the first coreset may be, for example, based on the field in the activation command indicating the first coreset pool comprising the first coreset. The applying/using/updating the TCI state to the first coreset may be, for example, based on the coreset pool index in the field of the activation command being associated with (e.g., indicating, corresponding to, being equal to) the first coreset pool index of the first coreset.

The applying/using/updating the TCI state to the first coreset may comprise applying/using/updating an antenna port quasi co-location indicated by the TCI state to the first coreset. The applying/using/updating the antenna port quasi co-location indicated by the TCI state to the first coreset may be, for example, based on one or more DM-RS antenna ports of downlink control channels in the first coreset being quasi co-located with the reference signal indicated by the TCI state.

The wireless device may monitor downlink control channels, for DCI, in/on/via the second coreset of the second cell, for example, based on a second TCI state. The second TCI state may indicate a second reference signal. The one or more configuration parameters may indicate the second TCI state for the second coreset. The wireless device may receive a second activation command (e.g., TCI State Indication for UE-specific PDCCH MAC CE) activating/selecting/indicating the second TCI state for the second coreset. The monitoring the downlink control channels, for the DCI, in the second coreset may be, for example, based on one or more DM-RS antenna ports of the downlink control channels in the second coreset being quasi co-located with the second reference signal indicated by the second TCI state.

The wireless device may determine whether the first coreset pool index of the first coreset and the second coreset pool index of the second coreset are the same or not. The determining whether the first coreset pool index of the first coreset and the second coreset pool index of the second coreset are the same or not may be, for example, based on (or in response to) the receiving the activation command. The determining whether the first coreset pool index of the first coreset and the second coreset pool index of the second coreset are the same or not may be, for example, based on the applying/using/updating the TCI state to the first coreset.

The wireless device may determine that the first coreset pool index of the first coreset and the second coreset pool index of the second coreset are the same. The wireless device may apply/use/update the TCI state to/for the second coreset of the second cell (e.g., at time T2 shown in FIG. 17), for example, based on the determining that the first coreset pool index and the second coreset pool index are the same.

The applying/using/updating the TCI state to the second coreset may comprise applying/using/updating an antenna port quasi co-location indicated by the TCI state to the second coreset. The applying/using/updating the antenna port quasi co-location indicated by the TCI state to the second coreset may be, for example, based on one or more DM-RS antenna ports of downlink control channels in the second coreset being quasi co-located with the reference signal indicated by the TCI state. The applying/using/updating the TCI state to the second coreset of the second cell may comprise overwriting (or overriding or replacing) the second TCI state of the second coreset with the TCI state. The first coreset index of the first coreset and the second coreset index of the second coreset may be the same. The applying/using/updating the TCI state to the second coreset of the second cell may be, for example, based on the first coreset index of the first coreset and the second coreset index of the second coreset are the same.

The wireless device may determine coreset indexes of a plurality of coresets of a plurality of cells in a cell group/list, for example, for applying/using/updating TCI state(s). The wireless device may determine coreset indexes of a plurality of coresets of a plurality of cells in a cell group/list, for example, based on a TCI state indication of an activation command A first cell and a second cell may belong to the same cell group/list, for example, for TCI state changes/updates based on the same activation command. The first cell may comprise the first coreset, and the second cell may comprise the second coreset. The wireless device may determine that the first coreset index of the first coreset and the second coreset index of the second coreset are the same. The wireless device may determine that the first coreset pool index of the first coreset and the second coreset pool index of the second coreset are the same. The wireless device may apply/use/update the TCI state (e.g., indicated by the activation command) to/for the second coreset of the second cell (e.g., at time T2 shown in FIG. 17), for example, based on the determining that the first coreset index and the second coreset index are the same and/or based on the determining that the first coreset pool index and the second pool coreset index are the same.

The wireless device may determine that the first coreset index of the first coreset and the second coreset index of the second coreset are different. The wireless device may determine that the first coreset pool index of the first coreset and the second coreset pool index of the second coreset are different. The wireless device may not apply/use/update the TCI state (e.g., indicated by the activation command) to/for the second coreset of the second cell, for example, based on the determining that the first coreset index and the second coreset index are different and/or based on the determining that the first coreset pool index and the second coreset pool index are different.

The wireless device may apply/use/update the TCI state to/for the first coreset, for example, based on the activation command. The wireless device may not apply/use/update the TCI state to/for the second coreset, for example, based on the activation command and based on the first coreset index and the second coreset index being different and/or the first coreset pool index and the second coreset pool index being different. The not applying/using/updating the TCI state to the second coreset may comprise not applying/using/updating an antenna port quasi co-location indicated by the TCI state to the second coreset. The not applying/using/updating the TCI state may comprise that one or more DM-RS antenna ports of downlink control channels in the second coreset are quasi co-located with the second reference signal indicated by the second TCI state. The not applying/using/updating the TCI state may comprise that one or more DM-RS antenna ports of downlink control channels in the second coreset are not quasi co-located with the reference signal indicated by the TCI state. The wireless device may keep monitoring the downlink control channels, for the DCI, in the second coreset based on the second TCI state, for example, after or in response to receiving the activation command indicating the TCI state change/update. The wireless device may keep monitoring the downlink control channels, for the DCI, in the second coreset based on the second TCI state, for example, based on the determining that the first coreset pool index and the second coreset pool index are different. The first coreset index of the first coreset and the second coreset index of the second coreset may be the same.

The one or more configuration parameters may comprise/indicate one or more TCI state parameters. The one or more TCI state parameters may comprise a parameter that enables a TCI state update for one or more coresets (e.g., enableTCIupdateforCoreset) and/or a parameter that enables a TCI state update for one or more PDCCHs (e.g., enableTCIupdateforPDCCH). The one or more TCI state parameters may be used for a simultaneous TCI state update across a plurality of cells (e.g., a plurality of cells in the cell group/list). The one or more TCI state parameters may comprise a simultaneous TCI state update parameter (e.g., enableTCIupdateforCoreset, enableTCIupdateforPDCCH, simultaneousTCI-CellList, and the like).

The wireless device may apply/use/update the TCI state to/for the second coreset of the second cell (e.g., at time T2 shown in FIG. 17), for example, based on determining that the first coreset pool index and the second coreset pool index are the same. The wireless device may determine that the first coreset index of the first coreset and the second coreset index of the second coreset are the same. The wireless device may apply/use/update the TCI state to/for the second coreset of the second cell (e.g., at time T2 shown in FIG. 17), for example, based on the determining that the first coreset index and the second coreset index are the same and based on determining that the first coreset pool index and the second coreset pool index are the same. The applying/using/updating the TCI state to the second coreset may be further based on the one or more configuration parameters comprising/indicating the simultaneous TCI state update parameter (e.g., enableTCIupdateforCoreset, enableTCIupdateforPDCCH, simultaneousTCI-CellList, and the like). The applying/using/updating the TCI state to the second coreset may be further based on the one or more configuration parameters indicating the one or more simultaneous TCI cell lists.

The one or more configuration parameters may not comprise/indicate one or more TCI state parameters, such as the simultaneous TCI state update parameter (e.g., enableTCIupdateforCoreset, enableTCIupdateforPDCCH, simultaneousTCI-CellList, and the like). The wireless device may not apply/use/update the TCI state to/for the second coreset of the second cell, for example, based on the one or more configuration parameters not comprising/indicating the one or more TCI state parameters, such as the simultaneous TCI state update parameter (e.g., enableTCIupdateforCoreset, enableTCIupdateforPDCCH, simultaneousTCI-CellList, and the like). The wireless device may apply/use/update the TCI state to/for the first coreset of the first cell, for example, based on the activation command. The first coreset index of the first coreset and the second coreset index of the second coreset may be the same.

The one or more configuration parameters (e.g., RRC configuration, RRC reconfiguration, etc.) may not indicate one or more simultaneous TCI cell lists (e.g., by a higher layer parameter, simultaneousTCI-CellList). The wireless device may not apply/use/update the TCI state to/for the second coreset of the second cell, for example, based on the one or more configuration parameters not indicating the one or more simultaneous TCI cell lists. The wireless device may apply/use/update the TCI state to/for the first coreset of the first cell, for example, based on the activation command. The first coreset index of the first coreset and the second coreset index of the second coreset may be the same.

The coreset pool index (e.g., the coreset pool ID 1824) in the field of the activation command (e.g., the activation command 1820) may be associated with (e.g., indicate, correspond to, be equal to) the second coreset pool index of the second coreset of the second cell. The coreset pool and the second coreset pool comprising the second coreset may be the same, for example, based on the coreset pool index being equal to the second coreset pool index. The activation command may indicate the second coreset pool, for example, based on the coreset pool index being associated with (e.g., indicating, corresponding to, being equal to) the second coreset pool index.

The wireless device may apply/use/update the TCI state to/for the second coreset, for example, based on the receiving the activation command. The applying/using/updating the TCI state to the second coreset may be, for example, based on the field in the activation command indicating the second coreset. The applying/using/updating the TCI state to the second coreset may be, for example, based on the field in the activation command indicating the simultaneous TCI cell list comprising the second cell and the second cell comprising the second coreset. The applying/using/updating the TCI state to the second coreset may be, for example, based on the field in the activation command indicating the second coreset pool comprising the second coreset. The applying/using/updating the TCI state to the second coreset may be, for example, based on the coreset pool index in the field of the activation command being associated with (e.g., indicating, corresponding to, being equal to) the second coreset pool index of the second coreset.

The coreset pool index (e.g., the coreset pool ID 1824) in the field of the activation command (e.g., the activation command 1820) may be different from the second coreset pool index of the second coreset of the second cell. The coreset pool and the second coreset pool comprising the second coreset may be different, for example, based on the coreset pool index being different from the second coreset pool index. The activation command may not indicate the second coreset pool, for example, based on the coreset pool index being different from the second coreset pool index.

The wireless device may not apply/use/update the TCI state to/for the second coreset. The wireless device may not apply/use/update the TCI state to/for the second coreset, for example, based on the receiving the activation command. The wireless device may not apply/use/apply the TCI state to the second coreset, for example, if the wireless device receives the activation command and determines that the activation command is not associated with the second coreset. The wireless device may not apply/use/update the TCI state to/for the second coreset, for example, based on the field in the activation command not indicating the second coreset pool comprising the second coreset. The wireless device may not apply/use/update the TCI state to/for the second coreset, for example, based on the coreset pool index in the field of the activation command being different from the second coreset pool index of the second coreset.

The one or more configuration parameters may comprise/indicate one or more TCI state parameters. The one or more TCI state parameter may comprise a TCI state parameter that enables a TCI update for one or more coreset pools. The one or more TCI state parameters may be used for coreset pools of a plurality of cells in a cell group/list. The one or more TCI state parameters may comprise a simultaneous TCI state update parameter (e.g., enableTCIupdateforCoresetPool and the like) that may enable a TCI state update for one or more coreset pools. The simultaneous TCI state update parameter (e.g., enableTCIupdateforCoresetPool and the like) that may enable a TCI state update for one or more coreset pools of a plurality of cells in a cell group/list. The wireless device may apply/use/update the TCI state to/for coresets with the same coreset index, for example, based on the one or more configuration parameters comprising/indicating the simultaneous TCI state update parameter. The wireless device may apply/use/update the TCI state to/for coresets within the same coreset pool, for example, based on the one or more configuration parameters comprising/indicating the simultaneous TCI state update parameter.

The one or more configuration parameters may comprise/indicate the simultaneous TCI state update parameter. The wireless device may not apply/use/update the TCI state to/for coresets with the same coreset index, for example, if the coresets belong a different coreset pool. The wireless device may not apply/use/update the TCI state to/for coresets within the same coreset pool, for example, if the coresets have a coreset index different from the coreset index indicated by the activation command.

The wireless device may apply/use/update the TCI state to/for the second coreset, for example, based on the one or more configuration parameters comprising/indicating the simultaneous TCI state update parameter. The first coreset pool index and the second coreset pool index may be the same. The first coreset pool index and the second coreset pool index may be different.

The wireless device may not apply/use/update the TCI state to/for the second coreset, for example, based on the first coreset pool index and the second coreset pool index being different and/or the first coreset pool index and the second coreset pool index being different. The first coreset pool index and the second coreset pool index may be the same. The first coreset pool index and the second coreset pool index may be different.

The one or more configuration parameters may not comprise/indicate a simultaneous TCI state update parameter (e.g., enableTCIupdateforCoresetPool and the like). The wireless device may apply/use/update the TCI state to/for the second coreset, for example, if the one or more configuration parameters does not comprise/indicate the simultaneous TCI state update parameter. The first coreset pool index and the second coreset pool index may be the same. The first coreset pool index and the second coreset pool index may be different.

The wireless device may not apply/use/update the TCI state to/for the second coreset, for example, based on the one or more configuration parameters not comprising/indicating the simultaneous TCI state update parameter. The first coreset pool index and the second coreset pool index may be the same. The first coreset pool index and the second coreset pool index may be different.

The wireless device may send/transmit (e.g., to the base station) a message, such as a capability message (e.g., wireless device capability message comprising wireless device capability information, UE capability message comprising UE capability information), indicating/comprising a simultaneous TCI state update parameter (e.g., enableTCIupdateforCoresetPool and the like). The base station may send/transmit the one or more configuration parameters comprising the simultaneous TCI state update parameter, for example, based on receiving the message (e.g., wireless device capability message comprising wireless device capability information, UE capability message comprising UE capability information).

The wireless device may apply/use/update the TCI state to/for coresets with the same coreset index, for example, based on the sending/transmitting the message comprising/indicating the simultaneous TCI state update parameter. The wireless device may apply/use/update the TCI state to/for coresets within the same coreset pool, for example, based on the sending/transmitting the message comprising/indicating the simultaneous TCI state update parameter.

The wireless device may send/transmit the message comprising/indicating the simultaneous TCI state update parameter, and the wireless device may not apply/use/update the TCI state to/for coresets with the same coreset index, for example, based on one or more conditions. The wireless device may not apply/use/update the TCI state to/for coresets within the same coreset pool, for example, based on one or more conditions.

The wireless device may apply/use/update the TCI state to/for the second coreset, for example, based on the sending/transmitting the message comprising/indicating the simultaneous TCI state update parameter. The first coreset pool index and the second coreset pool index may be the same. The first coreset pool index and the second coreset pool index may be different.

The wireless device may send/transmit the message comprising/indicating the simultaneous TCI state update parameter, and the wireless device may not apply/use/update the TCI state to/for the second coreset. The first coreset pool index and the second coreset pool index may be the same. The first coreset pool index and the second coreset pool index may be different.

The wireless device may send/transmit (e.g., to the base station) a message, such as a capability message (e.g., a wireless device capability message comprising wireless device capability information, a UE capability message comprising UE capability information). The message may not indicate/comprise a simultaneous TCI state update parameter (e.g., enableTCIupdateforCoresetPool and the like).

The wireless device may apply/use/update the TCI state to/for the second coreset, for example, if the message does not comprise/indicate the simultaneous TCI state update parameter. The first coreset pool index and the second coreset pool index may be the same. The first coreset pool index and the second coreset pool index may be different.

The wireless device may not apply/use/update the TCI state to/for the second coreset, for example, based on the message not comprising/indicating the simultaneous TCI state update parameter. The first coreset pool index and the second coreset pool index may be the same. The first coreset pool index and the second coreset pool index may be different.

Figure 19:
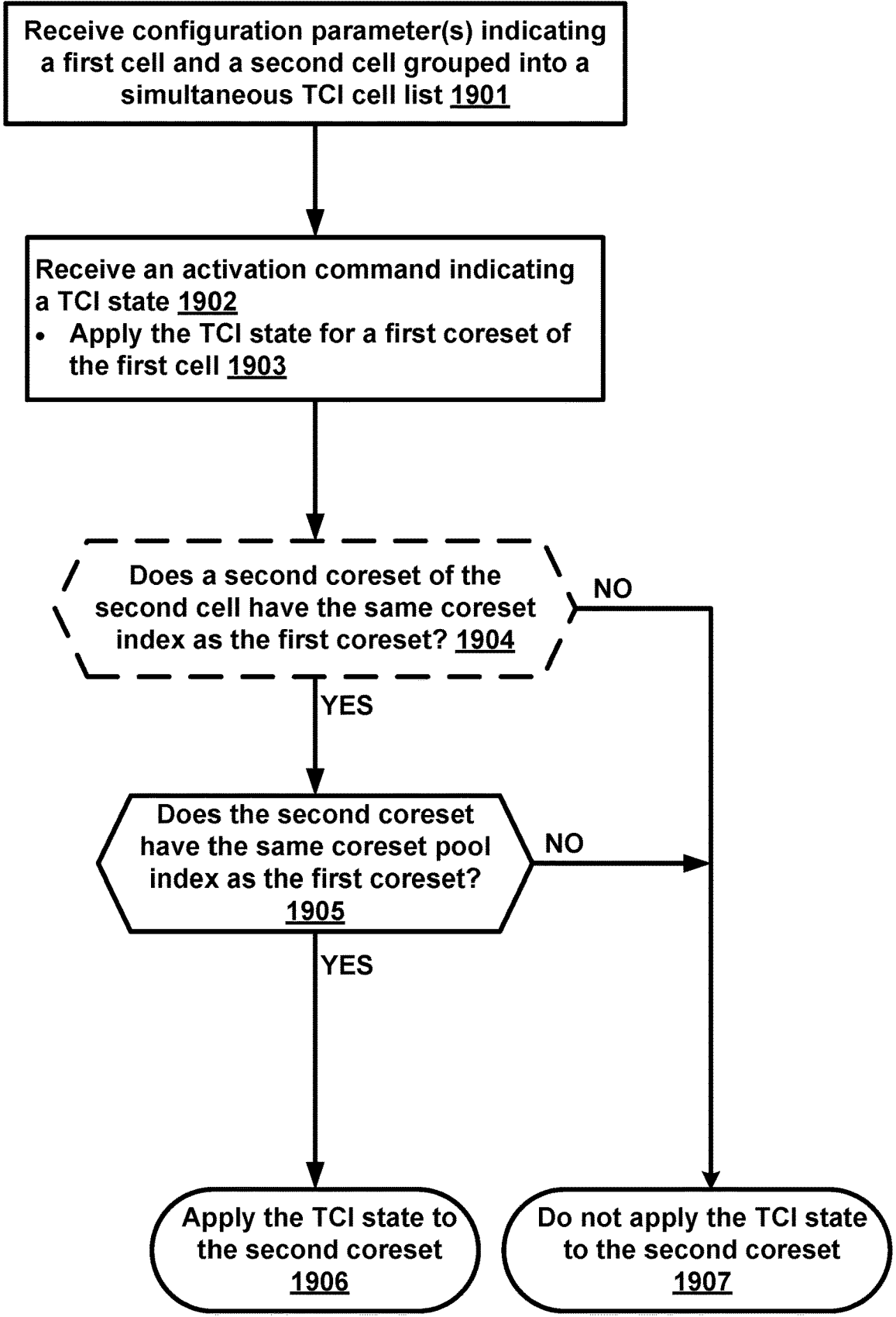
FIG. 19 shows an example method for performing beam management.

FIG. 19 shows an example method for performing beam management. One or more steps may be performed in different orders, may be omitted, and/or may be replaced with other steps. A wireless device may receive (e.g., from a base station) one or more messages (e.g., at step 1901). The one or more messages may comprise one or more configuration parameters. The one or more configuration parameters may indicate a plurality of cells grouped into a cell group/list (e.g., a cell group/list associated with a simultaneous TCI cell list or a simultaneous TCI update list). The plurality of cells (e.g., a plurality of cells in the simultaneous TCI cell list or the simultaneous TCI update list) may comprise a first cell and a second cell.

The one or more configuration parameters may indicate a first coreset for the first cell. The one or more configuration parameters may indicate a first coreset pool index for the first coreset. The one or more configuration parameters may not indicate a coreset pool index for the first coreset. The wireless device may determine a default value (e.g., zero) for the first coreset pool index of the first coreset, for example, based on the one or more configuration parameters not indicating the coreset pool index for the first coreset. A first value (e.g., zero or any other value) for the first coreset pool index may indicate a first TRP of the first cell (e.g., TRP1 of Cell-1). A second value (e.g., one or any other value) for the first coreset pool index may indicate a second TRP of the first cell (e.g., TRP2 of Cell-1).

The one or more configuration parameters may indicate a second coreset for the second cell.

The one or more configuration parameters may indicate a second coreset pool index for the second coreset. The one or more configuration parameters may not indicate a coreset pool index for the second coreset. The wireless device may determine a default value (e.g., zero) for the second coreset pool index of the second coreset, for example, based on the one or more configuration parameters not indicating the coreset pool index for the second coreset. A first value (e.g., zero or any other value) for the second coreset pool index may indicate a first TRP of the second cell (e.g., TRP1 of Cell-2). A second value (e.g., one or any other value) for the second coreset pool index may indicate a second TRP of the second cell (e.g., TRP2 of Cell-2).

The one or more configuration parameters may indicate a first coreset index for (or identifying) the first coreset. The one or more configuration parameters may indicate a second coreset index for (or identifying) the second coreset. The first coreset index and the second coreset index may be the same.

The wireless device may receive an activation command (e.g., at step 1902). The activation command may indicate a TCI state (e.g., a TCI state for a cell or a TCI state for a plurality of cells in a cell group/list). The activation command may indicate the simultaneous TCI cell list. The activation command may indicate at least one of: the first coreset pool index and/or the first coreset pool. The wireless device may apply/use/update the TCI state to/for the first coreset (e.g., at step 1903), for example, based on the receiving the activation command.

The activation command may comprise a field comprising a coreset pool index. The wireless device may apply/use/update the TCI state to/for the first coreset, for example, based on the coreset pool index of the field of the activation command being associated with (e.g., corresponding to, indicating, being equal to) the first coreset pool index of the first coreset.

The activation command may comprise a field comprising a coreset index. The wireless device may apply/use/update the TCI state to/for the first coreset, for example, based on the coreset index of the field of the activation command being associated with (e.g., corresponding to, being equal to, indicating) the first coreset index of the first coreset.

The wireless device may determine whether the first coreset pool index and the second coreset pool index are the same (e.g., at step 1905). The wireless device may determine that the first coreset pool index and the second coreset pool index are the same. The wireless device may apply/use/update the TCI state to/for the second coreset (e.g., at step 1906), for example, based on the determining that the first coreset pool index and the second coreset pool index are the same. The wireless device may determine whether the first coreset index and the second coreset index are the same (e.g., at step 1904). The wireless device may apply/use/update the TCI state to the second coreset, for example, further based on determining that the first coreset index and the second coreset index are the same.

The wireless device may determine that the first coreset pool index and the second coreset pool index are different. The wireless device may not apply/use/update the TCI state to/for the second coreset (e.g., at step 1907), for example, based on the determining that the first coreset pool index and the second coreset pool index are different. The first coreset index and the second coreset index may be the same or may be different.

The wireless device may not apply/use/update the TCI state to/for the second coreset, for example, based on a coreset pool index of the activation command. The wireless device may not apply/use/update the TCI state to/for the second coreset, for example, based on the coreset pool index of the field of the activation command being different from (or not indicating) the second coreset pool index of the second coreset. The coreset index of the field of the activation command may be associated with (e.g., correspond to, be equal to, indicate) the second coreset index of the second coreset. The coreset index of the field of the activation command may not be associated with (e.g., not correspond to, not be equal to, not indicate) the second coreset index of the second coreset.

The wireless device may not apply/use/update the TCI state to/for the second coreset, for example, based on a coreset index of the activation command. The wireless device may not apply/use/update the TCI state to/for the second coreset (e.g., at step 1907), for example, based on the coreset index of the coreset index field of the activation command being different from (or not indicating) the second coreset index of the second coreset.

Figure 20:
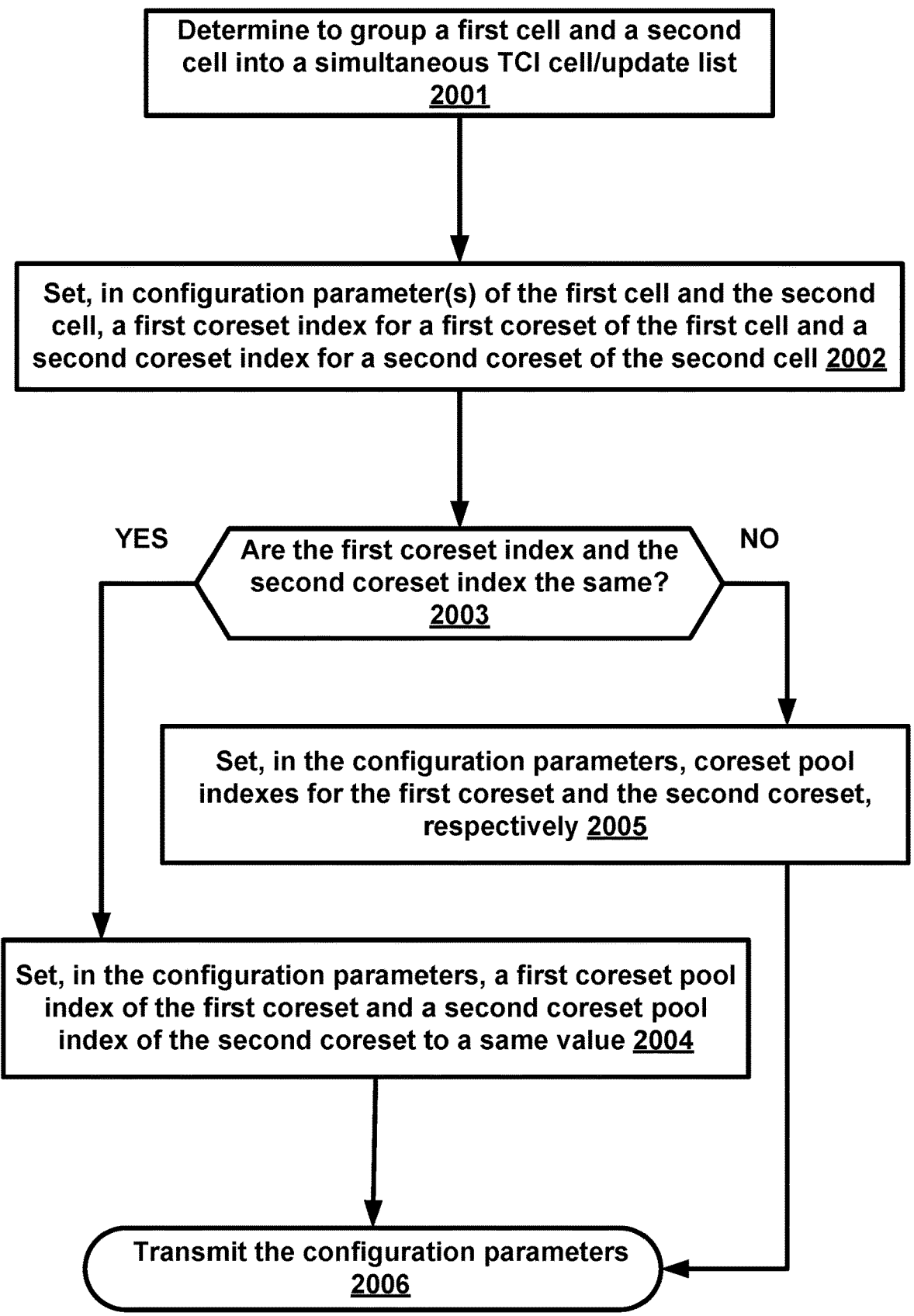
FIG. 20 shows an example method for performing beam management.

FIG. 20 shows an example method for performing beam management. A base station may determine to group a plurality of cells into a cell group/list (e.g., a simultaneous TCI cell list, a simultaneous TCI update list). The plurality of cells (e.g., a plurality of cells in the simultaneous TCI cell list or the simultaneous TCI update list) may comprise a first cell and a second cell.

The base station may determine/set/configure, in/for one or more configuration parameters of the first cell and the second cell, a first value for a first coreset index of a first coreset of the first cell (e.g., at step 2002). The base station may determine/set/configure, in/for the one or more configuration parameters, a second value for a second coreset index of a second coreset of the second cell (e.g., at step 2002). The first value and the second value may be the same. The base station may determine whether the first coreset index and the second coreset index are the same or different (e.g., at step 2003). The base station may determine to set/configure, in/for the one or more configuration parameters, a same value for the first coreset index of the first coreset and the second coreset index of the second coreset.

The base station may determine/set/configure, in/for the one or more configuration parameters, a third value for a first coreset pool index of the first coreset and a fourth value for a second coreset pool index of the second coreset, for example, based on determining/setting/configuring the same value for the first coreset index and the second coreset index. The third value and the fourth value may be the same or may be different. The base station may determine/set/configure, in/for the one or more configuration parameters, a same value for a first coreset pool index of the first coreset and a second coreset pool index of the second coreset (e.g., at step 2004), for example, based on determining/setting/configuring the same value for the first coreset index and the second coreset index.

The determining/setting/configuring, in/for the one or more configuration parameters, the same value for the first coreset pool index of the first coreset and the second coreset pool index of the second coreset may be, for example, further based on the simultaneous TCI cell list comprising the first cell and the second cell. The determining/setting/configuring, in/for the one or more configuration parameters, the same value for the first coreset pool index of the first coreset and the second coreset pool index of the second coreset may be, for example, based on the first coreset and the second coreset being associated with the same TRP of the same cell (e.g., the first coreset being associated with TRP1 of Cell-1 and the second coreset being associated with TRP1 of Cell-1). The determining/setting/configuring, in/for the one or more configuration parameters, the same value for the first coreset pool index of the first coreset and the second coreset pool index of the second coreset may be, for example, further based on the first coreset and the second coreset being associated with the same TRP of different cells in a cell group/list (e.g., the first coreset being associated with TRP1 of Cell-1 and the second coreset being associated with TRP1 of Cell-2).

The first value and the second value may be different. The base station may determine to set/configure, in/for the one or more configuration parameters, different values for the first coreset index of the first coreset and the second coreset index of the second coreset.

The base station may determine/set/configure, in/for the one or more configuration parameters, a third value for a first coreset pool index of the first coreset and a fourth value for a second coreset pool index of the second coreset, for example, based on determining/setting/configuring the different values for the first coreset index and the second coreset index. The third value and the fourth value may or may not be the same. The base station may determine/set/configure, in/for the one or more configuration parameters, a same value or different values for a first coreset pool index of the first coreset and a second coreset pool index of the second coreset, for example, based on determining/setting/configuring the different values for the first coreset index and the second coreset index.

The base station may determine/set/configure, in/for the one or more configuration parameters, a first value for a first coreset pool index of the first coreset and a second value for a second coreset pool index of the second coreset (e.g., at step 2005), for example, based on determining/setting/configuring different values for the first coreset index and the second coreset index. The first coreset pool index of the first coreset and the second coreset pool index of the second coreset may be the same or may be different.

The first cell may comprise one or more coreset pools. A first coreset pool of the first cell may comprise a plurality of coresets (e.g., coreset 0, coreset 1, . . . , coreset n). The second cell may comprise one or more coreset pools. A first coreset pool of the second cell may comprise a plurality of coresets (e.g., coreset 0, coreset 1, . . . , coreset m). A second coreset pool of the first cell may comprise a plurality of coresets (e.g., coreset m+1, coreset m+2, . . . , coreset p), for example, if the coreset index 'm' of the second cell is greater than the coreset index 'n' of the first cell. The second coreset pool of the first cell may comprise a plurality of coresets (e.g., coreset n+1, coreset n+2, . . . , coreset p), for example, if the coreset index 'm' of the second cell is not greater than the coreset index 'n' of the first cell. A second coreset pool of the second cell may comprise a plurality of coresets (e.g., coreset m+1, coreset m+2, . . . , coreset q), for example, if the coreset index 'm' of the second cell is greater than the coreset index 'n' of the first cell. A second coreset pool of the second cell may comprise a plurality of coresets (e.g., coreset n+1, coreset n+2, . . . , coreset q), for example, if the coreset index 'm' of the second cell is not greater than the coreset index 'n' of the first cell. One or more configurations discussed herein may support backward compatibility (e.g., one or more simultaneous resource control may be performed based on a first coreset index and a second coreset index being the same). one or more simultaneous resource control may be performed, for example, by setting the same coreset pool index value for a first coreset of the first cell and a second coreset of the second cell if the first coreset and the second coreset have the same coreset index.

The base station may send/transmit, to a wireless device, one or more messages comprising the one or more configuration parameters (e.g., at step 2006). The base station may send/transmit the one or more messages, for example, based on the setting/configuring the one or more configuration parameters. The wireless device may receive the one or more messages comprising the one or more configuration parameters (e.g., at step 1901 shown in FIG. 19).

As described above, the simultaneous resource control across the plurality of cells may not be efficient, for example, if the channel characteristics associated with one or more resources of a second cell are different (e.g., not quasi co-located) from the resource of a first cell indicated by the control message (e.g., different TRPs and different uplink carrier types may have different channel characteristics). For example, one or more cells of the plurality of cells may have a plurality of TRPs. The resource of the first cell indicated by the control message may be associated with a first TRP of the first cell. A simultaneous resource control to one or more resources of a first TRP of the second cell may be efficient, for example, if the first TRP of the first cell and the first TRP of the second cell have similar channel characteristics (e.g., quasi co-located). However, simultaneous resource control of one or more resources of a second TRP of the second cell may not be efficient, for example, if the first TRP of the first cell and the second TRP of the second cell have different channel characteristics (e.g., not quasi co-located). For example, one or more cells of the plurality of cells may have a plurality of uplink carrier types. The resource of the first cell indicated by the control message may be associated with a first uplink carrier type of the first cell. A simultaneous resource control to one or more resources of a first uplink carrier type of the second cell may be efficient, for example, if the first uplink carrier type of the first cell and the first uplink carrier type of the second cell have similar channel characteristics (e.g., quasi co-located). However, a simultaneous resource control to one or more resources of a second uplink carrier type of the second cell may not be efficient, for example, if the first uplink carrier type of the first cell and the second uplink carrier type of the second cell have different channel characteristics (e.g., not quasi co-located).

A base station may configure, for simultaneous SRS spatial relation updates, a wireless device with a simultaneous resource control cell list (e.g., a spatial relation update cell list). A simultaneous spatial relation control/change/update may be performed across the cells in the simultaneous resource control cell list. One or more cells may comprise a plurality of uplink carrier types (e.g., an NUL, an SUL, etc.). Each uplink carrier type may have different channel characteristics (e.g., an SUL may use a significantly lower frequency band that that of an NUL). The resource of the first cell indicated by the control message may be associated with a first uplink carrier type of the first cell. A simultaneous resource control (e.g., a simultaneous spatial relation update associated with SRS resource(s)) to one or more resources of a first uplink carrier type of the second cell may be efficient, for example, if the first uplink carrier type of the first cell and the first uplink carrier type of the second cell have similar channel characteristics (e.g., quasi co-located). However, a simultaneous resource control (e.g., a simultaneous spatial relation update associated with SRS resource(s)) to one or more resources of a second uplink carrier type of the second cell may not be efficient (e.g., degrading the performance of reception of the SRS transmissions at the base station, causing inaccurate channel estimation, etc.), for example, if the first uplink carrier type of the first cell and the second uplink carrier type of the second cell have different channel characteristics (e.g., not quasi co-located, different operating frequencies).

Resource control described herein may provide improved communications (e.g., for a downlink, an uplink, a sidelink, a D2D link, a V2X link and/or any other communication). A wireless device may improve a likelihood of successful communications with a base station and/or another wireless device by selectively applying a simultaneous resource control/change/update. For example, the wireless device may determine to apply the simultaneous resource control/change/update based on one or more conditions and/or parameters (e.g., a coreset pool index, a coreset index, an uplink carrier type, a sounding reference signal index, an antenna panel index, etc.) By selectively applying the simultaneous resource control/change/update, improved communications may be achieved. Examples described herein may also be applicable for one or more uplink channels (e.g., SRS, PUCCH, etc.). A wireless device may (e.g., autonomously) update a second transmit beam of a second uplink channel to a third transmit beam, for example, if the wireless device receives an activation command (e.g., MAC CE) updating a first transmit beam of a first uplink channel to the third transmit beam. The wireless device may update the second transmit beam of the second uplink channel to the third transmit beam, for example, based on a first index (e.g., an SRS resource index, an SRS resource set index, an antenna panel index, a coreset pool index, or a TRP index) associated with the first uplink channel and a second index (e.g., an SRS resource index, an SRS resource set index, an antenna panel index, a coreset pool index, or a TRP index) associated with the second uplink channel being the same. The wireless device may update the second transmit beam of the second uplink channel to the third transmit beam, for example, based on a first uplink carrier type (e.g., SUL, NUL) comprising the first uplink channel and a second uplink carrier type (e.g., SUL, NUL) comprising the second uplink channel being the same. The wireless device may update the second transmit beam of the second uplink channel to the third transmit beam, for example, based on a same list of SRS resource sets comprising the first uplink channel and the second uplink channel.

Figure 21:
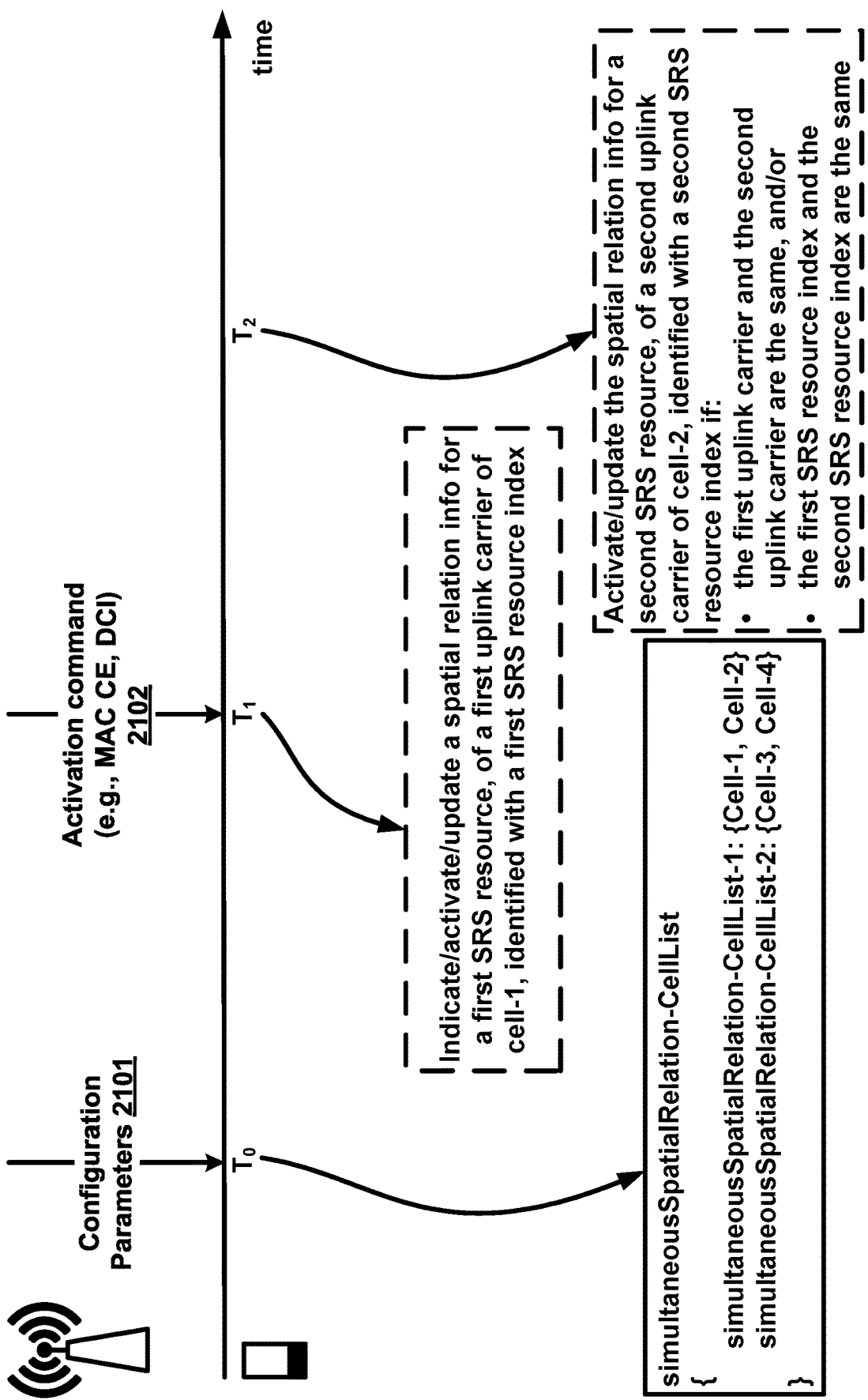
FIG. 21 shows an example of beam management.
Figure 22:
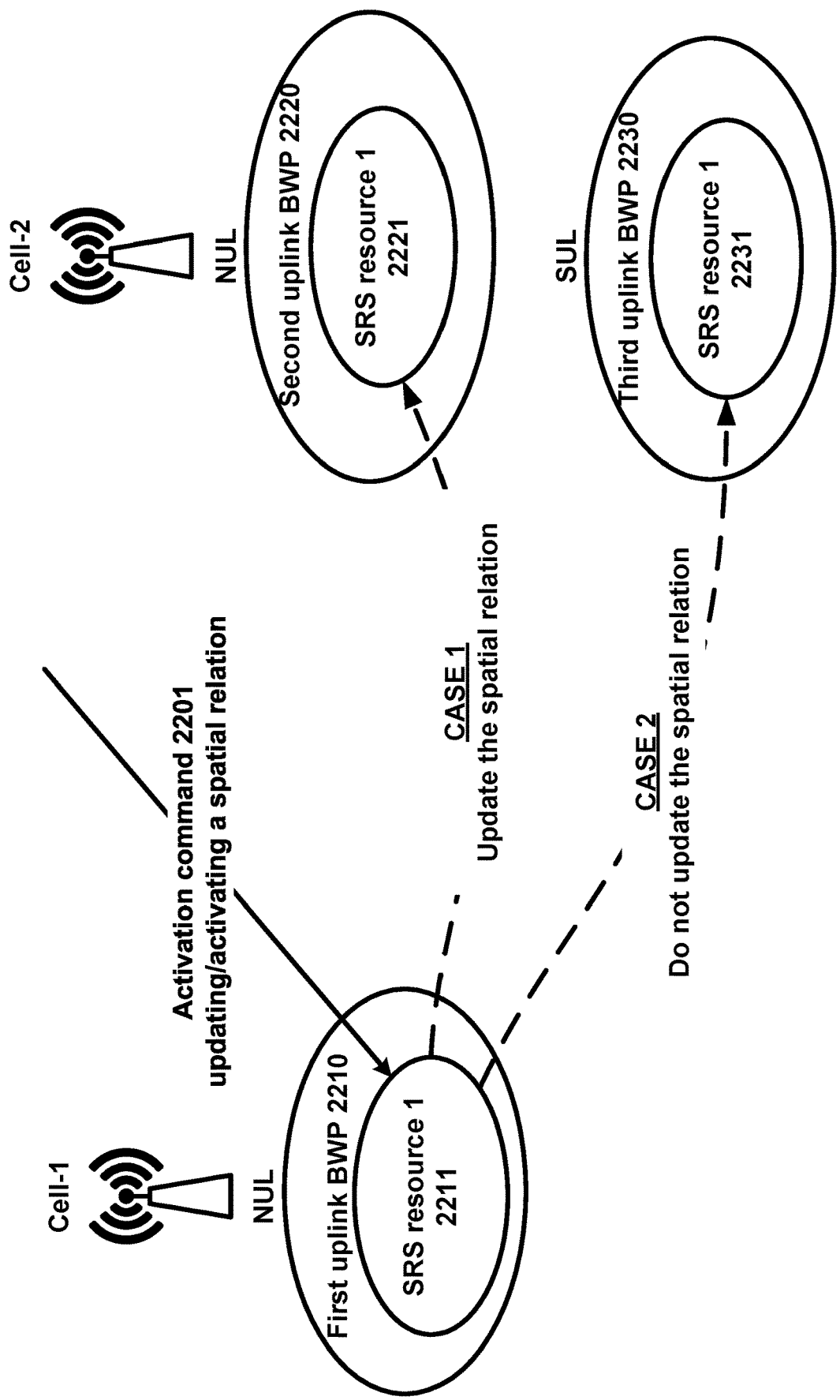
FIG. 22 shows an example of beam management.

FIG. 21 and FIG. 22 show examples of a beam management. A wireless device may receive one or more messages (e.g., at time T0 shown in FIG. 21). The wireless device may receive the one or more messages from a base station and/or other entities (e.g., a relay or another wireless device, etc.). The one or more messages may comprise one or more configuration parameters (e.g., configuration parameters 2101).

The one or more configuration parameters (e.g., RRC configuration, RRC reconfiguration, etc.) may indicate one or more simultaneous spatial relation cell lists (e.g., by a higher layer parameter, simultaneousSpatialRelation-CellList). The one or more simultaneous spatial relation cell lists may comprise simultaneousSpatialRelation-CellList-1 and simultaneousSpatialRelation-CellList-2 (e.g., as shown in FIG. 21).

A quantity/number of the one or more simultaneous spatial relation cell lists may be equal to a value (e.g., 1, 2, 4 or any other value). The one or more configuration parameters may indicate the value. The value may be fixed/preconfigured/predefined. The value may be, for example, based on a capability of the wireless device (e.g., wireless device capability, UE capability, etc.). The wireless device may send/transmit (e.g., to the base station) a message (e.g., wireless device capability message comprising wireless device capability information, UE capability message comprising UE capability information) indicating the value.

The one or more configuration parameters may indicate one or more simultaneous spatial relation cell list indexes (e.g., provided by a higher layer parameter simultaneousSpatialRelation-CellListId) for the one or more simultaneous spatial relation cell lists. Each simultaneous spatial relation cell list of the one or more simultaneous spatial relation cell lists may be identified by (or may comprise or may be indicated by) a respective simultaneous spatial relation cell list index of the one or more simultaneous spatial relation cell list indexes. A first simultaneous spatial relation cell list (e.g., simultaneousSpatialRelation-CellList-1 shown in FIG. 21) of the one or more simultaneous spatial relation cell lists may be associated with (e.g., be identified by, be indicated by, correspond to) a first simultaneous spatial relation cell list index (e.g., 0) of the one or more simultaneous spatial relation cell list indexes. A second simultaneous spatial relation cell list (e.g., simultaneousSpatialRelation-CellList-2 shown in FIG. 21) of the one or more simultaneous spatial relation cell lists may be associated with (e.g., be identified by, be indicated by, correspond to) a second simultaneous spatial relation cell list index (e.g., 1) of the one or more simultaneous spatial relation cell list indexes.

The one or more configuration parameters may indicate a plurality of cells grouped into a simultaneous spatial relation cell list of the one or more simultaneous spatial relation cell lists. The simultaneous spatial relation cell list may indicate/comprise the plurality of cells. The simultaneous spatial relation cell list indicating/comprising the plurality of cells may comprise/indicate cell indexes (e.g., provided by a higher layer parameter, ServCellIndex) of the plurality of cells. The one or more configuration parameters may indicate, for the simultaneous spatial relation cell list, the cell indexes (e.g., provided by a higher layer parameter, ServCellIndex) of the plurality of cells. Each cell of the plurality of cells may be associated with (e.g., be identified by, be indicated by, correspond to) a respective cell index of the cell indexes. The one or more configuration parameters may indicate the cell indexes. SimultaneousSpatialRelation-CellList-1 may comprise Cell-1 and Cell-2 (e.g., as shown in FIG. 21). SimultaneousSpatialRelation-CellList-2 may comprise Cell-3 and Cell-4 (e.g., as shown in FIG. 21). The plurality of cells may be Cell-1 and Cell-2 (e.g., as shown in FIG. 22).

The one or more configuration parameters may be for the plurality of cells in the simultaneous spatial relation cell list. The simultaneous spatial relation cell list may be associated with (e.g., be identified by, be indicated by, correspond to) a simultaneous spatial relation cell list index (e.g., 0, 1, or any other value) of the one or more simultaneous spatial relation cell list indexes.

The one or more simultaneous spatial relation cell lists may not overlap. A first simultaneous spatial relation cell list (e.g., simultaneousSpatialRelation-CellList-1 shown in FIG. 21) of the one or more simultaneous spatial relation cell lists may comprise a first cell (e.g., Cell-1, Cell-2 shown in FIG. 21). The one or more simultaneous spatial relation cell lists not overlapping may comprise that a second simultaneous spatial relation cell list (e.g., simultaneousSpatialRelation-CellList-2 shown in FIG. 21), of the one or more simultaneous spatial relation cell lists, different from the first simultaneous spatial relation cell list, does not comprise the first cell. The second simultaneous spatial relation cell list (e.g., simultaneousSpatialRelation-CellList-2 shown in FIG. 21) may comprise a second cell (e.g., Cell-3, Cell-4 shown in FIG. 21). The one or more simultaneous spatial relation cell lists not overlapping may comprise that the first simultaneous spatial relation cell list, different from the second simultaneous spatial relation cell list, does not comprise the second cell. The one or more simultaneous spatial relation cell lists may be disjoint sets. SimultaneousSpatialRelation-CellList-1 and SimultaneousSpatialRelation-CellList-2 may be, for example, disjoint sets and may not have a common element (e.g., a common serving cell index).

SimultaneousSpatialRelation-CellList-1 may not comprise Cell-3 and Cell-4, which are elements of SimultaneousSpatialRelation-CellList-2 (e.g., as shown in FIG. 21).

SimultaneousSpatialRelation-CellList-2 may not comprise Cell-1 and Cell-2, which are elements of SimultaneousSpatialRelation-CellList-1 (e.g., as shown in FIG. 21).

The plurality of cells in the simultaneous spatial relation cell list may operate in an intra-band (e.g., each cell of the plurality of cells operates at the same frequency, or at similar frequencies, or at substantially close frequencies, e.g., with 5 MHz, 10 MHz, 100 MHz frequency gap). The plurality of cells in the simultaneous spatial relation cell list may operate in an inter-band with a small frequency gap (e.g., operate at substantially close frequencies/bands, e.g., with 5 MHz, 10 MHz, 100 MHz, 200 MHz, 400 MHz frequency gap).

The plurality of cells in the simultaneous spatial relation cell list may comprise a first cell and a second cell. The simultaneous spatial relation cell list (e.g., simultaneousSpatialRelation-CellList-1 in FIG. 21) may comprise the first cell (e.g., Cell-1) and the second cell (e.g., Cell-2). The simultaneous spatial relation cell list (e.g., simultaneousSpatialRelation-CellList-2 as shown in FIG. 21) may comprise the first cell (e.g., Cell-3) and the second cell (e.g., Cell-4). In FIG. 22, the first cell may be Cell-1 and the second cell may be Cell-2.

The one or more configuration parameters may indicate one or more first sounding reference signal (SRS) resources for a first uplink carrier (e.g., SUL carrier, NUL carrier) of the first cell. The one or more first SRS resources may comprise a first SRS resource. The first uplink carrier may be an NUL carrier of Cell-1 (e.g. as shown in FIG. 22) and the first SRS resource may be SRS resource 1 of the NUL carrier of the Cell-1 (e.g., as shown in FIG. 22). The first SRS resource may be an aperiodic SRS resource, a periodic SRS resource, and/or a semi-persistent SRS resource.

The one or more configuration parameters may indicate one or more uplink BWPs for the first uplink carrier of the first cell. An active uplink BWP of the one or more uplink BWPs may comprise the one or more first SRS resources. An (active or inactive) uplink BWP of the one or more uplink BWPs may comprise the one or more first SRS resources. The first uplink carrier of the first cell (e.g., the one or more uplink BWPs configured for the first uplink carrier of the first cell) may comprise the one or more first SRS resources. An (active or inactive) uplink BWP of the one or more uplink BWPs may comprise the first SRS resource. SRS resource 1 2211 of Cell-1 (e.g., as shown in FIG. 22) may be the first SRS resource, and a first uplink BWP 2210 may comprise the SRS resource 1 2211.

The one or more configuration parameters may indicate one or more first SRS resource indexes (e.g., provided by a higher layer parameter, SRS-ResourceId) for the one or more first SRS resources. Each SRS resource of the one or more first SRS resources may be associated with (e.g., be indicated by, be identified by, correspond to) a respective SRS resource index of the one or more first SRS resource indexes. The first SRS resource of the one or more first SRS resources may be indicated/identified by a first SRS resource index of the one or more first SRS resource indexes.

The one or more configuration parameters may indicate one or more first SRS resource sets for the first uplink carrier of the first cell. The one or more first SRS resource sets may comprise a first SRS resource set. The first SRS resource set of the first uplink carrier of the first cell may comprise the first SRS resource. The one or more configuration parameters may indicate a first SRS resource set usage (e.g., provided by a higher layer parameter, usage) for the first SRS resource set. The first SRS resource set usage may be referred to as "beamManagement" and/or the like. The first SRS resource set usage may be referred to as "codebook" and/or the like. The first SRS resource set usage may be referred to as "nonCodebook" and/or the like. The first SRS resource set usage may be referred to as "antennaSwitching" and/or the like.

The one or more configuration parameters may indicate one or more second sounding reference signal (SRS) resources for a second uplink carrier (e.g., SUL, NUL) of the second cell. The one or more second SRS resources may comprise a second SRS resource. The second uplink carrier may be NUL carrier of Cell-2 (e.g., as shown in FIG. 22) and the second SRS resource may be SRS resource 1 2221 of the NUL carrier of the Cell-2 (e.g., as shown in FIG. 22). The second uplink carrier may be SUL carrier of Cell-2 (e.g., as shown in FIG. 22) and the second SRS resource may be SRS resource 1 2231 of the SUL carrier of the Cell-2 (e.g., as shown in FIG. 22). The second SRS resource may be an aperiodic SRS resource, a periodic SRS resource, and/or a semi-persistent SRS resource.

The one or more configuration parameters may indicate one or more uplink BWPs for the second uplink carrier of the second cell. An active uplink BWP of the one or more uplink BWPs may comprise the one or more second SRS resources. An (active or inactive) uplink BWP of the one or more uplink BWPs may comprise the one or more second SRS resources. The second uplink carrier of the second cell (e.g., the one or more uplink BWPs configured for the second uplink carrier of the second cell) may comprise the one or more second SRS resources. An (active or inactive) uplink BWP of the one or more uplink BWPs may comprise the second SRS resource. SRS resource 1 2221 of the NUL carrier of the Cell-2 may be the second SRS resource and a second uplink BWP 2220 of the NUL carrier of the Cell-2 may comprise the SRS resource 1 2221. The SRS resource 1 2231 of the SUL carrier of the Cell-2 may be the second SRS resource and a third uplink BWP 2230 of the SUL carrier of the Cell-2 may comprise the SRS resource 1 2231.

The one or more configuration parameters may indicate one or more second SRS resource indexes (e.g., provided by a higher layer parameter, SRS-ResourceId) for the one or more second SRS resources. Each SRS resource of the one or more second SRS resources may be identified/determined/indicated by a respective SRS resource index of the one or more second SRS resource indexes. The second SRS resource of the one or more second SRS resources may be identified/determined/indicated by a second SRS resource index of the one or more second SRS resource indexes.

The one or more configuration parameters may indicate one or more second SRS resource sets for the second uplink carrier of the second cell. The one or more second SRS resource sets may comprise a second SRS resource set. The second SRS resource set of the second uplink carrier of the second cell may comprise the second SRS resource. The one or more configuration parameters may indicate a second SRS resource set usage (e.g., provided by a higher layer parameter, usage) for the second SRS resource set. The second SRS resource set usage may be referred to as one or more of: "beamManagement," "codebook," "nonCodebook," "antennaSwitching," and/or the like, and/or any other higher layer parameters.

The first SRS resource set usage and the second SRS resource set usage may be the same. The first SRS resource set usage and the second SRS resource set usage may be referred to as one or more of: "beamManagement," "codebook," "AntennaSwitching," "nonCodebook," and/or the like, and/or any other higher layer parameters.

The first SRS resource set usage and the second SRS resource set usage may be different. The first SRS resource set usage may be referred to as, for example, one or more of "codebook," "beamManagement," "nonCodebook," "antennaSwitching," and/or the like. The second SRS resource set usage may be referred to as, for example, a different one or more of "beamManagement," "codebook," "nonCodebook," "antennaSwitching," and/or the like.

The first uplink carrier and the second uplink carrier may be the same. The first uplink carrier and the second uplink carrier may be, for example, an SUL carrier. The first uplink carrier and the second uplink carrier may be, for example, an NUL carrier.

The first uplink carrier and the second uplink carrier may be different. The first uplink carrier may be an SUL carrier and the second uplink carrier may be an NUL carrier. The first uplink carrier may be an NUL carrier and the second uplink carrier may be an SUL carrier.

The wireless device may receive an activation command (e.g., MAC-CE, SP/AP SRS resource Spatial Relation Activation/Deactivation MAC CE, DCI, RRC). The activation command may be, for example, an activation command 2102 received at time T1 show in FIG. 21, an activation command 2201 shown in FIG. 22, etc.

The activation command may comprise one or more fields. The activation command may indicate/update/activate a spatial relation. The activation command indicating/updating/activating the spatial relation may comprise that a field, among the one or more fields, of the activation command. The field may comprise a spatial relation index indicating the spatial relation. The one or more configuration parameters may indicate one or more spatial relation comprising the spatial relation. The one or more configuration parameters may indicate the spatial relation index for (or identifying or indicating) the spatial relation. The field indicating the spatial relation may comprise at least one field, of the one or more fields in the activation command, that may indicate the spatial relation. The at least one field may comprise a reference signal index (e.g., SSB-Index, NZP CSI-RS resource index, SRS-ResourceId or a resource index) identifying (or indicating) a resource used for a spatial relationship derivation. The at least one field may comprise a resource serving cell index (e.g., provided by a higher layer parameter, ServCellIndex) identifying (or indicating) a serving cell on which the resource used for the spatial relationship derivation. The serving cell may comprise the resource used for the spatial relationship derivation. The at least one field may comprise an uplink BWP index indicating (or identifying) an uplink BWP. The serving cell may comprise the uplink BWP. The uplink BWP of the serving cell may comprise the resource used for the spatial relationship derivation.

The spatial relation may indicate a reference signal (e.g., CSI-RS, SSB/PBCH block, SRS, DM-RS). The spatial relation indicating the reference signal may comprise the spatial relation comprising a reference signal index identifying (or indicating or of) the reference signal. The activation command indicating/updating/activating the spatial relation may comprise a field that comprises the reference signal index identifying (or indicating or of) the reference signal.

A field, among the one or more fields, of the activation command may comprise an SRS resource index. The SRS resource index may indicate/identify an SRS resource. The SRS resource index in the activation command may be associated with (e.g., be equal to, correspond to, and/or indicate) the first SRS resource index of the first SRS resource of the first uplink carrier of the first cell. The activation command may indicate the first SRS resource, for example, based on the SRS resource index being associated with (e.g., being equal to, corresponding to, and/or indicating) the first SRS resource index.

The SRS resource index in the activation command may be associate with (e.g., be equal to, correspond to, indicate) the second SRS resource index of the second SRS resource of the second uplink carrier of the second cell. The activation command may indicate the second SRS resource, for example, based on the SRS resource index associated with (e.g., being equal to, corresponding to, and/or indicating) the second SRS resource index.

A field, among the one or more fields, of the activation command may comprise a cell index (e.g., ServCellIndex). The cell index may indicate/identify a cell among the plurality of cells. The cell index of the cell may be associated with (e.g., be equal to, correspond to, indicate) a first cell index of the first cell. The cell indexes of the plurality of cells may comprise the first cell index. The cell and the first cell may be the same, for example, if the cell index being associated with (e.g., being equal to, corresponding to, indicating) the first cell index. The activation command may indicate the first cell. The activation command may indicate the first cell, for example, if the cell index is associated with (e.g., is equal to, corresponds to, indicates) the first cell index.

The cell index of the cell may be associated with (e.g., be equal to, correspond to, and/or indicate) a second cell index of the second cell. The cell indexes of the plurality of cells may comprise the second cell index. The cell and the second cell may be the same, for example, if the cell index is associated with (e.g., is equal to, corresponds to, and/or indicates) the second cell index. The activation command may indicate the second cell. The activation command may indicate the second cell, for example, if the cell index is associated with (e.g., is equal to, corresponds to, and/or indicates) the second cell index.

The activation command may indicate the simultaneous spatial relation cell list. The activation command indicating the simultaneous spatial relation cell list may comprise a field, among the one or more fields, of the activation command that comprises the simultaneous spatial relation cell list index identifying (or of or indicating) the simultaneous spatial relation cell list. A value of the field may be equal to (or indicate) the simultaneous spatial relation cell list index identifying (or of or indicating) the simultaneous spatial relation cell list.

The activation command may indicate an uplink carrier. The activation command indicating the uplink carrier may comprise a field, among the one or more fields, of the activation command that comprises an uplink carrier index indicating (or of) the uplink carrier. A value of the uplink carrier index (or a value of the field) may indicate the uplink carrier. The field of the activation command may comprise the uplink carrier index. The uplink carrier may be (or may indicate) a SUL carrier, for example, if the uplink carrier index indicates (or is equal to or corresponds to) zero (or any other value). The uplink carrier may be (or may indicate) an NUL carrier, for example, if the uplink carrier index indicates (or is equal to or corresponds to) one (or any other value).

The uplink carrier may be (or may indicate) an NUL carrier, for example, if the uplink carrier index indicates (or is equal to or corresponds to) zero (or any other value). The uplink carrier may be (or may indicate) an SUL carrier, for example, if the uplink carrier index indicates (or is equal to or corresponds to) one (or any other value). The activation command may be applicable for the uplink carrier (or for a configuration of the uplink carrier), for example, based on the uplink carrier index indicating the uplink carrier.

The uplink carrier index in the field of the activation command may indicate the first uplink carrier of the first cell. The activation command may indicate the first uplink carrier, for example, if the uplink carrier index indicates the first uplink carrier.

A field, among the one or more fields, of the activation command may indicate one or more reserved bits. The wireless device may apply the spatial relation to the first SRS resource, for example, after or in response to or based on the receiving the activation command. The applying the spatial relation to the first SRS resource may be, for example, based on the field in the activation command indicating the first SRS resource (e.g., based on the SRS resource index being equal to the first SRS resource index). The applying the spatial relation to the first SRS resource may be, for example, based on the field in the activation command indicating the first cell comprising the first SRS resource (or comprising the first uplink carrier comprising the first SRS resource). The applying the spatial relation to the first SRS resource may be, for example, based on the field in the activation command indicating the simultaneous spatial relation cell list comprising the first cell. The first cell may comprise the first SRS resource or comprise the first uplink carrier comprising the first SRS resource. The applying the spatial relation to the first SRS resource may be, for example, based on the field in the activation command indicating the first uplink carrier comprising the first SRS resource. The applying the spatial relation to the first SRS resource may be, for example, based on the uplink carrier index in the field of the activation command indicating the first uplink carrier comprising the first SRS resource.

The applying the spatial relation to the first SRS resource may comprise transmitting an SRS via the first SRS resource based on the reference signal indicated by the spatial relation. The wireless device may determine a spatial domain transmission filter, for example, for transmission of the SRS via the first SRS resource. The wireless device may determine a spatial domain transmission filter, for example, based on the reference signal. The transmitting the SRS via the first SRS resource based on the reference signal may comprise transmitting the SRS via the first SRS resource with the spatial domain transmission filter determined based on the reference signal.

A spatial relation may indicate a reference signal. The spatial relation indicating the reference signal may comprise a reference signal index (e.g., SSB index, SRS-ResourceId, NZP CSI-RS resource index, CSI-RS index) identifying/indicating the reference signal. The wireless device may use the reference signal to derive/determine a spatial domain transmission filter for an SRS resource. The spatial domain transmission filter may provide/indicate a spatial setting for transmission of an SRS via the SRS resource. The wireless device may determine a spatial domain transmission filter, for example, for transmission of an SRS via the SRS resource, based on the reference signal. Transmitting the SRS via the SRS resource based on the reference signal may comprise transmitting the SRS via the SRS resource with the spatial domain transmission filter determined based on the reference signal.

The reference signal may be a downlink signal. The downlink signal may comprise an SS/PBCH block. The downlink signal may comprise a CSI-RS (e.g., periodic CSI-RS, semi-persistent CSI-RS, aperiodic CSI-RS). The downlink signal may comprise a DM-RS (e.g., for PUCCH, PUSCH, etc.). The wireless device may use a spatial domain receiving filter to receive the downlink signal. The wireless device may send/transmit the SRS, for example, based on the reference signal (e.g., indicated by the spatial relation) being the downlink signal. The wireless device may send/transmit the SRS, for example, via the SRS resource, with a spatial domain transmission filter that is the same as the spatial domain receiving filter. The wireless device may send/transmit the SRS, for example, based on the reference signal (e.g., indicated by the spatial relation) being the downlink signal. The wireless device may send/transmit the SRS, for example, via the SRS resource, with the spatial domain receiving filter.

The reference signal may be an uplink signal (e.g., periodic SRS, semi-persistent SRS, aperiodic SRS, DM-RS). The wireless device may use a spatial domain transmission filter to send/transmit the uplink signal. The wireless device may send/transmit the SRS, for example, based on the reference signal (e.g., indicated by the spatial relation) being the uplink signal. The wireless device may send/transmit the SRS, for example, via the SRS resource, with a spatial domain transmission filter that is the same as the spatial domain transmission filter used to send/transmit the uplink signal.

The wireless device may send/transmit an SRS via the second SRS resource of the second uplink carrier of the second cell, for example, based on a second reference signal indicated by a second spatial relation. The one or more configuration parameters may indicate the second spatial relation for the second SRS resource. The wireless device may receive a second activation command (e.g., SP/AP SRS resource Spatial Relation Activation/Deactivation MAC CE) activating/selecting/indicating/updating the second spatial relation for the second SRS resource. The wireless device may determine a spatial domain transmission filter, for example, for transmission of the SRS via the second SRS resource, based on the second reference signal. The sending/transmitting the SRS via the second SRS resource based on the second reference signal may comprise transmitting the SRS via the second SRS resource with the spatial domain transmission filter determined based on the second reference signal.

The wireless device may determine whether the first uplink carrier of the first SRS resource and the second uplink carrier of the second SRS resource are the same or not. The determining whether the first uplink carrier of the first SRS resource and the second uplink carrier of the second SRS resource are the same or not may be, for example, based on the receiving the activation command. The determining whether the first uplink carrier of the first SRS resource and the second uplink carrier of the second SRS resource are the same or not may be, for example, based on the applying the spatial relation to the first SRS resource.

The wireless device may determine that the first uplink carrier of the first SRS resource and the second uplink carrier of the second SRS resource are the same. The wireless device may apply the spatial relation to the second SRS resource of the second uplink carrier (e.g., at time T2 shown in FIG. 21, CASE 1 shown in FIG. 22), for example, based on the determining that the first uplink carrier and the second uplink carrier are the same (e.g., the same uplink carrier type).

The applying the spatial relation to the second SRS resource may comprise transmitting an SRS via the second SRS resource based on the reference signal indicated by the spatial relation. The applying the spatial relation to the second SRS resource may comprise overwriting (or overriding or replacing) the second spatial relation of the second SRS resource with the spatial relation. The first SRS resource index of the first SRS resource and the second SRS resource index of the second SRS resource may be the same.

The wireless device may determine that the first SRS resource index of the first SRS resource and the second SRS resource index of the second SRS resource are the same. The wireless device may apply the spatial relation to the second SRS resource of the second uplink carrier (e.g., at time T2 shown in FIG. 21), for example, based on the determining that the first SRS resource index and the second SRS resource index are the same.

The wireless device may determine that the first SRS resource index of the first SRS resource and the second SRS resource index of the second SRS resource are different. The wireless device may not apply the spatial relation to the second SRS resource of the second uplink carrier, for example, based on the determining that the first SRS resource index and the second SRS resource index are different.

The wireless device may determine that the first uplink carrier of the first SRS resource and the second uplink carrier of the second SRS resource are different. The wireless device may not apply the spatial relation to the second SRS resource of the second uplink carrier (e.g., CASE 2 shown in FIG. 22), for example, based on the determining that the first uplink carrier and the second uplink carrier are different. The first SRS resource index of the first SRS resource and the second SRS resource index of the second SRS resource may be the same.

The not applying the spatial relation to the second SRS resource may comprise not transmitting an SRS via the second SRS resource based on the reference signal indicated by the spatial relation. The not applying the spatial relation to the second SRS resource may comprise sending/transmitting an SRS via the second SRS resource based on the second reference signal indicated by the second spatial relation. The not applying the spatial relation to the second SRS resource may comprise that the wireless device keeps sending/transmitting an SRS via the second SRS resource based on the second reference signal indicated by the second spatial relation.

The wireless device may determine that the first SRS resource set usage of the first SRS resource set (e.g., comprising the first SRS resource) and the second SRS resource set usage of the second SRS resource set (e.g., comprising the second SRS resource) are the same. The wireless device may apply the spatial relation to the second SRS resource of the second uplink carrier (e.g., at time T2 shown in FIG. 21), for example, based on the determining.

The wireless device may determine that the first SRS resource set usage of the first SRS resource set (e.g., comprising the first SRS resource) and the second SRS resource set usage of the second SRS resource set (e.g., comprising the second SRS resource) are different. The wireless device may not apply the spatial relation to the second SRS resource of the second uplink carrier, for example, based on the determining.

The one or more configuration parameters may indicate a first index for the first SRS resource. The first index may be a first antenna panel index indicating a first antenna panel among a plurality of antenna panels at the wireless device. The wireless device may send/transmit an SR via the first SRS resource with the first antenna panel. The first index may be a first coreset pool index. The first coreset pool index may indicate a first TRP. The first index may be a first TRP index indicating a first TRP. The wireless device may send/transmit an SR via the first SRS resource to the first TRP. The first TRP may monitor, for an SR, via the first SRS resource. The first index may be a first SRS resource set list index indicating a first SRS resource set list (e.g., SRS resources for eMBB service, configured by a higher layer parameter srs-ResourceSetToAddModList).

The applying the spatial relation to the first SRS resource may be, for example, based on a field, of the one or more fields, in the activation command associated with (e.g., being equal to, corresponding to, indicating) the first index of the first SRS resource. The activation command may indicate the first antenna panel, for example, based on the field being associated with (e.g., being equal to, corresponding to, indicating) the first index. The activation command may indicate the first TRP, for example, based on the field being equal to the first index. The field being equal to the first index may comprise a value of/in the field being equal to the first index.

The one or more configuration parameters may indicate a second index for the second SRS resource. The second index may be a second antenna panel index indicating a second antenna panel among a plurality of antenna panels at the wireless device. The wireless device may send/transmit an SR via the second SRS resource with the second antenna panel. The second index may be a second coreset pool index. The second coreset pool index may indicate a second TRP. The second index may be a second TRP index indicating a second TRP. The wireless device may send/transmit an SR via the second SRS resource to the second TRP. The second TRP may monitor, for an SR, via the second SRS resource. The second index may be a second SRS resource set list index indicating a second SRS resource set list (e.g., SRS resources for uRLLC service, configured by a higher layer parameter srs-ResourceSetToAddModList-ForDCIFormat0_2).

The wireless device may determine that the first index and the second index are the same. The wireless device may apply the spatial relation to the second SRS resource of the second uplink carrier (e.g., at time T2 in FIG. 21), for example, based on the determining.

The wireless device may determine that the first index and the second index are different. The wireless device may not apply the spatial relation to the second SRS resource of the second uplink carrier, for example, based on the determining.

The one or more configuration parameters may comprise/indicate a simultaneous spatial relation update parameter (e.g., enableSpatialRelationUpdateforSRS, enableSpatialRelationUpdateforUplink, simultaneousSpatialRelation-CellList, and the like). The wireless device may determine that the first SRS resource index of the first SRS resource and the second SRS resource index of the second SRS resource are the same. The wireless device may apply the spatial relation to the second SRS resource of the second uplink carrier (e.g., at time T2 shown in FIG. 21), for example, based on the determining that the first SRS resource index and the second SRS resource index are the same. The applying the spatial relation to the second SRS resource may be, for example, further based on the one or more configuration parameters comprising/indicating the simultaneous spatial relation update parameter (e.g., enableSpatialRelationUpdateforSRS, enableSpatialRelationUpdateforUplink, simultaneousSpatialRelation-CellList, and the like). The applying the spatial relation to the second SRS resource may be, for example, further based on the one or more configuration parameters indicating the one or more simultaneous spatial relation cell lists.

The one or more configuration parameters may not comprise/indicate a simultaneous spatial relation update parameter (e.g., enableSpatialRelationUpdateforSRS, enableSpatialRelationUpdateforUplink, simultaneousSpatialRelation-CellList, and the like). The wireless device may not apply the spatial relation to the second SRS resource of the second cell, for example, based on the one or more configuration parameters not comprising/indicating the simultaneous spatial relation update parameter (e.g., enableSpatialRelationUpdateforSRS, enableSpatialRelationUpdateforUplink, simultaneousSpatialRelation-CellList, and the like). The first SRS resource index of the first SRS resource and the second SRS resource index of the second SRS resource may be the same.

The one or more configuration parameters (e.g., RRC configuration, RRC reconfiguration, etc.) may not indicate one or more simultaneous spatial relation cell lists (e.g., by a higher layer parameter simultaneousSpatialRelation-CellList). The wireless device may not apply the spatial relation to the second SRS resource of the second cell, for example, based on the one or more configuration parameters not indicating the one or more simultaneous spatial relation cell lists. The first SRS resource index of the first SRS resource and the second SRS resource index of the second SRS resource may be the same.

The uplink carrier index in the field of the activation command may indicate the second uplink carrier comprising the second SRS resource. The activation command may indicate the second uplink carrier, for example, based on the uplink carrier index indicating the second uplink carrier.

The wireless device may apply the spatial relation to the second SRS resource, for example, based on the receiving the activation command. The applying the spatial relation to the second SRS resource may be, for example, based on the field in the activation command indicating the second SRS resource (e.g., based on the SRS resource index being equal to the second SRS resource index). The applying the spatial relation to the second SRS resource may be, for example, based on the field in the activation command indicating the second cell comprising the second SRS resource (or comprising the second uplink carrier comprising the second SRS resource). The applying the spatial relation to the second SRS resource may be, for example, based on the field in the activation command indicating the simultaneous spatial relation cell list comprising the second cell. The second cell may comprise the second SRS resource (or comprise the second uplink carrier comprising the second SRS resource). The applying the spatial relation to the second SRS resource may be, for example, based on the field in the activation command indicating the second uplink carrier comprising the second SRS resource. The applying the spatial relation to the second SRS resource may be, for example, based on the uplink carrier index in the field of the activation command indicating the second uplink carrier comprising the second SRS resource.

The applying the spatial relation to the second SRS resource may be, for example, based on a field, of the one or more fields, in the activation command being associated with (e.g., being equal to, corresponding to, indicating) the second index of the second SRS resource. The activation command may indicate the second antenna panel, for example, based on the field being associated with (e.g., being equal to, corresponding to, indicating) the second index. The activation command may indicate the second TRP, for example, based on the field being associated with (e.g., being equal to, corresponding to, indicating) the second index. The field being equal to the second index may comprise a value of/in the field being equal to the second index.

The uplink carrier index in the field of the activation command may not indicate the second uplink carrier comprising the second SRS resource. The uplink carrier index may indicate an NUL carrier and the second uplink carrier may be an SUL carrier. The uplink carrier index may indicate an SUL carrier and the second uplink carrier may be an NUL carrier. The activation command may not indicate the second uplink carrier, for example, based on the uplink carrier index not indicating the second uplink carrier.

The wireless device may not apply the spatial relation to the second SRS resource. The wireless device may not apply the spatial relation to the second SRS resource, for example, based on the receiving the activation command. The wireless device may not apply the spatial relation to the second SRS resource, for example, after or based on the wireless device receiving the activation command. The not applying the spatial relation to the second SRS resource may be, for example, based on the field in the activation command not indicating the second uplink carrier comprising the second SRS resource. The not applying the spatial relation to the second SRS resource may be, for example, based on the uplink carrier index in the field of the activation command indicating an uplink carrier different from the second uplink carrier comprising the second SRS resource.

The wireless device may determine that the SRS resource index in the field of the activation command is different from the second SRS resource index of the second SRS resource. The wireless device may not apply the spatial relation to the second SRS resource of the second uplink carrier, for example, based on the determining.

The not applying the spatial relation to the second SRS resource may be, for example, based on a field, of the one or more fields, in the activation command being different from the second index of the second SRS resource. The not applying the spatial relation to the second SRS resource may be, for example, based on a field, of the one or more fields, in the activation command indicating a second simultaneous spatial relation cell list that is different from the simultaneous spatial relation cell list comprising the second cell. The second simultaneous spatial relation cell list may not comprise the second cell. The one or more simultaneous spatial relation cell lists may comprise the second simultaneous spatial relation cell list.

The not applying the spatial relation to the second SRS resource may be, for example, based on a field, of the one or more fields, in the activation command indicating a cell different from the second cell comprising the second SRS resource. A cell index in the field of the activation command may be different from the second cell index of the second cell.

Figure 23:
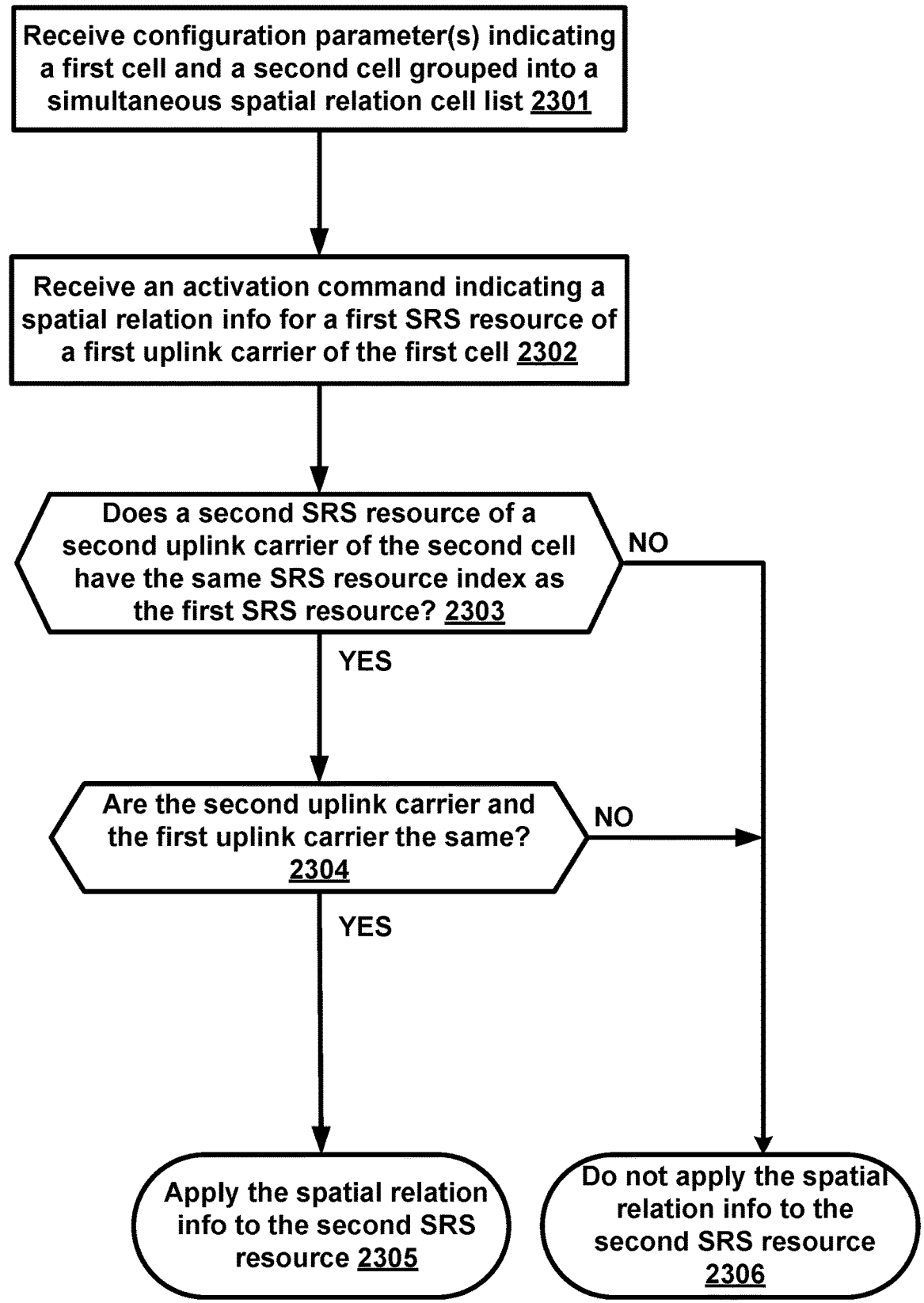
FIG. 23 shows an example method for performing beam management.

FIG. 23 shows an example method for performing beam management. One or more steps shown in FIG. 23 may be performed by a wireless device. One or more steps shown in FIG. 23 may be reordered, omitted, or replaced with one or more other steps. A wireless device may receive (e.g., from a base station, a relay, or any other devices) one or more messages (e.g., one or more messages described herein, one or more RRC messages described herein). The one or more messages may comprise one or more configuration parameters and may be received by the wireless device (e.g., at step 2301 shown in FIG. 23). The one or more configuration parameters may indicate a plurality of cells grouped into a simultaneous spatial relation cell list. The plurality of cells (or the simultaneous spatial relation cell list) may comprise a first cell and a second cell.

The one or more configuration parameters may indicate a first SRS resource of a first uplink carrier (e.g., an NUL carrier, an SUL carrier) of the first cell. The one or more configuration parameters may indicate a first SRS resource index for the first SRS resource.

The one or more configuration parameters may indicate a second SRS resource of a second uplink carrier (e.g., an NUL carrier, an SUL carrier) of the second cell. The one or more configuration parameters may indicate a second SRS resource index for the second SRS resource. The first SRS resource index and the second SRS resource index may be the same.

The wireless device may receive an activation command (e.g., at step 2302 shown in FIG. 23). The activation command may indicate a spatial relation. The activation command may indicate the simultaneous spatial relation cell list. The wireless device may apply the spatial relation to the first SRS resource, for example, based on the receiving the activation command.

The activation command may comprise a field comprising an uplink carrier index. The wireless device may apply the spatial relation to the first SRS resource, for example, based on the uplink carrier index in the field of the activation command indicating the first uplink carrier comprising the first SRS resource.

The activation command may comprise a field comprising an SRS resource index. The wireless device may apply the spatial relation to the first SRS resource, for example, based on the SRS resource index in the field of the activation command being associated with (e.g., being equal to, corresponding to, indicating) the first SRS resource index of the first SRS resource.

The wireless device may determine whether the first uplink carrier and the second uplink carrier are the same (e.g., at step 2304 shown in FIG. 23). The wireless device may determine that the first uplink carrier and the second uplink carrier are the same. The wireless device may apply the spatial relation to the second SRS resource, for example, based on the determining that the first uplink carrier and the second uplink carrier are the same. The applying the spatial relation to the second SRS resource may be, for example, further based on determining that the first SRS resource index and the second SRS resource index are the same.

The wireless device may determine that the first uplink carrier and the second uplink carrier are different (e.g., at step 2304 shown in FIG. 23). The wireless device may not apply the spatial relation to the second SRS resource, for example, based on the determining that the first uplink carrier and the second uplink carrier are different. The first SRS resource index and the second SRS resource index may be the same (e.g., the wireless device may determine that the first SRS resource index and the second SRS resource index are the same at step 2303 shown in FIG. 23).

The wireless device may determine that the first SRS resource index and the second SRS resource index are different (e.g., at step 2303 shown in FIG. 23). The wireless device may not apply the spatial relation to the second SRS resource, for example, based on the determining. The first uplink carrier and the second uplink carrier may be the same (e.g., the wireless device may determine that the first uplink carrier and the second uplink carrier are the same at step 2304 shown in FIG. 23).

The wireless device may not apply the spatial relation to the second SRS resource (e.g., as step 2306 shown in FIG. 23). The wireless device may not apply the spatial relation to the second SRS resource, for example, based on the uplink carrier index in the field of the activation command not indicating the second uplink carrier comprising the second SRS resource. The uplink carrier index may indicate an uplink carrier different from the second uplink carrier. The SRS resource index in the field of the activation command may be equal to (or indicate) the second SRS resource index of the second SRS resource.

The wireless device may not apply the spatial relation to the second SRS resource (e.g., as step 2306 shown in FIG. 23). The wireless device may not apply the spatial relation to the second SRS resource, for example, based on the SRS resource index in the field of the activation command being different from (or not indicating) the second SRS resource index of the second SRS resource.

Various examples herein describe procedures for downlink transmissions (e.g., PDSCH, PDCCH, a TCI State update, etc.) and uplink transmissions (e.g., SRS, etc.) merely for illustrative purposes. Various example procedures described with reference to FIGS. 17-23 may apply for other types of transmissions (e.g., uplink transmissions, PUSCH transmissions, PUCCH transmissions, sidelink transmissions, other types of downlink transmissions, etc.).

A wireless device may perform a method comprising multiple operations. The wireless device may receive one or more configuration parameters indicating a cell list, wherein the cell list comprises a plurality of cells comprising a first cell and a second cell. The one or more configuration parameters may indicate one or more cell lists. The one or more configuration parameters may comprise one or more cell list parameters. The wireless device may receive a control command indicating a transmission configuration indicator (TCI) state associated with a first control resource set (coreset) of the first cell. The wireless device may receive, a downlink transmission using the TCI state for one or more coresets of the second cell. The TCI state may be used for the one or more coresets of the second cell based on: the cell list comprising the first cell and the second cell; and a first coreset pool index for the first coreset of the first cell being associated with a coreset pool index for the one or more coresets of the second cell. The first coreset pool index for the first coreset of the first cell and the coreset pool index for the one or more coresets of the second cell may indicate a same value. The TCI state may be used for the one or more coresets of the second cell further based on a coreset index of the first coreset of the first cell being associated with a coreset index of the one or more coresets of the second cell.

A first coreset pool of the first cell may comprise the first coreset of the first cell. A second coreset pool of the first cell may comprise one or more second coresets of the first cell. A first coreset pool of the second cell may comprise the one or more coresets of the second cell. A second coreset pool of the second cell may comprise one or more second coresets of the second cell. The wireless device may determine not to use the TCI state for one or more second coresets of the second cell. The first coreset pool index for the first coreset of the first cell may not be associated with a second coreset pool index for the one or more second coresets of the second cell. The wireless device may determine not to use the TCI state for one or more second coresets of the first cell. The first coreset pool index for the first coreset of the first cell may not be associated with a second coreset pool index for the one or more second coresets of the first cell. The first coreset pool index for the first coreset of the first cell may be associated with a first transmission and reception point (TRP) of the first cell. The coreset pool index for the one or more coresets of the second cell may be associated with a first TRP of the second cell. A second coreset pool index for one or more second coresets of the first cell may be associated with a second TRP of the first cell. A second coreset pool index for one or more second coresets of the second cell may be associated with a second TRP of the second cell. The wireless device may receive a second downlink transmission using the TCI state for the first coreset of the first cell. The wireless device may receive a third downlink transmission using the TCI state for one or more second coresets of the first cell. The using the TCI state for the one or more second coresets of the first cell may be based on: the first cell comprising the first coreset and the one or more second coresets; and the first coreset of the first cell and the one or more second coresets of the first cell belonging to a same coreset pool. The wireless device may receive one or more second configuration parameters indicating at least one of: the first coreset pool index for the first coreset of the first cell; or the coreset pool index for the one or more coresets of the second cell. The one or more second configuration parameters may indicate at least one of: a coreset index for the first coreset of the first cell; or a coreset index for the one or more coresets of the second cell. The control command may comprise at least one of: an activation command; a medium access control (MAC) control element (CE); or downlink control information (DCI). The cell list may be associated with a simultaneous TCI state update for the plurality of cells. The plurality of cells may comprise a third cell. The one or more configuration parameters may indicate one or more coresets of the third cell. The one or more configuration parameters may indicate a coreset index for a coreset of the third cell and/or a coreset pool index for the coreset of the third cell. The wireless device may send (e.g., to a base station) a capability message indicating that the wireless device is capable of a simultaneous update of resources (e.g., a simultaneous TCI-state update, a simultaneous spatial relation update). One or more operations described herein may be performed, for example, based on the capability message. The applying/updating a TCI-state may comprise activating a TCI-state. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a computing device (e.g., a base station, a relay, etc.) configured to send the one or more first messages. A computer-readable medium may store instructions that, when executed, cause performance of the described method, additional operations and/or include the additional elements.

A wireless device may perform a method comprising multiple operations. The wireless device may receive one or more configuration parameters indicating a cell list. The cell list may comprise a plurality of cells comprising a first cell and a second cell. The wireless device may receive a control command, associated with a first control resource set (coreset) pool index, indicating a transmission configuration indicator (TCI) state associated with the first cell. The wireless device may adjust, based on the TCI state, one or more downlink reception parameters associated with one or more coresets of a coreset pool of the second cell. The adjusting may be based on: the cell list comprising the first cell and the second cell; and the first coreset pool index being associated with a coreset pool index for the coreset pool of the second cell. The wireless device may receive, via the one or more coresets of the coreset pool of the second cell and using the adjusted one or more downlink reception parameters, a downlink transmission. The wireless device may update, by using the TCI state and based on the first coreset pool index being associated with a coreset pool index for a coreset pool of the first cell, one or more TCI states for one or more coresets of the coreset pool of the first cell. The wireless device may determine not to use the TCI state for one or more coresets of a second coreset pool of the first cell. The first coreset pool index may not be associated with a second coreset pool index for the second coreset pool of the first cell. The wireless device may determine not to use the TCI state for one or more coresets of a second coreset pool of the second cell. The first coreset pool index may not be associated with a second coreset pool index for the second coreset pool of the second cell. The wireless device may adjust the one or more downlink reception parameters associated with the one or more coresets of the coreset pool of the second cell by at least one of: adjusting a spatial domain transmission filter; applying an antenna port quasi co-location associated with the TCI state to the one or more coresets of the coreset pool of the second cell; or determining one or more demodulation reference signal (DM-RS) antenna ports associated with the one or more coresets of the coreset pool of the second cell to be quasi co-located with a reference signal indicated by the TCI state. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a computing device (e.g., a base station, a relay, etc.) configured to send the one or more first messages. A computer-readable medium may store instructions that, when executed, cause performance of the described method, additional operations and/or include the additional elements.

A wireless device may perform a method comprising multiple operations. The wireless device may receive one or more configuration parameters indicating a cell list. The cell list may comprise a plurality of cells comprising a first cell and a second cell. The wireless device may receive a control command indicating: a transmission configuration indicator (TCI) state; and one or more control resource sets (coresets) of a coreset pool of the first cell. The wireless device may receive, based on one or more TCI states configured for one or more coresets of a coreset pool of the second cell, a downlink transmission. Based on a first coreset pool index for the coreset pool of the first cell not being associated with a coreset pool index for a coreset pool of the second cell, the TCI state indicated by the control command may not be used for the one or more coresets of the coreset pool of the second cell. The wireless device may update, by using the TCI state, one or more TCI states configured for one or more coresets of a second coreset pool of the second cell based on: the cell list comprising the first cell and the second cell; and the first coreset pool index for the coreset pool of the first cell being associated with a coreset pool index for the second coreset pool of the second cell. The updating may be further based on a coreset index of the one or more coresets of the coreset pool of the first cell being associated with a coreset index of the one or more coresets of the second coreset pool of the second cell. The wireless device may receive a downlink transmission using the TCI state for one or more coresets of a second coreset pool of the second cell. The TCI state may be used for the one or more coresets of the second coreset pool of the second cell based on: the cell list comprising the first cell and the second cell; and the first coreset pool index for the coreset pool of the first cell being associated with a coreset pool index for the second coreset pool of the second cell. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a computing device (e.g., a base station, a relay, etc.) configured to send the one or more first messages. A computer-readable medium may store instructions that, when executed, cause performance of the described method, additional operations and/or include the additional elements.

A wireless device may perform a method comprising multiple operations. The wireless device may receive one or more configuration parameters indicating a cell list. The cell list may comprise a plurality of cells comprising a first cell and a second cell. The wireless device may receive a control command indicating a transmission configuration indicator (TCI) state associated with a first resource of the first cell. The wireless device may perform wireless communication using the TCI state for one or more resources of the second cell. The TCI state may be used for the one or more resources of the second cell, based on the cell list comprising the first cell and the second cell, and based on at least one of: a resource pool index for the first resource of the first cell being associated with a resource pool index for the one or more resources of the second cell; or an uplink carrier of the first cell and an uplink carrier of the second cell being a same uplink carrier type. The TCI state may be used for the one or more resources of the second cell further based on a resource index of the first resource of the first cell being associated with a resource index of the one or more resources of the second cell. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a computing device (e.g., a base station, a relay, etc.) configured to send the one or more first messages. A computer-readable medium may store instructions that, when executed, cause performance of the described method, additional operations and/or include the additional elements.

A wireless device may perform a method comprising multiple operations. The wireless device may receive one or more configuration parameters indicating at least one of: a cell list comprising a plurality of cells comprising a first cell and a second cell; a first sounding reference signal (SRS) resource index for an SRS resource of an uplink carrier of the first cell; or a second SRS resource index for an SRS resource of an uplink carrier of the second cell. The wireless device may receive a control command indicating a spatial relation for the SRS resource of the uplink carrier of the first cell. The wireless device may transmit an SRS using the spatial relation for the SRS resource of the uplink carrier of the second cell. The spatial relation may be used for the SRS resource of the uplink carrier of the second cell based on: the cell list comprising the first cell and the second cell; and the uplink carrier of the first cell and the uplink carrier of the second cell being of a same uplink carrier type. The same uplink carrier type may be either a supplemental uplink carrier or a normal uplink carrier (e.g., a non-supplementary uplink carrier). The spatial relation may be used for the SRS resource of the uplink carrier of the second cell further based on the first SRS resource index being associated with the second SRS resource index. The spatial relation may be used for the SRS resource of the uplink carrier of the second cell further based on a resource pool index associated with the first SRS resource index and a resource pool index associated with the second SRS resource index being a same resource pool index. The one or more configuration parameters may indicate a third SRS resource index for an SRS resource of a second uplink carrier of the second cell. The first SRS resource index and the third SRS resource index may be the same or different. The wireless device may determine, based on a second uplink carrier of the second cell and the uplink carrier of the first cell being of different uplink carrier types, not to use the spatial relation for an SRS resource of the second uplink carrier of the second cell. The wireless device may determine, based on the first SRS resource index and a third SRS resource index being different, not to use the spatial relation for an SRS resource, of a second uplink carrier of the second cell, associated with the third SRS resource index. The wireless device may update, by using the spatial relation, a spatial relation configured for the SRS resource of the uplink carrier of the first cell. The spatial relation may indicate a reference signal. The wireless device may transmit, via the SRS resource of the uplink carrier of the first cell, an SRS using a spatial domain transmission filter associated with the spatial relation. The transmitting may comprise transmitting, via the SRS resource of the uplink carrier of the second cell, the SRS using a spatial domain transmission filter associated with the spatial relation. The wireless device may receive a second control command indicating a second spatial relation for an SRS resource of a second uplink carrier of the second cell, wherein the second spatial relation indicates a reference signal. The wireless device may transmit, via the SRS resource of the second uplink carrier of the second cell, an SRS using a spatial domain transmission filter associated with the reference signal. The SRS resource of the uplink carrier of the first cell and the SRS resource of the uplink carrier of the second cell may be aperiodic SRS resources or semi-persistent SRS resources. The one or more configuration parameters indicate: a first usage for the SRS resource of the uplink carrier of the first cell; and a second usage for the SRS resource of the uplink carrier of the second cell. The spatial relation may be used for the SRS resource of the uplink carrier of the second cell further based on the first usage and the second usage being the same. The one or more configuration parameters may indicate: a first antenna panel index for the SRS resource of the uplink carrier of the first cell; and a second antenna panel index for the SRS resource of the uplink carrier of the second cell. The spatial relation may be used for the SRS resource of the uplink carrier of the second cell further based on the first antenna panel index and the second antenna panel index being the same. The one or more configuration parameters indicate: a first coreset pool index for the SRS resource of the uplink carrier of the first cell; and a second coreset pool index for the SRS resource of the uplink carrier of the second cell. The spatial relation may be used for the SRS resource of the uplink carrier of the second cell further based on the first coreset pool index and the second coreset pool index being the same. The plurality of cells may operate in at least one of: an intra-band; or an inter-band. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a computing device (e.g., a base station, a relay, etc.) configured to send the one or more first messages. The applying/updating a spatial relation may comprise activating a spatial relation. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
receiving, by a wireless device, one or more configuration parameters indicating a cell list, wherein the cell list comprises a plurality of cells comprising a first cell and a second cell;
receiving a control command indicating a transmission configuration indicator (TCI) state associated with a first control resource set (coreset) of the first cell; and
receiving, using the TCI state associated with the first coreset, a downlink transmission via one or more coresets of the second cell, wherein using the TCI state associated with the first coreset for the one or more coresets of the second cell is based on:
the cell list comprising the first cell and the second cell; and
a first coreset pool index for the first coreset of the first cell being associated with a coreset pool index for the one or more coresets of the second cell.

2. The method of claim 1, wherein the first coreset pool index and the coreset pool index for the one or more coresets of the second cell indicate a same value.

3. The method of claim 1, wherein using the TCI state associated with the first coreset for the one or more coresets of the second cell is further based on a coreset index of the first coreset of the first cell being associated with a coreset index of the one or more coresets of the second cell.

4. The method of claim 1, wherein:
a first coreset pool of the first cell comprises the first coreset of the first cell;
a second coreset pool of the first cell comprises one or more second coresets of the first cell;

a first coreset pool of the second cell comprises the one or more coresets of the second cell; and a second coreset pool of the second cell comprises one or more second coresets of the second cell.

5. The method of claim 1, further comprising:
determining not to use the TCI state associated with the first coreset for one or more second coresets of the second cell,
wherein the first coreset pool index is not associated with a second coreset pool index for the one or more second coresets of the second cell.

6. The method of claim 1, further comprising:
determining not to use the TCI state associated with the first coreset for one or more second coresets of the first cell,
wherein the first coreset pool index is not associated with a second coreset pool index for the one or more second coresets of the first cell.

7. The method of claim 1, wherein:
the first coreset pool index is associated with a first transmission and reception point (TRP) of the first cell; and
the coreset pool index for the one or more coresets of the second cell is associated with a first TRP of the second cell.

8. The method of claim 7, wherein:
a second coreset pool index for one or more second coresets of the first cell is associated with a second TRP of the first cell; and
a second coreset pool index for one or more second coresets of the second cell is associated with a second TRP of the second cell.

9. The method of claim 1, further comprising:
receiving, using the TCI state associated with the first coreset, a second downlink transmission via the first coreset of the first cell; and
receiving, using the TCI state associated with the first coreset, a third downlink transmission via one or more second coresets of the first cell, wherein using the TCI state associated with the first coreset for the one or more second coresets of the first cell is based on:
the first cell comprising the first coreset and the one or more second coresets; and
the first coreset of the first cell and the one or more second coresets of the first cell belonging to a same coreset pool.

10. The method of claim 1, further comprising receiving one or more second configuration parameters indicating at least one of:
the first coreset pool index; or
the coreset pool index for the one or more coresets of the second cell.

11. The method of claim 1, wherein the control command comprises at least one of:
an activation command;
a medium access control (MAC) control element (CE); or
downlink control information (DCI).

12. The method of claim 1, wherein the cell list is configured to indicate a same TCI state update across the plurality of cells.

13. A method comprising:
receiving, by a wireless device, one or more configuration parameters indicating a cell list, wherein the cell list comprises a plurality of cells comprising a first cell and a second cell;

receiving a control command, associated with a first control resource set (coreset) pool index, indicating a transmission configuration indicator (TCI) state associated with the first cell;
adjusting, based on the TCI state associated with the first cell, one or more downlink reception parameters associated with one or more coresets of a coreset pool of the second cell, wherein the adjusting is based on:
the cell list comprising the first cell and the second cell; and
the first coreset pool index being associated with a coreset pool index for the coreset pool of the second cell; and
receiving, via the one or more coresets of the coreset pool of the second cell and using the adjusted one or more downlink reception parameters, a downlink transmission.

14. The method of claim 13, further comprising:
updating, by using the TCI state and based on the first coreset pool index being associated with a coreset pool index for a coreset pool of the first cell, one or more TCI states for one or more coresets of the coreset pool of the first cell; and
determining not to use the TCI state associated with the first cell for one or more coresets of a second coreset pool of the first cell,
wherein the first coreset pool index is not associated with a second coreset pool index for the second coreset pool of the first cell.

15. The method of claim 13, further comprising:
determining not to use the TCI state associated with the first cell for one or more coresets of a second coreset pool of the second cell,
wherein the first coreset pool index is not associated with a second coreset pool index for the second coreset pool of the second cell.

16. The method of claim 13, wherein the adjusting the one or more downlink reception parameters associated with the one or more coresets of the coreset pool of the second cell by at least one of:
adjusting a spatial domain transmission filter;
applying, to the one or more coresets of the coreset pool of the second cell, an antenna port quasi co-location associated with the TCI state associated with the first cell; or
determining one or more demodulation reference signal (DM-RS) antenna ports associated with the one or more coresets of the coreset pool of the second cell to be quasi co-located with a reference signal indicated by the TCI state.

17. The method of claim 13, wherein the cell list is configured to indicate a same TCI state update across the plurality of cells.

18. A method comprising:
receiving, by a wireless device, one or more configuration parameters indicating a cell list, wherein the cell list comprises a plurality of cells comprising a first cell and a second cell;
receiving a control command indicating:
a transmission configuration indicator (TCI) state; and
one or more control resource sets (coresets) of a coreset pool of the first cell; and
receiving, based on one or more TCI states configured for one or more coresets of a first coreset pool of the second cell, a downlink transmission, wherein based on a first coreset pool index for the coreset pool of the first cell not being associated with a coreset pool index for the first coreset pool of the second cell, the TCI state indicated by the control command is not used for the one or more coresets of the first coreset pool of the second cell.

19. The method of claim 18, further comprising:
updating, by using the TCI state indicated by the control command, one or more TCI states configured for one or more coresets of a second coreset pool of the second cell based on:
- the cell list comprising the first cell and the second cell; and
- the first coreset pool index being associated with a coreset pool index for the second coreset pool of the second cell.

20. The method of claim 19, wherein the updating is further based on a coreset index of the one or more coresets of the coreset pool of the first cell being associated with a coreset index of the one or more coresets of the second coreset pool of the second cell.

21. The method of claim 18, further comprising:
receiving, using the TCI state indicated by the control command, a downlink transmission via one or more coresets of a second coreset pool of the second cell, wherein using the TCI state indicated by the control command for the one or more coresets of the second coreset pool of the second cell is based on:
- the cell list comprising the first cell and the second cell; and
- the first coreset pool index being associated with a coreset pool index for the second coreset pool of the second cell.

22. The method of claim 18, wherein the cell list is configured to indicate a same TCI state update across the plurality of cells.

* * * * *